United States Patent [19]
Hashimoto et al.

[11] Patent Number: 6,156,844
[45] Date of Patent: *Dec. 5, 2000

[54] PROPYLENE POLYMER COMPOSITIONS CONTAINING A PROPYLENE HOMO- OR CO-POLYMER OBTAINED USING A BRIDGED METALLOCENE CATALYST AND ANOTHER PROPYLENE HOMO- OR CO-POLYMER

[75] Inventors: Mikio Hashimoto; Takasi Ueda; Masaaki Kawasaki; Satoru Moriya; Akira Mizuno; Daisuke Fukuoka; Junichi Imuta; Keiji Hirose; Junji Saito; Yoshihisa Kiso, all of Waki-cho, Japan

[73] Assignee: Mitsui Chemicals Inc, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/302,651

[22] PCT Filed: Jan. 11, 1994

[86] PCT No.: PCT/JP94/00024

§ 371 Date: Sep. 8, 1994

§ 102(e) Date: Sep. 8, 1994

[87] PCT Pub. No.: WO94/16009

PCT Pub. Date: Jul. 21, 1994

[30] Foreign Application Priority Data

| Jan. 11, 1993 | [JP] | Japan | 5-019382 |
| Jan. 11, 1993 | [JP] | Japan | 5-019383 |
| Jan. 11, 1993 | [JP] | Japan | 5-019384 |
| Jan. 11, 1993 | [JP] | Japan | 5-019385 |
| Jan. 11, 1993 | [JP] | Japan | 5-019386 |

[51] Int. Cl.[7] ............................ C08L 23/12; C08L 23/14; C08L 23/16

[52] U.S. Cl. ......................................... 525/240

[58] Field of Search ............................................. 525/240

[56] References Cited

U.S. PATENT DOCUMENTS

| 3,472,829 | 10/1969 | Claybaugh et al. | 260/93.7 |
| 4,414,369 | 11/1983 | Kuroda et al. | 525/240 |
| 4,939,216 | 7/1990 | Stricklen et al. | 526/160 |
| 4,975,403 | 12/1990 | Ewen | 502/113 |
| 5,216,095 | 6/1993 | Dolle et al. | 526/351 |
| 5,218,052 | 6/1993 | Cohen et al. | 525/240 |
| 5,243,001 | 9/1993 | Winter et al. | 526/351 |
| 5,278,264 | 1/1994 | Spaleck et al. | 526/351 |
| 5,304,614 | 4/1994 | Winter et al. | 526/351 |
| 5,385,877 | 1/1995 | Fujita et al. | 526/351 |
| 5,395,810 | 3/1995 | Shamshoum et al. | 502/113 |
| 5,708,090 | 1/1998 | Schreck et al. | 525/240 |

FOREIGN PATENT DOCUMENTS

| 2099214 | 12/1993 | Canada . |
| 0294770 | 12/1988 | European Pat. Off. . |
| 0433990 | 12/1990 | European Pat. Off. . |
| 0466926 | 1/1992 | European Pat. Off. . |
| 0515898 | 5/1992 | European Pat. Off. . |
| 0518125 | 5/1992 | European Pat. Off. . |
| 0490353 | 6/1992 | European Pat. Off. . |
| 0499216 | 8/1992 | European Pat. Off. . |
| 0552681 | 1/1993 | European Pat. Off. . |
| 0538749 | 4/1993 | European Pat. Off. . |
| 0550214 | 7/1993 | European Pat. Off. . |
| 0588208 | 3/1994 | European Pat. Off. . |
| 4130429 | 3/1993 | Germany . |
| 172507 | 9/1984 | Japan . |
| 9214784 | 9/1992 | WIPO . |

*Primary Examiner*—Donald R. Wilson

[57] ABSTRACT

A propylene polymer composition is prepared by mixing a first propylene polymer prepared using an olefin polymerization catalyst containing a specific metallocene catalyst component of formula (I), e.g., rac-dimethylsilylene-bis{1-(2-ethyl-4-phenylindenyl)} zirconium dichloride, and an organoaluminum-oxy cocatalyst, with a second propylene polymer component. The compositions are excellent in heat resistance, mechanical strength, tensile elongation at break, and other properties and can be used to produce various structural materials, sheets and films.

22 Claims, 4 Drawing Sheets

PROPYLENE POLYMER COMPOSITIONS CONTAINING A PROPYLENE HOMO- OR CO-POLYMER OBTAINED USING A BRIDGED METALLOCENE CATALYST AND ANOTHER PROPYLENE HOMO- OR CO-POLYMER

FIELD OF THE INVENTION

The present invention relates to propylene polymer compositions each comprising two kinds of propylene polymers and to propylene polymer compositions each comprising a propylene polymer and other olefin (co) polymer.

BACKGROUND OF THE INVENTION

Propylene polymers have been conventionally molded by various molding methods and the molded articles are applied to extensive uses.

The propylene polymers are generally prepared using a catalyst comprising a transition metal compound and an organoaluminum compound, i.e., so-called Ziegler catalyst.

Propylene polymers prepared by the use of a titanium catalyst containing a halogen-containing titanium catalyst component among the Ziegler catalysts are excellent in moldability and rigidity, but they have such problems that they are poor in tensile elongation at break. Moreover, the titanium catalyst causes a large amount of a catalyst residue in the resulting polymer because of low polymerization activities, and hence the molded article is sometimes colored or deteriorated in sanitariness.

On the other hand, propylene polymers prepared by the use of a metallocene catalyst containing a transition metal compound catalyst component such as zirconocene are excellent in tensile elongation at break, but they have such problems that they are poor in moldability and rigidity (flexural modulus). As for the metallocene catalyst, however, the amount of the catalyst residue is small because of high polymerization activities, and the molded article is never colored and is good in sanitariness.

Though the characteristics required for the propylene polymers vary depending on the molding methods or uses, generally required are moldability, heat resistance, mechanical strength, high tensile elongation at break, impact resistance, etc. For satisfying these requirements, researches on various compositions such as a composition obtained by blending two or more kinds of propylene polymers and a composition obtained by blending a propylene polymer and other synthetic resin have been made.

For example, blending of two kinds of propylene polymers which are different in the molecular weight has been carried out in order to improve physical properties of the propylene polymers prepared by the use of a titanium catalyst. However, when two kinds of propylene polymers produced by the use of a titanium catalyst are blended to prepare a propylene polymer composition, the tensile elongation at break of the resulting composition is markedly lowered, though the moldability thereof is improved.

Further, adding of a soft polymer to a propylene polymer which is prepared by the use of a titanium catalyst has been carried out in order to improve the tensile elongation at break and the impact resistance of the propylene polymer. The soft polymer used therefor is, for example, an ethylene/propylene random copolymer prepared by the use of a titanium catalyst or a vanadium catalyst. However, even if the propylene polymer prepared by the use of a titanium catalyst is blended with the ethylene/propylene random copolymer prepared by the use of a titanium catalyst or the like, the resulting composition is not sufficiently improved in the tensile elongation at break and the impact resistance.

As described above, the conventional propylene polymer compositions are not always satisfactory in the properties such as heat resistance, mechanical strength and tensile elongation at break.

OBJECT OF THE INVENTION

The present invention has been accomplished in the light of the foregoing prior art technique, and an object of the present invention is to provide propylene polymer compositions which are excellent in heat resistance, mechanical strength, tensile elongation at break, etc. as compared with the conventional propylene polymers or propylene polymer compositions.

SUMMARY OF THE INVENTION

The first propylene polymer composition of the invention comprises:

(A1) a propylene polymer, in an amount of 10 to 90% by weight, which is characterized in that:
  (1) the propylene polymer is obtained by polymerizing propylene in the presence of an olefin polymerization catalyst comprising:
    (i) (a) a compound of a Group IVB transition metal in the periodic table containing a ligand having a cyclopentadienyl skeleton, and
    (ii) at least one compound selected from the group consisting of
      (b) an organoaluminum oxy-compound, and
      (c) a compound which reacts with the transition metal compound (a) to form an ion pair,
  (2) the propylene polymer has a melt flow rate (MFR), as measured at 230° C. under a load of 2.16 kg, of 0.01 to 30 g/10 min, and
  (3) the propylene polymer has a molecular weight distribution (Mw/Mn), as measured by gel permeation chromatography (GPC), of 2 to 3; and (A2) a propylene polymer, in an amount of 10 to 90% by weight, which is characterized in that:
  (1) the propylene polymer is obtained by polymerizing propylene in the presence of an olefin polymerization catalyst comprising:
    (i) (a) a compound of a Group IVB transition metal in the periodic table containing a ligand having a cyclopentadienyl skeleton, and
    (ii) at least one compound selected from the group consisting of
      (b) an organoaluminum oxy-compound, and
      (c) a compound which reacts with the transition metal compound (a) to form an ion pair,
  (2) the propylene polymer has a melt flow rate (MFR), as measured at 230° C. under a load of 2.16 kg, of 30 to 1,000 g/10 min, and
  (3) the propylene polymer has a molecular weight distribution (Mw/Mn), as measured by gel permeation chromatography (GPC), of 2 to 4;

a ratio ((A2)/(A1)) of the MFR of said propylene polymer (A2) to the MFR of said propylene polymer (A1) being not less than 30.

Such propylene polymer composition is excellent in not only heat resistance, rigidity and tensile elongation at break but also moldability.

The second propylene polymer composition of the invention comprises:

(A1) a propylene polymer, in an amount of 10 to 90 parts by weight, which is characterized in that:
  (1) the propylene polymer is obtained by polymerizing propylene in the presence of an olefin polymerization catalyst comprising:
    (i) (a) a compound of a Group IVB transition metal in the periodic table containing a ligand having a cyclopentadienyl skeleton, and
    (ii) at least one compound selected from the group consisting of
      (b) an organoaluminum oxy-compound, and
      (c) a compound which reacts with the transition metal compound (a) to form an ion pair,
  (2) the propylene polymer has a melt flow rate (MFR), as measured at 230° C. under a load of 2.16 kg, of 0.01 to 30 g/10 min, and
  (3) the propylene polymer has a molecular weight distribution (Mw/Mn), as measured by gel permeation chromatography (GPC), of 2 to 3;
(A2) a propylene polymer, in an amount of 10 to 90 parts by weight, which is characterized in that:
  (1) the propylene polymer is obtained by polymerizing propylene in the presence of an olefin polymerization catalyst comprising:
    (i) (a) a compound of a Group IVB transition metal in the periodic table containing a ligand having a cyclopentadienyl skeleton, and
    (ii) at least one compound selected from the group consisting of
      (b) an organoaluminum oxy-compound, and
      (c) a compound which reacts with the transition metal compound (a) to form an ion pair,
  (2) the propylene polymer has a melt flow rate (MFR), as measured at 230° C. under a load of 2.16 kg, of 30 to 1,000 g/10 min, and
  (3) the propylene polymer has a molecular weight distribution (Mw/Mn), as measured by gel permeation chromatography (GPC), of 2 to 4; and
(B) a soft polymer in an amount of 3 to 30 parts by weight;
a ratio ((A2)/(A1)) of the MFR of said propylene polymer (A2) to the MFR of said propylene polymer (A1) being not less than 30.

Such propylene polymer composition is excellent in not only heat resistance, rigidity and tensile elongation at break but also moldability and impact resistance.

The third propylene polymer composition of the invention comprises:
(A3) a propylene polymer, in an amount of 10 to 90% by weight, which is characterized in that:
  (1) the propylene polymer is obtained by polymerizing propylene in the presence of an olefin polymerization catalyst comprising:
    (d) a solid titanium catalyst component, and
    (e) an organometallic compound catalyst component,
  (2) the propylene polymer has a melt flow rate (MFR), as measured at 230° C. under a load of 2.16 kg, of 0.01 to 30 g/10 min, and
  (3) the propylene polymer has a molecular weight distribution (Mw/Mn), as measured by gel permeation chromatography (GPC), of 4 to 15; and
(A2) a propylene polymer, in an amount of 90 to 10% by weight, which is characterized in that:
  (1) the propylene polymer is obtained by polymerizing propylene in the presence of an olefin polymerization catalyst comprising:
    (i) (a) a compound of a Group IVB transition metal in the periodic table containing a ligand having a cyclopentadienyl skeleton, and
    (ii) at least one compound selected from the group consisting of
      (b) an organoaluminum oxy-compound, and
      (c) a compound which reacts with the transition metal compound (a) to form an ion pair,
  (2) the propylene polymer has a melt flow rate (MFR), as measured at 230° C. under a load of 2.16 kg, of 30 to 1,000 g/10 min, and
  (3) the propylene polymer has a molecular weight distribution (Mw/Mn), as measured by gel permeation chromatography (GPC), of 2 to 4.

Such propylene polymer composition is excellent in not only heat resistance, rigidity and tensile elongation at break but also moldability.

The fourth propylene polymer composition of the invention comprises:
(A3) a propylene polymer, in an amount of 10 to 90 parts by weight, which is characterized in that:
  (1) the propylene polymer is obtained by polymerizing propylene in the presence of an olefin polymerization catalyst comprising:
    (d) a solid titanium catalyst component, and
    (e) an organometallic compound catalyst component,
  (2) the propylene polymer has a melt flow rate (MFR), as measured at 230° C. under a load of 2.16 kg, of 0.01 to 30 g/10 min, and
  (3) the propylene polymer has a molecular weight distribution (Mw/Mn), as measured by gel permeation chromatography (GPC), of 4 to 15;
(A2) a propylene polymer, in an amount of 90 to 10 parts by weight, which is characterized in that:
  (1) the propylene polymer is obtained by polymerizing propylene in the presence of an olefin polymerization catalyst comprising:
    (i) (a) a compound of a Group IVB transition metal in the periodic table containing a ligand having a cyclopentadienyl skeleton, and
    (ii) at least one compound selected from the group consisting of
      (b) an organoaluminum oxy-compound, and
      (c) a compound which reacts with the transition metal compound (a) to form an ion pair,
  (2) the propylene polymer has a melt flow rate (MFR), as measured at 230° C. under a load of 2.16 kg, of 30 to 1,000 g/10 min, and
  (3) the propylene polymer has a molecular weight distribution (Mw/Mn), as measured by gel permeation chromatography (GPC), of 2 to 4; and
(B) a soft polymer in an amount of 3 to 30 parts by weight.

Such propylene polymer composition is excellent in not only heat resistance, rigidity and tensile elongation at break but also moldability and impact resistance.

The fifth propylene polymer composition of the invention comprises:
(A4) a propylene polymer, in an amount of 50 to 97% by weight, which is characterized in that:
  (1) the propylene polymer is obtained by polymerizing propylene in the presence of an olefin polymerization catalyst comprising:
    (d) a solid titanium catalyst component, and
    (e) an organometallic compound catalyst component,
  (2) the propylene polymer has a melt flow rate (MFR), as measured at 230° C. under a load of 2.16 kg, of 0.01 to 50 g/10 min,
  (3) the propylene polymer has a molecular weight distribution (Mw/Mn), as measured by gel permeation chromatography (GPC), of 4 to 15, and (4) the propylene polymer has a crystallinity, as measured by X-ray diffractometry, of not less than 50%; and (C) an ethylene/olefin random copolymer, in an amount of 3 to 50% by weight, which is characterized in that:
(1) the copolymer is obtained by copolymerizing ethylene and at least one monomer selected from α-olefins of 3 to 20 carbon atoms and polyenes of 5 to 20 carbon atoms in the presence of an olefin polymerization catalyst comprising:
(i) (f) a compound of a Group IVB transition metal in the periodic table containing a ligand having a cyclopentadienyl skeleton,
(ii) at least one compound selected from the group consisting of
(b) an organoaluminum oxy-compound, and
(g) a compound which reacts with the transition metal compound (f) to form an ion pair,
(2) the copolymer contains constituent units derived from ethylene in an amount of 20 to 80% by mol, and
(3) the copolymer has an intrinsic viscosity [η], as measured in decalin at 135° C., of 1.5 to 5 dl/g.

Such propylene polymer composition is excellent in not only heat resistance, rigidity and tensile elongation at break but also impact resistance, particularly low-temperature impact resistance.

The sixth propylene polymer composition of the invention comprises:

(A5) a propylene homopolymer, in an amount of 5 to 95% by weight, which is obtained by polymerizing propylene in the presence of an olefin polymerization catalyst comprising:
(i) (h) a transition metal compound represented by the following formula (I), and
(ii) at least one compound selected from the group consisting of
(b) an organoaluminum oxy-compound, and
(i) a compound which reacts with the transition metal compound (h) to form an ion pair; and
(A6) a propylene polymer, in an amount of 5 to 95% by weight, which contains constituent units derived from propylene in an amount of not less than 90% by mol and is different from the propylene homopolymer (A5);

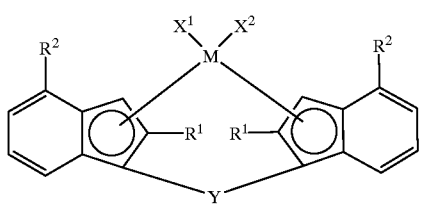
(I)

wherein M is a transition metal of Group IVa, Group Va or Group VIa of the periodic table; $R^1$ is a hydrocarbon group of 2 to 6 carbon atoms; $R^2$ is an aryl group of 6 to 16 carbon atoms which may be substituted with a halogen atom or a hydrocarbon group of 1 to 20 carbon atoms; $X^1$ and $X^2$ are each a hydrogen atom, a halogen atom, a hydrocarbon group of 1 to 20 carbon atoms, a halogenated hydrocarbon group of 1 to 20 carbon atoms, an oxygen-containing group or a sulfur-containing group; Y is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —NR$^3$—, —P(R$^3$)—, —P(O) (R$^3$)—, —BR$^3$— or —AlR$^3$— ($R^3$ is a hydrogen atom, a halogen atom, a hydrocarbon group of 1 to 20 carbon atoms or a halogenated hydrocarbon group of 1 to 20 carbon atoms).

Such propylene polymer composition is excellent in not only heat resistance, rigidity and tensile elongation at break but also moldability.

The seventh propylene polymer composition of the invention comprises:

(A5) a propylene homopolymer, in an amount of 5 to 95% by weight, which is obtained by polymerizing propylene in the presence of an olefin polymerization catalyst comprising:
(i) (h) a transition metal compound represented by the above formula (I), and
(ii) at least one compound selected from the group consisting of
(b) an organoaluminum oxy-compound, and
(i) a compound which reacts with the transition metal compound (h) to form an ion pair; and
(D) an olefin elastomer, in an amount of 5 to 95% by weight, which is characterized in that:
(1) the elastomer is a polymer or copolymer of at least one monomer selected from olefins of 2 to 20 carbon atoms and polyenes of 5 to 20 carbon atoms,
(2) the elastomer contains constituent units derived from ethylene, propylene, butene or 4-methyl-1-pentene in an amount of less than 90% by mol, and
(3) the elastomer has a glass transition temperature (Tg) of not higher than 10° C.

Such propylene polymer composition is excellent in not only heat resistance, rigidity and tensile elongation at break but also impact resistance.

The eighth propylene polymer composition of the invention comprises:

(A5) a propylene homopolymer, in an amount of 5 to 95% by weight, which is obtained by polymerizing propylene in the presence of an olefin polymerization catalyst comprising:
(i) (h) a transition metal compound represented by the above formula (I), and
(ii) at least one compound selected from the group consisting of
(b) an organoaluminum oxy-compound, and
(i) a compound which reacts with the transition metal compound (h) to form an ion pair; and
(E) an olefin polymer, in an amount of 5 to 95% by weight, which contains constituent units derived from one monomer selected from the group consisting of ethylene, butene and 4-methyl-1-pentene in an amount of not less than 90% by mol.

Such propylene polymer composition is excellent in heat resistance, rigidity and tensile elongation at break.

The ninth propylene polymer composition of the invention comprises:

(A5) a propylene homopolymer which is obtained by polymerizing propylene in the presence of an olefin polymerization catalyst comprising:
(i) (h) a transition metal compound represented by the above formula (I), and
(ii) at least one compound selected from the group consisting of
(b) an organoaluminum oxy-compound, and
(i) a compound which reacts with the transition metal compound (h) to form an ion pair;

(A6) a propylene polymer which contains constituent units derived from propylene in an amount of not less than 90% by mol and is different from the propylene homopolymer (A5); and (D) an olefin elastomer which is characterized in that:
  (1) the elastomer is a polymer or copolymer of at least one monomer selected from olefins of 2 to 20 carbon atoms and polyenes of 5 to 20 carbon atoms,
  (2) the elastomer contains constituent units derived from ethylene, propylene, butene or 4-methyl-1-pentene in an amount of less than 90% by mol, and
  (3) the elastomer has a glass transition temperature (Tg) of not higher than 10° C.;

said propylene polymer composition containing the propylene homopolymer (A5) in an amount of 5 to 95% by weight, the propylene polymer (A6) in an amount of not more than 95% by weight and the olefin elastomer (D) in an amount of not more than 95% by weight.

Such propylene polymer composition is excellent in not only heat resistance, rigidity and tensile elongation at break but also moldability and impact resistance.

The tenth propylene polymer composition of the invention comprises:

(A5) a propylene homopolymer which is obtained by polymerizing propylene in the presence of an olefin polymerization catalyst comprising:
  (i) (h) a transition metal compound represented by the above formula (I), and
  (ii) at least one compound selected from the group consisting of
    (b) an organoaluminum oxy-compound, and
    (i) a compound which reacts with the transition metal compound (h) to form an ion pair;

(A6) a propylene polymer which contains constituent units derived from propylene in an amount of not less than 90% by mol and is different from the propylene homopolymer (A5); and (E) an olefin polymer which contains constituent units derived from one monomer selected from the group consisting of ethylene, butene and 4-methyl-1-pentene in an amount of not less than 90% by mol;

said propylene polymer composition containing the propylene homopolymer (A5) in an amount of 5 to 95% by weight, the propylene polymer (A6) in an amount of not more than 95% by weight and the olefin polymer (E) in an amount of not more than 95% by weight.

Such propylene polymer composition is excellent in not only heat resistance, rigidity and tensile elongation at break but also moldability.

The eleventh propylene polymer composition of the invention comprises:

(A5) a propylene homopolymer which is obtained by polymerizing propylene in the presence of an olefin polymerization catalyst comprising:
  (i) (h) a transition metal compound represented by the above formula (I), and
  (ii) at least one compound selected from the group consisting of
    (b) an organoaluminum oxy-compound, and
    (i) a compound which reacts with the transition metal compound (h) to form an ion pair;

(D) an olefin elastomer which is characterized in that:
  (1) the elastomer is a polymer or copolymer of at least one monomer selected from olefins of 2 to 20 carbon atoms and polyenes of 5 to 20 carbon atoms,
  (2) the elastomer contains constituent units derived from ethylene, propylene, butene or 4-methyl-1-pentene in an amount of less than 90% by mol, and
  (3) the elastomer has a glass transition temperature (Tg) of not higher than 10° C.; and (E) an olefin polymer which contains constituent units derived from one monomer selected from the group consisting of ethylene, butene and 4-methyl-1-pentene in an amount of not less than 90% by mol;

said propylene polymer composition containing the propylene homopolymer (A5) in an amount of 5 to 95% by weight, the olefin elastomer (D) in an amount of not more than 95% by weight and the olefin polymer (E) in an amount of not more than 95% by weight.

Such propylene polymer composition is excellent in not only heat resistance, rigidity and tensile elongation at break but also impact resistance.

The twelfth propylene polymer composition of the invention comprises:

(A5) a propylene homopolymer which is obtained by polymerizing propylene in the presence of an olefin polymerization catalyst comprising:
  (i) (h) a transition metal compound represented by the above formula (I), and
  (ii) at least one compound selected from the group consisting of
    (b) an organoaluminum oxy-compound, and
    (i) a compound which reacts with the transition metal compound (h) to form an ion pair;

(A6) a propylene polymer which contains constituent units derived from propylene in an amount of not less than 90% by mol and is different from the propylene homopolymer (A5);

(D) an olefin elastomer which is characterized in that:
  (1) the elastomer is a polymer or copolymer of at least one monomer selected from olefins of 2 to 20 carbon atoms and polyenes of 5 to 20 carbon atoms,
  (2) the elastomer contains constituent units derived from ethylene, propylene, butene or 4-methyl-1-pentene in an amount of less than 90% by mol, and
  (3) the elastomer has a glass transition temperature (Tg) of not higher than 10° C.; and (E) an olefin polymer which contains constituent units derived from one monomer selected from the group consisting of ethylene, butene and 4-methyl-1-pentene in an amount of not less than 90% by mol;

said propylene polymer composition containing the propylene homopolymer (A5) in an amount of 5 to 95% by weight, the propylene polymer (A6) in an amount of not more than 95% by weight, the olefin elastomer (D) in an amount of not more than 95% by weight and the olefin polymer (E) in an amount of not more than 95% by weight.

Such propylene polymer composition is excellent in not only heat resistance, rigidity and tensile elongation at break but also moldability and impact resistance.

The thirteenth propylene polymer composition of the invention comprises:

(A7) a propylene copolymer, in an amount of 5 to 95% by weight, which is characterized in that:
  (1) the propylene copolymer is obtained by copolymerizing propylene and at least one α-olefin selected from ethylene and α-olefins of 4 to 20 carbon atoms in the presence of an olefin polymerization catalyst comprising:
    (i) (h) a transition metal compound represented by the above formula (I), and
    (ii) at least one compound selected from the group consisting of (b) an organoaluminum oxy-compound, and
(i) a compound which reacts with the transition metal compound (h) to form an ion pair, and
(2) the propylene copolymer contains constituent units derived from propylene in an amount of not less than 90% by mol; and (A6) a propylene polymer, in an amount of 5 to 95% by weight, which contains constituent units derived from propylene in an amount of not less than 90% by mol and is different from the propylene copolymer (A7).

Such propylene polymer composition is excellent in not only heat resistance, rigidity and tensile elongation at break but also moldability.

The fourteenth propylene polymer composition of the invention comprises:

(A7) a propylene copolymer, in an amount of 5 to 95% by weight, which is characterized in that:
(1) the propylene copolymer is obtained by copolymerizing propylene and at least one α-olefin selected from ethylene and α-olefins of 4 to 20 carbon atoms in the presence of an olefin polymerization catalyst comprising:
(i) (h) a transition metal compound represented by the above formula (I), and
(ii) at least one compound selected from the group consisting of
(b) an organoaluminum oxy-compound, and
(i) a compound which reacts with the transition metal compound (h) to form an ion pair, and
(2) the propylene copolymer contains constituent units derived from propylene in an amount of not less than 90% by mol; and (D) an olefin elastomer, in an amount of 5 to 95% by weight, which is characterized in that:
(1) the elastomer is a polymer or copolymer of at least one monomer selected from olefins of 2 to 20 carbon atoms and polyenes of 5 to 20 carbon atoms,
(2) the elastomer contains constituent units derived from ethylene, propylene, butene or 4-methyl-1-pentene in an amount of less than 90% by mol, and
(3) the elastomer has a glass transition temperature (Tg) of not higher than 10° C.

Such propylene polymer composition is excellent in not only heat resistance, rigidity and tensile elongation at break but also impact resistance.

The fifteenth propylene polymer composition of the invention comprises:

(A7) a propylene copolymer, in an amount of 5 to 95% by weight, which is characterized in that:
(1) the propylene copolymer is obtained by copolymerizing propylene and at least one α-olefin selected from ethylene and α-olefins of 4 to 20 carbon atoms in the presence of an olefin polymerization catalyst comprising:
(i) (h) a transition metal compound represented by the above formula (I), and
(ii) at least one compound selected from the group consisting of
(b) an organoaluminum oxy-compound, and
(i) a compound which reacts with the transition metal compound (h) to form an ion pair, and
(2) the propylene copolymer contains constituent units derived from propylene in an amount of not less than 90% by mol; and (E) an olefin polymer, in an amount of 5 to 95% by weight, which contains constituent units derived from one monomer selected from the group consisting of ethylene, butene and 4-methyl-1-pentene in an amount of not less than 90% by mol.

Such propylene polymer composition is excellent in heat resistance, rigidity and tensile elongation at break.

The sixteenth propylene polymer composition of the invention comprises:

(A7) a propylene copolymer which is characterized in that:
(1) the propylene copolymer is obtained by copolymerizing propylene and at least one α-olefin selected from ethylene and α-olefins of 4 to 20 carbon atoms in the presence of an olefin polymerization catalyst comprising:
(i) (h) a transition metal compound represented by the above formula (I), and
(ii) at least one compound selected from the group consisting of
(b) an organoaluminum oxy-compound, and
(i) a compound which reacts with the transition metal compound (h) to form an ion pair, and
(2) the propylene copolymer contains constituent units derived from propylene in an amount of not less than 90% by mol;

(A6) a propylene polymer which contains constituent units derived from propylene in an amount of not less than 90% by mol and is different from the propylene copolymer (A7); and (D) an olefin elastomer which is characterized in that:
(1) the elastomer is a polymer or copolymer of at least one monomer selected from olefins of 2 to 20 carbon atoms and polyenes of 5 to 20 carbon atoms,
(2) the elastomer contains constituent units derived from ethylene, propylene, butene or 4-methyl-1-pentene in an amount of less than 90% by mol, and
(3) the elastomer has a glass transition temperature (Tg) of not higher than 10° C.;

said propylene polymer composition containing the propylene copolymer (A7) in an amount of 5 to 95% by weight, the propylene polymer (A6) in an amount of not more than 95% by weight and the olefin elastomer (D) in an amount of not more than 95% by weight.

Such propylene polymer composition is excellent in not only heat resistance, rigidity and tensile elongation at break but also moldability and impact resistance.

The seventeenth propylene polymer composition of the invention comprises:

(A7) a propylene copolymer which is characterized in that:
(1) the propylene copolymer is obtained by copolymerizing propylene and at least one α-olefin selected from ethylene and α-olefins of 4 to 20 carbon atoms in the presence of an olefin polymerization catalyst comprising:
(i) (h) a transition metal compound represented by the above formula (I), and
(ii) at least one compound selected from the group consisting of
(b) an organoaluminum oxy-compound, and
(i) a compound which reacts with the transition metal compound (h) to form an ion pair, and
(2) the propylene copolymer contains constituent units derived from propylene in an amount of not less than 90% by mol;

(A6) a propylene polymer which contains constituent units derived from propylene in an amount of not less than 90% by mol and is different from the propylene copolymer (A7); and (E) an olefin polymer which contains constituent units derived from one monomer selected from the group consisting of ethylene, butene and 4-methyl-1-pentene in an amount of not less than 90% by mol;

said propylene polymer composition containing the propylene copolymer (A7) in an amount of 5 to 95% by weight, the propylene polymer (A6) in an amount of not more than 95% by weight and the olefin polymer (E) in an amount of not more than 95% by weight.

Such propylene polymer composition is excellent in not only heat resistance, rigidity and tensile elongation at break but also moldability.

The eighteenth propylene polymer composition of the invention comprises:

(A7) a propylene copolymer which is characterized in that:
  (1) the propylene copolymer is obtained by copolymerizing propylene and at least one α-olefin selected from ethylene and α-olefins of 4 to 20 carbon atoms in the presence of olefins polymerization catalyst comprising:
    (i) (h) a transition metal compound represented by the above formula (I), and
    (ii) at least one compound selected from the group consisting of
      (b) an organoaluminum oxy-compound, and
      (i) a compound which reacts with the transition metal compound (h) to form an ion pair, and
  (2) the propylene copolymer contains constituent units derived from propylene in an amount of not less than 90% by mol;

(D) an olefin elastomer which is characterized in that:
  (1) the elastomer is a polymer or copolymer of at least one monomer selected from olefins of 2 to 20 carbon atoms and polyenes of 5 to 20 carbon atoms,
  (2) the elastomer contains constituent units derived from ethylene, propylene, butene or 4-methyl-1-pentene in an amount of less than 90% by mol, and
  (3) the elastomer has a glass transition temperature (Tg) of not higher than 10° C.; and (E) an olefin polymer which contains constituent units derived from one monomer selected from the group consisting of ethylene, butene and 4-methyl-1-pentene in an amount of not less than 90% by mol;

said propylene polymer composition containing the propylene copolymer (A7) in an amount of 5 to 95% by weight, the olefin elastomer (D) in an amount of not more than 95% by weight and the olefin polymer (E) in an amount of not more than 95% by weight.

Such propylene polymer composition is excellent in not only heat resistance, rigidity and tensile elongation at break but also impact resistance.

The nineteenth propylene polymer composition of the invention comprises:

(A7) a propylene copolymer which is characterized in that:
  (1) the propylene copolymer is obtained by copolymerizing propylene and at least one α-olefin selected from ethylene and α-olefins of 4 to 20 carbon atoms in the presence of an olefin polymerization catalyst comprising:
    (i) (h) a transition metal compound represented by the above formula (I), and
    (ii) at least one compound selected from the group consisting of
      (b) an organoaluminum oxy-compound, and
      (i) a compound which reacts with the transition metal compound (h) to form an ion pair, and
  (2) the propylene copolymer contains constituent units derived from propylene in an amount of not less than 90% by mol;

(A6) a propylene polymer which contains constituent units derived from propylene in an amount of not less than 90% by mol and is different from the propylene copolymer (A7);

(D) an olefin elastomer which is characterized in that:
  (1) the elastomer is a polymer or copolymer of at least one monomer selected from olefins of 2 to 20 carbon atoms and polyenes of 5 to 20 carbon atoms,
  (2) the elastomer contains constituent units derived from ethylene, propylene, butene or 4-methyl-1-pentene in an amount of less than 90% by mol, and
  (3) the elastomer has a glass transition temperature (Tg) of not higher than 10° C.; and (E) an olefin polymer which contains constituent units derived from one monomer selected from the group consisting of ethylene, butene and 4-methyl-1-pentene in an amount of not less than 90% by mol;

said propylene polymer composition containing the propylene copolymer (A7) in an amount of 5 to 95% by weight, the propylene polymer (A6) in an amount of not more than 95% by weight, the olefin elastomer (D) in an amount of not more than 95% by weight and the olefin polymer (E) in an amount of not more than 95% by weight.

Such propylene polymer composition is excellent in not only heat resistance, rigidity and tensile elongation at break but also moldability and impact resistance.

DETAILED DESCRIPTION OF THE INVENTION

Figure 1:
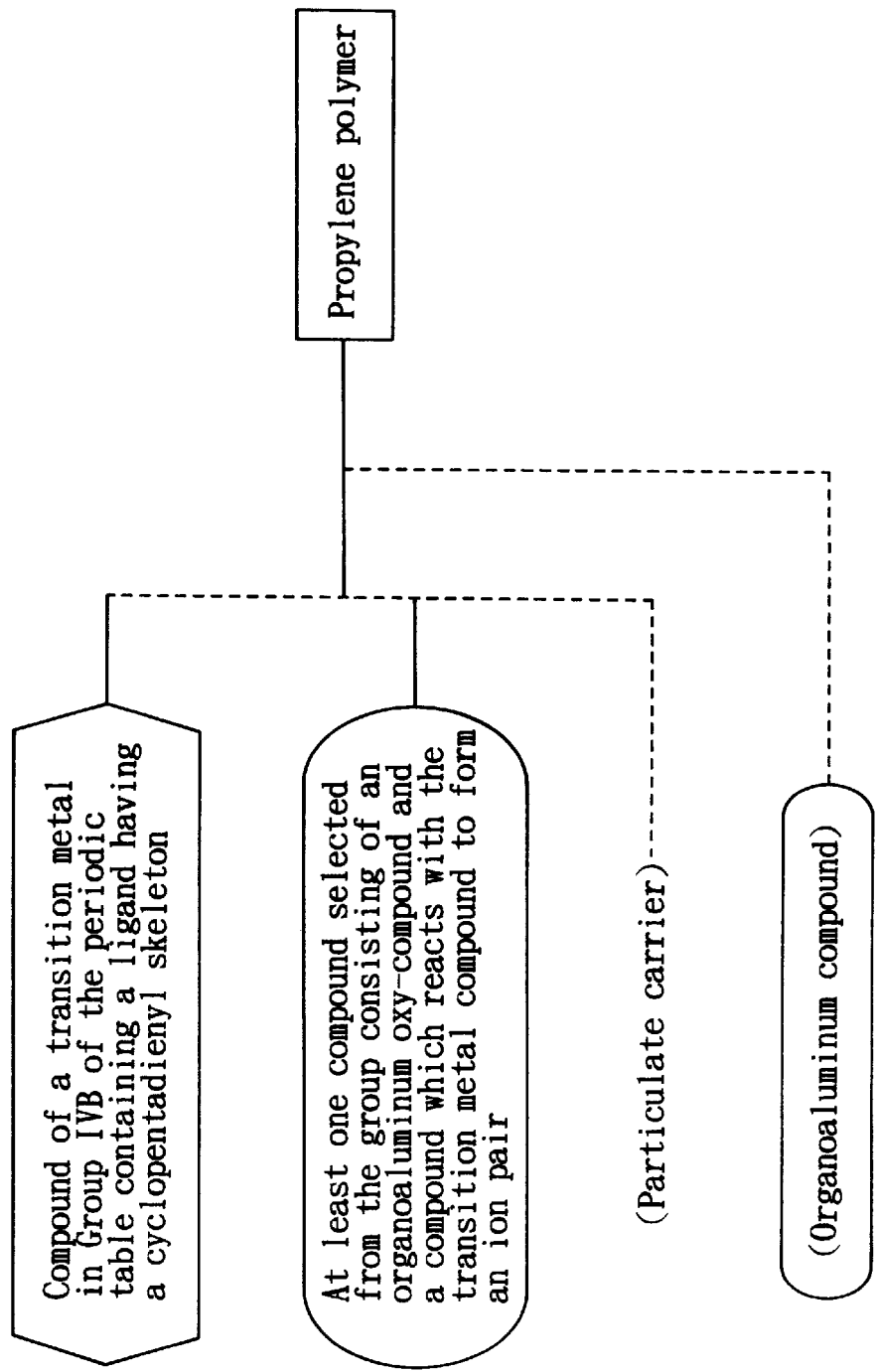
FIG. 1 is a view illustrating steps of a process for preparing an olefin polymerization catalyst which is used for the preparation of the propylene polymer (A1) and the propylene polymer (A2).

The propylene polymer compositions according to the present invention will be described in detail hereinafter.

The First Propylene Polymer Composition

The first propylene polymer composition comprises:

(A1) a propylene polymer which is characterized in that: the propylene polymer is obtained by polymerizing propylene in the presence of an olefin polymerization catalyst comprising:
  (i) (a) a compound of a Group IVB transition metal in the periodic table containing a ligand having a cyclopentadienyl skeleton, and (ii) at least one compound selected from the group consisting of
  (b) an organoaluminum oxy-compound, and
  (c) a compound which reacts with the transition metal compound (a) to form an ion pair,
the propylene polymer has a melt flow rate (MFR), as measured at 230° C. under a load of 2.16 kg, of 0.01 to 30 g/10 min, and
the propylene polymer has a molecular weight distribution (Mw/Mn), as measured by gel permeation chromatography (GPC), of 2 to 3; and (A2) a propylene polymer which is characterized in that:
the propylene polymer is obtained by polymerizing propylene in the presence of an olefin polymerization catalyst comprising:
  (i) (a) a compound of a Group IVB transition metal in the periodic table containing a ligand having a cyclopentadienyl skeleton, and
  (ii) at least one compound selected from the group consisting of
    (b) an organoaluminum oxy-compound, and
    (c) a compound which reacts with the transition metal compound (a) to form an ion pair,
the propylene polymer has a melt flow rate (MFR), as measured at 230° C. under a load of 2.16 kg, of 30 to 1,000 g/10 min, and
the propylene polymer has a molecular weight distribution (Mw/Mn), as measured by GPC, of 2 to 4.

In this propylene polymer composition, the ratio ((A2)/(A1)) of the MFR of said propylene polymer (A2) to the MFR of said propylene polymer (A1) is not less than 30.

Propylene Polymer (A1)

The propylene polymer (A1) for constituting the first propylene polymer composition is a propylene homopolymer or a propylene copolymer obtained by the use of an olefin polymerization catalyst comprising a transition metal compound (a) and at least one compound selected from the group consisting of an organoaluminum oxy-compound (b) and a compound (C), all compounds being described later.

The propylene polymer (A1) is desired to have MFR, as measured at 230° C. under a load of 2.16 kg, of 0.01 to 30 g/10 min, preferably 0.5 to 5.0 g/10 min, and Mw/Mn, as measured by GPC, of 2 to 3.

Further, the propylene polymer (A1) is desired to have an intrinsic viscosity [η] of 1.3 to 5.0 dl/g, preferably 2.0 to 4.0 dl/g, a weight-average molecular weight of $12 \times 10^4$ to $100 \times 10^4$, preferably $20 \times 10^4$ to $70 \times 10^4$, and a crystallinity, as measured by X-ray diffractometry, of not less than 40%, preferably not less than 50%.

The propylene polymer (A1) may contain constituent units derived from other monomers than propylene, such as ethylene and α-olefins of 4 to 20 carbon atoms, e.g., 1-butene, 1-pentene, 1-hexene, 4-methyl-1-pentene, 1-octene, 1-decene, 1-dodecene, 1-tetradecene, 1-hexadecene, 1-octadecene and 1-eicosene, in an amount of not more than 10% by mol.

Propylene Polymer (A2)

The propylene polymer (A2) for constituting the first propylene polymer composition is a propylene homopolymer or a propylene copolymer obtained by the use of an olefin polymerization catalyst comprising a transition metal compound (a) and at least one compound selected from the group consisting of an organoaluminum oxy-compound (b) and a compound (C), all compounds being described later.

The propylene polymer (A2) is desired to have MFR, as measured at 230° C. under a load of 2.16 kg, of 30 to 1,000 g/10 min, preferably 50 to 200 g/10 min, and Mw/Mn, as measured by GPC, of 2 to 4.

Further, the propylene polymer (A2) is desired to have an intrinsic viscosity [η] of not less than 0.5 and less than 1.3 dl/g, preferably not less than 0.8 and less than 1.3 dl/g, a weight-average molecular weight of $5 \times 10^3$ to $15 \times 10^4$, preferably $1 \times 10^4$ to $12 \times 10^4$, and a crystallinity, as measured by X-ray diffractometry, of not less than 40%, preferably not less than 50%.

The propylene polymer (A2) may contain constituent units derived from other monomers than propylene, which are exemplified for the propylene polymer (A1), in an amount of not more than 5% by mol.

Propylene Polymer Composition

The first propylene polymer composition comprises the propylene polymer (A1) and the propylene polymer (A2). In this composition, it is desired that the propylene polymer (A1) is contained in an amount of 10 to 90% by weight, preferably 30 to 70% by weight; and the propylene polymer (A2) is contained in an amount of 10 to 90% by weight, preferably 30 to 70% by weight. A ratio [(A2)/(A1)] of the MFR of the propylene polymer (A2) to the MFR of the propylene polymer (A1) is not less than 30, preferably in the range of 40 to 300, more preferably 50 to 100.

The first propylene polymer composition is desired to have MFR, as measured at 230° C. under a load of 2.16 kg, of 1 to 100 g/10 min, preferably 5 to 50 g/10 min. In this composition, Mw/Mn of all the propylene components for constituting the composition is desirably in the range of 4 to 15.

The density of the first propylene polymer composition is desired to be in the range of 0.89 to 0.92 g/cm$^3$, preferably 0.90 to 0.92 g/cm$^3$.

The heat distortion temperature (HDT) thereof is desired to be not lower than 95° C., preferably in the range of 100 to 140° C.

The flexural modulus (FM) thereof is desired to be in the range of 12,000 to 19,000 kg/cm$^2$, preferably 14,000 to 18,000 kg/cm$^2$.

The Izod impact strength (IZ) thereof at 23° C. is desired to be in the range of 2 to 4 kg·cm/cm, preferably 2 to 3 kg·cm/cm.

The tensile elongation at break (EL) thereof is desired to be in the range of 100 to 500%, preferably 200 to 400%.

The first propylene polymer composition may contain additives, if necessary, such as weathering stabilizer, heat stabilizer, antistatic agent, anti-slip agent, anti-blocking agent, anti-fogging agent, lubricant, pigment, dye, nucleating agent, plasticizer, anti-aging agent, hydrochloric acid absorber and antioxidant, with the proviso that the object of the invention is not marred.

The first propylene polymer composition can be prepared by conventionally known processes, for example, by the following ones.

(1) A process comprising mechanically blending the propylene polymer (A1), the propylene polymer (A2) and, if desired, other components by means of an extruder, a kneader, etc.

(2) A process comprising dissolving the propylene polymer (A1), the propylene polymer (A2) and, if desired, other components in an appropriate good solvent (e.g., hydrocarbon solvents such as hexane, heptane, decane, cyclohexane, benzene, toluene and xylene), and removing the solvent.

(3) A process comprising individually dissolving the propylene polymer (A1), the propylene polymer (A2) and, if desired, other components in appropriate good solvents respectively to give solutions, then mixing the solutions, and removing the solvent.

(4) A process comprising conducting the above processes (1) to (3) in combination.

(5) A process comprising conducting the polymerization in two or more steps having different reaction conditions, in the first step of which the propylene polymer (A1) is prepared, and in another step of which the propylene polymer (A2) is prepared; alternatively, comprising using plural polymerizers, in one polymerizer of which the propylene polymer (A1) is prepared, and in another polymerizer of which the propylene polymer (A2) is prepared.

The first propylene polymer composition as mentioned above is excellent in not only heat resistance, rigidity and tensile elongation at break but also moldability. Further, since the amount of the catalyst residue in the polymer composition is small, the article molded from the composition is never colored and is good in sanitariness.

Next, the olefin polymerization catalyst used in the preparation of the propylene polymer (A1) and the propylene polymer (A2) and the process for preparing the propylene polymer (A1) and the propylene polymer (A2) are described.

The propylene polymer (A1) and the propylene polymer (A2) can be prepared by polymerizing propylene in the presence of an olefin polymerization catalyst [olefin polymerization catalyst (1)] comprising:

(i) (a) a compound of a Group IVB transition metal in the periodic table containing a ligand having a cyclopentadienyl skeleton, and (ii) at least one compound selected from the group consisting of (b) an organoaluminum oxy-compound, and (c) a compound which reacts with the transition metal compound (a) to form an ion pair.

FIG. 1 illustrates steps of a process for preparing the olefin polymerization catalyst which is used for the preparation of the propylene polymer (A1) and the propylene polymer (A2).

Examples of the compound (a) of the Group IVB transition metal of the periodic table which contains a ligand having a cyclopentadienyl skeleton include the transition metal compound represented by the following formula (Ia) and the transition metal compound represented by the following formula (I).

$$ML_x \quad (Ia)$$

wherein M is a transition metal atom selected from the group consisting of titanium, zirconium, hafnium, vanadium, niobium, tantalum and chromium, preferably titanium, zirconium or hafnium, and x is a valence of the transition metal atom.

L is a ligand coordinating to the transition metal, at least one of L is a ligand having a cyclopentadienyl skeleton, and preferably at least two of L are ligands having a cyclopentadienyl skeleton.

The ligands having a cyclopentadienyl skeleton are, for example, cyclopentadienyl group, indenyl group, 4,5,6,7-tetrahydroindenyl group, 4,5,6,6a-tetrahydropentarenyl group, 7,8-dihydro-3H.6H-as-indacenyl group and fluorenyl group. These groups as exemplified above may be substituted with an alkyl group, an aryl group, an aralkyl group, a trialkylsilyl group, a halogen atom, an alkoxy group, an aryloxy group, a linear alkylene group or a cyclic alkylene group. Further, these groups having a cyclopentadienyl skeleton may form ring condensate with benzene ring, naphthalene ring, acenaphthene ring or indene ring.

Of the ligands coordinating with the transition metal atom, preferred is a ligand having an indenyl skeleton, and particularly preferred is ligand having a substituted indenyl skeleton.

When the transition metal compound represented by the above general formula (Ia) contains 2 or more ligands each having a cyclopentadienyl skeleton, the two ligands out of them may be linked together through an alkylene group such as ethylene or propylene;

a substituted alkylene group such as 1,2-di(methyl) ethylene;

a cycloalkylene group such as 1,4-cyclohexylene or 1,3-cyclopentylene;

a substituted alkylidene group such as isopropylidene or diphenylmethylene;

a silylene group;

a substituted silylene group such as dimethylsilylene, diphenylsilylene or methylphenylsilylene;

a germyl group;

—P($R^a$)—, —P(O)($R^b$)—, $SO_2N$—($R^c$)— or $Sn(Rd_2)$— [wherein each of $R^a$, $R^c$ and $R^d_2$ is an alkyl group, and $R^b$ is an aryl group].

Of these, particularly preferred is ligand linked together through a substituted silylene group such as dimethylsilylene group, diphenylsilylene group or methylphenylsilylene group.

Example the ligands L other than those having a cyclopentadienyl skeleton may include a hydrocarbon group of 1–10 carbon atoms such as an alkyl group (e.g. methyl group, ethyl group, propyl group, isopropyl group, butyl group, propyl group, pentyl group or neopentyl group), a cycloalkyl group (e.g. cyclopentyl group or cyclohexyl group), an aryl group (e.g. phenyl group, tolyl group or mesityl group) and an aralkyl group (e.g. benzyl or neophyl), an alkoxy group of 1–10 carbon atoms such as methoxy group, ethoxy group, propoxy group or butoxy group, an aryloxy group of 6–10 carbon atoms such as phenoxy group, a ligand represented by —$OSO_2R^e$ or —$CH_2SiR^e_3$ (wherein $R^e$ is a hydrocarbon group of 1–10 carbon atoms) such as mesitylsulfonate, phenylsulfonate, benzylsulfonate, methylsulfonate, p-toluenesulfonate or trifluoromethanesulfonate, a halogen atom such as fluorine, chlorine, bromine or iodine, and hydrogen atom.

When the transition metal compound contains 2 or more ligands other than those having a cyclopentadienyl skeleton, each ligand may be the same or different.

When the valence of the transition metal atom is, for example, 4, the transition metal compound represented by the above formula (Ia) is represented by the following formula (Ib) in more detail.

$$R^4_k R^5_l R^6_m R^7_n M \quad (Ib)$$

wherein M represents the above mentioned transition metal atom, $R^4$ represents a ligand having a cyclopentadienyl skeleton as in the above formula (Ia), $R^5$, $R^6$ and $R^7$ each represent a ligand having a cyclopentadienyl skeleton or a ligand L other than those having a cyclopentadienyl skeleton, k is an integer of 1 or more, and k+l+m+n=4.

In the present invention, there is used preferably a transition metal compound having the above-mentioned formula (Ib) in which at least two of $R^4$, $R^5$, $R^6$ and $R^7$ are the substituted indenyl groups. In this case, these groups are prefereably linked together through a group as in the above formula (Ia).

Exemplified below are the transition metal compounds wherein M is zirconium.

rac-ethylene-bis{1-(2-methylindenyl)}zirconium dichloride,
rac-dimethylsilylene-bis{1-(2-methylindenyl)}zirconium dichloride,
rac-dimethylsilylene-bis{1-(2-methylindenyl)}zirconium dihydride,
rac-dimethylsilylene-bis{1-(2-methylindenyl)}zirconium difluoride,
rac-dimethylsilylene-bis{1-(2-methylindenyl)}zirconium dibromide,
rac-dimethylsilylene-bis{1-(2-methylindenyl)}zirconium diiodide,
rac-dimethylsilylene-bis{1-(2-methylindenyl)}zirconium dimethoxide,
rac-dimethylsilylene-bis{1-(2-methylindenyl)}zirconium di-n-butoxide,
rac-dimethylsilylene-bis{1-(2-methylindenyl)}zirconium diphenoxide,
rac-dimethylsilylene-bis{1-(2-methylindenyl)}zirconium di-t-butoxide,
rac-dimethylsilylene-bis{1-(2-methylindenyl)}zirconium dimethyl,
rac-dimethylsilylene-bis{1-(2-methylindenyl)}zirconium dineopentyl,
rac-dimethylsilylene-bis{1-(2-methylindenyl)}zirconium ditrimethylsilylmethyl,
rac-dimethylsilylene-bis{1-(2-methylindenyl)}zirconium ditosylate,
rac-dimethylsilylene-bis{1-(2-methylindenyl)}zirconium dimesilate,
rac-dimethylsilylene-bis{1-(2-methylindenyl)}zirconium di(mesitylsulfonate),
rac-dimethylsilylene-bis{1-(2-methylindenyl)}zirconium di(phenylsulfonate),
rac-dimethylsilylene-bis{1-(2-methylindenyl)}zirconium di(benzylsulfonate),
rac-dimethylsilylene-bis{1-(2-methylindenyl)}zirconium di(trifluoromethanesulfonate),
rac-dimethylsilylene-bis{1-(2-methylindenyl)}zirconium monochloride monohydride,
rac-dimethylsilylene-bis{1-(2-methylindenyl)}zirconium monochloride monofluoride,
rac-dimethylsilylene-bis{1-(2-methylindenyl)}zirconium monochloride monobromide,
rac-dimethylsilylene-bis{1-(2-methylindenyl)}zirconium monochloride monoiodide,
rac-dimethylsilylene-bis{1-(2-methylindenyl)}zirconium monochloride monomethoxide,
rac-dimethylsilylene-bis{1-(2-methylindenyl)}zirconium monochloride mono-n-butoxide,
rac-dimethylsilylene-bis{1-(2-methylindenyl)}zirconium monochloride monophenoxide,
rac-dimethylsilylene-bis{1-(2-methylindenyl)}zirconium monochloride mono-t-butoxide,
rac-dimethylsilylene-bis{1-(2-methylindenyl)}zirconium monochloride monomethyl,
rac-dimethylsilylene-bis{1-(2-methylindenyl)}zirconium monochloride mononeopentyl,
rac-dimethylsilylene-bis{1-(2-methylindenyl)}zirconium monochloride monotrimethylsilylmethyl,
rac-dimethylsilylene-bis{1-(2-methylindenyl)}zirconium monochloride monotosylate,
rac-dimethylsilylene-bis{1-(2-methylindenyl)}zirconium monochloride monomesilate,
rac-dimethylsilylene-bis{1-(2-methylindenyl)}zirconium monochloride mono(mesitylsulfonate),
rac-dimethylsilylene-bis{1-(2-methylindenyl)}zirconium monochloride mono(phenylsulfonate),
rac-dimethylsilylene-bis{1-(2-methylindenyl)}zirconium monochloride mono(benzylsulfonate),
rac-dimethylsilylene-bis{1-(2-methylindenyl)}zirconium monochloride mono(trifluoromethanesulfonate),
rac-diphenylsilylene-bis{1-(2-methylindenyl)}zirconium dichloride,
rac-methylphenylsilylene-bis{1-(2-methylindenyl)}zirconium dichloride,
rac-silylene-bis{1-(2-methylindenyl)}zirconium dichloride,
rac-dimethylgermylene-bis{1-(2-methylindenyl)}zirconium dichloride,
rac-phenylphosphinylene-bis{1-(2-methylindenyl)}zirconium dichloride,
rac-ethylene-bis{1-(2,4-dimethylindenyl)}zirconium dichloride,
rac-ethylene-bis{1-(2-methyl, 4-isopropylindenyl)}zirconium dichloride,
rac-dimethylsilylene-bis{1-(2,4-dimethylindenyl)}zirconium dichloride,
rac-dimethylsilylene-bis{1-(2-methyl, 4-ethylindenyl)}zirconium dichloride,
rac-dimethylsilylene-bis{1-(2-methyl, 4-n-propylindenyl)}zirconium dichloride,
rac-dimethylsilylene-bis{1-(2-methyl, isopropylindenyl)}zirconium dichloride,
rac-dimethylsilylene-bis{1-(2-methyl, 4-n-butylindenyl)}zirconium dichloride,
rac-dimethylsilylene-bis{1-(2-methyl, 4-i-butylindenyl)}zirconium dichloride,
rac-dimethylsilylene-bis{1-(2-methyl, 4-t-butylindenyl)}zirconium dichloride,
rac-dimethylsilylene-bis{1-(2-methyl, 4-trimethylsilylindenyl)}zirconium dichloride,
rac-dimethylsilylene-bis{1-(2-ethyl, 4-isopropylindenyl)}zirconium dichloride,
rac-dimethylsilylene-bis{1-(2-n-propyl, 4-isopropylindenyl)}zirconium dichloride,
rac-dimethylsilylene-bis{1-(2-i-propyl, 4-isopropylindenyl)}zirconium dichloride,
rac-dimethylsilylene-bis{1-(2-n-butyl, 4-isopropylindenyl)}zirconium dichloride,
rac-dimethylsilylene-bis{1-(2-i-butyl, 4-isopropylindenyl)}zirconium dichloride,
rac-dimethylsilylene-bis{1-(2-t-butyl, 4-isopropylindenyl)}zirconium dichloride,
rac-dimethylsilylene-bis{1-(2-trimethylsilyl, 4-isopropylindenyl)}zirconium dichloride,
rac-dimethylsilylene-bis{1-(2-phenyl, 4-isopropylindenyl)}zirconium dichloride,
rac-diphenylsilylene-bis{1-(2,4-dimethylindenyl)}zirconium dichloride,
rac-diphenylsilylene-bis{1-(2-methyl, 4-isopropylindenyl)}zirconium dichloride, rac-methylphenylsilylene-bis{1-(2,4-dimethylindenyl)}zirconium dichloride,
rac-methylphenylsilylene-bis{1-(2-methyl,4-isopropylindenyl)}zirconium dichloride,
rac-ethylene-bis{1-(2,5-dimethylindenyl)}zirconium dichloride,
rac-ethylene-bis{1-(2-methyl, 5-isopropylindenyl)}zirconium dichloride,
rac-dimethylsilylene-bis{1-(2,5-dimethylindenyl)}zirconium dichloride,
rac-dimethylsilylene-bis{1-(2-methyl, 5-isopropylindenyl)}zirconium dichloride,
rac-diphenylsilylene-bis{1-(2,5-dimethylindenyl)}zirconium dichloride,
rac-diphenylsilylene-bis{1-(2-methyl, 5-isopropylindenyl)}zirconium dichloride,
rac-methylphenylsilylene-bis{1-(2,5-dimethylindenyl)}zirconium dichloride,
rac-methylphenylsilylene-bis{1-(2-methyl, 5-isopropylindenyl)}zirconium dichloride,
rac-ethylene-bis{1-(2,6-dimethylindenyl)}zirconium dichloride,
rac-ethylene-bis{1-(2-methyl, 6-isopropylindenyl)}zirconium dichloride,
rac-dimethylsilylene-bis{1-(2,6-dimethylindenyl)}zirconium dichloride,
rac-dimethylsilylene-bis{1-(2-methyl, 6-isopropylindenyl)}zirconium dichloride,
rac-diphenylsilylene-bis{1-(2,6-dimethylindenyl)}zirconium dichloride,
rac-diphenylsilylene-bis{1-(2-methyl, 6-isopropylindenyl)}zirconium dichloride,
rac-methylphenylsilylene-bis{1-(2,6-dimethylindenyl)}zirconium dichloride,
rac-methylphenylsilylene-bis{1-(2-methyl, 6-isopropylindenyl)}zirconium dichloride,
rac-ethylene-bis{1-(2,4,5-trimethylindenyl)}zirconium dichloride,
rac-ethylene-bis{1-(2-isopropyl-4,5-dimethylindenyl)}zirconium dichloride,
rac-dimethylsilylene-bis{1-(2,4,5-trimethylindenyl)}zirconium dichloride,
rac-diphenylsilylene-bis{1-(2,4,5-trimethylindenyl)}zirconium dichloride,
rac-methylphenylsilylene-bis{1-(2,4,5-trimethylindenyl)}zirconium dichloride,
rac-ethylene-bis{1-(2,5,6-trimethylindenyl)}zirconium dichloride,
rac-dimethylsilylene-bis{1-(2,5,6-trimethylindenyl)}zirconium dichloride,
rac-diphenylsilylene-bis{1-(2,5,6-trimethylindenyl)}zirconium dichloride,
rac-methylphenylsilylene-bis{1-(2,5,6-trimethylindenyl)}zirconium dichloride,
rac-ethylene-bis{1-(2-methyl-5-t-butylindenyl)}zirconium dichloride,
rac-dimethylsilylene-bis{1-(2-methyl-5-t-butylindenyl)}zirconium dichloride,
rac-diphenylsilylene-bis{1-(2-methyl-5-t-butylindenyl)}zirconium dichloride,
rac-methylphenylsilylene-bis{1-(2-methyl-5-t-butylindenyl)}zirconium dichloride,
rac-ethylene-bis{1-(2-methyl-6-t-butylindenyl)}zirconium dichloride,
rac-dimethylsilylene-bis{1-(2-methyl-6-t-butylindenyl)}zirconium dichloride,
rac-diphenylsilylene-bis{1-(2-methyl-6-t-butylindenyl)}zirconium dichloride,
rac-methylphenylsilylene-bis{1-(2-methyl-6-t-butylindenyl)}zirconium dichloride,
rac-ethylene-bis{1-(2-methyl-5,6-di-t-butylindenyl)}zirconium dichloride,
rac-dimethylsilylene-bis{1-(2-methyl-5,6-di-t-butylindenyl)}zirconium dichloride,
rac-diphenylsilylene-bis{1-(2-methyl-5,6-di-t-butylindenyl)}zirconium dichloride,
rac-methylphenylsilylene-bis{1-(2-methyl-5,6-di-t-butylindenyl)}zirconium dichloride,
rac-ethylene-bis{1-(2-methyl-5-trimethylsilylindenyl)}zirconium dichloride,
rac-dimethylsilylene-bis{1-(2-methyl-5-trimethylsilylindenyl)}zirconium dichloride,
rac-diphenylsilylene-bis{1-(2-methyl-5-trimethylsilylindenyl)}zirconium dichloride,
rac-methylphenylsilylene-bis{1-(2-methyl-5-trimethylsilylindenyl)}zirconium dichloride,
rac-ethylene-bis{1-(2-methyl-6-trimethylsilylindenyl)}zirconium dichloride,
rac-dimethylsilylene-bis{1-(2-methyl-6-trimethylsilylindenyl)}zirconium dichloride,
rac-diphenylsilylene-bis{1-(2-methyl-6-trimethylsilylindenyl)}zirconium dichloride,
rac-methylphenylsilylene-bis{1-(2-methyl-6-trimethylsilylindenyl)}zirconium dichloride,
rac-ethylene-bis{1-(2-methyl-5,6-bistrimethylsilylindenyl)}zirconium dichloride,
rac-dimethylsilylene-bis{1-(2-methyl-5,6-bistrimethylsilylindenyl)}zirconium dichloride,
rac-diphenylsilylene-bis{1-(2-methyl-5,6-bistrimethylsilylindenyl)}zirconium dichloride,
rac-methylphenylsilylene-bis{1-(2-methyl-5,6-bistrimethylsilylindenyl)}zirconium dichloride,
rac-ethylene-bis{1-(2-methyl-5,6-bistriphenylsilylindenyl)}zirconium dichloride,
rac-dimethylsilylene-bis{1-(2-methyl-5,6-bistriphenylsilylindenyl)}zirconium dichloride,
rac-ethylene-bis{1-(2-methyl-4-methoxyindenyl)}zirconium dichloride,
rac-dimethylsilylene-bis{1-(2-methyl-4-methoxyindenyl)}zirconium dichloride,
rac-diphenylsilylene-bis{1-(2-methyl-4-methoxyindenyl)}zirconium dichloride,
rac-methylphenylsilylene-bis{1-(2-methyl-4-methoxyindenyl)}zirconium dichloride,
rac-dimethylsilylene-bis{1-(2-methyl-5-methoxyindenyl)}zirconium dichloride,
rac-dimethylsilylene-bis{1-(2-methyl-6-methoxyindenyl)}zirconium dichloride,
rac-ethylene-bis{1-(2-methyl-5,6-dimethoxyindenyl)}zirconium dichloride, ethylene-bis{1-(2-methyl-4,5,6,7-tetrahydroindenyl)}zirconium dichloride,
dimethylsilylene-bis{1-(4,5,6,7-tetrahydroindenyl)}zirconium dichloride,
dimethylsilylene-bis{1-(2-methyl-4,5,6,7-tetrahydroindenyl)}zirconium dichloride, dimethylsilylene-bis{1-(2-methylcyclopentadienyl)}zirconium dichloride, dimethylsilylene-bis{1-(3-methylcyclopentadienyl)}zirconium dichloride, dimethylsilylene-bis{1-(4-methylcyclopentadienyl)}zirconium dichloride, dimethylsilylene-bis{1-(5-methylcyclopentadienyl)}zirconium dichloride, dimethylsilylene-bis{1-(2,4-dimethylcyclopentadienyl)}zirconium dichloride, dimethylsilylene-bis{1-(2,5-dimethylcyclopentadienyl)}zirconium dichloride, dimethylsilylene-bis{1-(2,4,5-trimethylcyclopentadienyl)}zirconium dichloride,

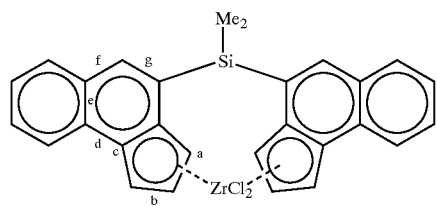

dimethylsilylene-bis(benzo[e]indenyl)zirconium dichloride

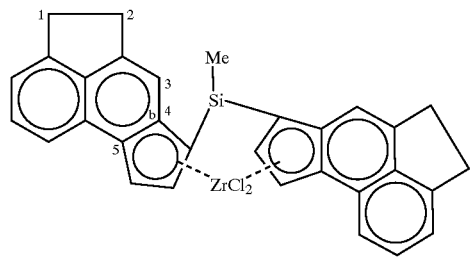

dimethylsilylene-bis(1,2-dihydroacenaphthylo[4,5-b]cyclopentadienyl)zirconium dichloride

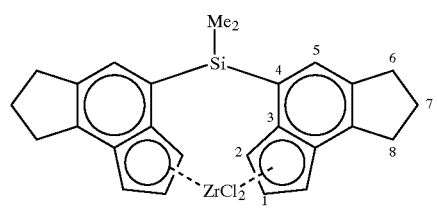

dimethylsilylene-bis(7,8-dihydro-3h, 6h-3-as-indathenyl)zirconium dichloride

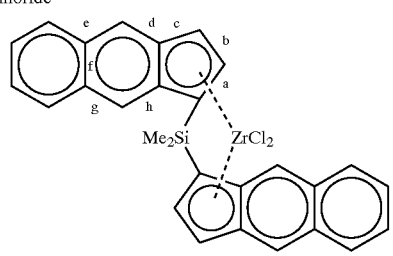

dimethylsilylene-bis(benzo[f]indenyl)zirconium dichloride

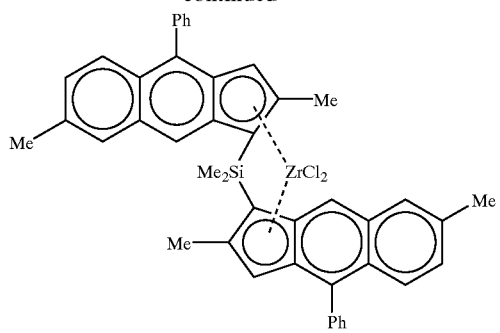

dimethylsilylene-bis{1-(toluo[4,3-f]-2-methyl-4-phenylindenyl)}zirconium dichloride

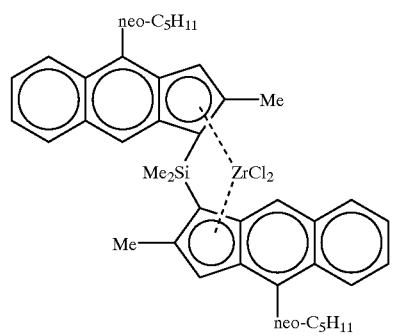

dimethylsilylene-bis{1-(benzo[f]-2-methyl-4-neopentylindenyl)zirconium dichloride There may also be used the compounds obtained by substituting titanium, hafnium, vanadium, niobium, tantalum or chromium for zirconium in the above-exemplified zirconium compounds.

Of the transition metal compounds represented by the aforesaid formula (Ia), preferred are those having zirconium as the central metal atom and having at least two ligands containing an indenyl skeleton.

In the present invention, transition metal compounds preferably used as the transition metal compound (a) are those represented by the following formula (I):

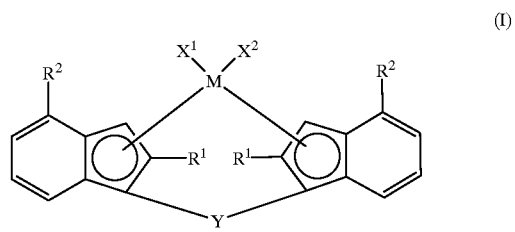

(I)

wherein M is a transition metal atom of Group IVa, Group Va and Group VIa of the periodic table. Examples the transition metal atoms include titanium, zirconium, hafnium, vanadium, niobium, tantalum, chromium, molybdenum and tungsten. Of these, preferred are titanium, zirconium and hafnium, and particularly preferred is zirconium.

$R^1$ is a hydrocarbon group of 2 to 6 carbon atoms. Examples of the hydrocarbon groups include an alkyl group such as ethyl, n-propyl, isopropyl, n-butyl, isobutyl, sec-butyl, tert-butyl, n-pentyl, neopentyl, n-hexyl and cyclohexyl; and an alkenyl group such as vinyl and propenyl.

Of these, preferred are alkyl groups whose carbon bonded to the indenyl group is primary carbon, more preferred are alkyl groups of 2 to 4 carbon atoms whose carbon bonded to the indenyl group is primary carbon, and particularly preferred is ethyl.

$R^2$ is an aryl group of 6 to 16 carbon atoms. Examples of the aryl groups include phenyl, α-naphthyl, β-naphthyl, anthracenyl, phenanthryl, pyrenyl, acenaphthyl, phenarenyl, aceanthryrenyl, tetrahydronaphthyl and indanyl. Of these, preferred are phenyl, naphthyl, anthracenyl and phenanthryl.

These aryl groups may be substituted with:

halogen atoms, such as fluorine, chlorine, bromine and iodine;

hydrocarbon groups of 1 to 20 carbon atoms, such as alkyl groups (e.g., methyl, ethyl, propyl, butyl, hexyl cyclohexyl, octyl, nonyl, dodecyl, icosyl, norbornyl and adamantyl), alkenyl groups (e.g., vinyl, propenyl and cyclohexenyl), arylalkyl groups (e.g., benzyl, phenylethyl and phenylpropyl) and aryl groups (e.g., phenyl, tolyl, dimethylphenyl, trimethylphenyl, ethylphenyl, propylphenyl, biphenyl, naphthyl, methylnaphthyl, anthracenyl and phenanthryl); and organosilyl groups, such as trimethylsilyl, triethylsilyl and triphenylsilyl.

$X^1$ and $X^2$ are each a hydrogen atom, a halogen atom, a hydrocarbon group of 1 to 20 carbon atoms, a halogenated hydrocarbon group of 1 to 20 carbon atoms, an oxygen-containing group or a sulfur-containing group. As the halogen atom and the hydrocarbon group of 1 to 20 carbon atoms, the aforesaid atoms and groups can be exemplified. As the halogenated hydrocarbon group of 1 to 20 carbon atoms, groups obtained by substituting the aforesaid hydrocarbon groups with halogen atoms can be exemplified.

Examples of the oxygen-containing groups include hydroxy group; alkoxy groups such as methoxy, ethoxy, propoxy and butoxy; aryloxy groups such as phenoxy, methylphenoxy, dimethylphenoxy and naphthoxy; and arylalkoxy groups such as phenylmethoxy and phenylethoxy.

Examples of the sulfur-containing groups include substituents obtained by substituting sulfur for oxygen in the above-mentioned oxygen-containing groups; sulfonate groups such as methylsulfonate, trifluoromethanesulfonate, phenylsulfonate, benzylsulfonate, p-toluenesulfonate, trimethylbenzenesulfonate, triisobutylbenzenesulfonate, p-chlorobenzenesulfonate and pentafluorobenzenesulfonate; and sulfinate groups such as methylsulfinate, phenylsulfinate, benzenesulfinate, p-toluenesulfinate, trimehtylbenzenesulfinate and pentafluorobenzenesulfinate.

Of these, preferred are halogen atoms and hydrocarbon groups of 1 to 20 carbon atoms.

Y is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —NR$^3$—, —P(R$^3$)—, —P(O) (R$^3$)—, —BR$^3$— or —AlR$^3$— (R$^3$ is a hydrogen atom, a halogen atom, a hydrocarbon group of 1 to 20 carbon atoms or a halogenated hydrocarbon group of 1 to 20 carbon atoms). More specifically, there can be mentioned:

divalent hydrocarbon groups of 1 to 20 carbon atoms, such as alkylene groups, e.g., methylene, dimethylmethylene, 1,2-ethylene, dimethyl-1,2-ethylene, 1,3-trimethylene, 1,4-tetramethylene and 1,2-cyclohexylene, 1,4-cyclohexylene, and arylalkylene groups, e.g., diphenylmethylene and diphenyl-1,2-ethylene;

halogenated hydrocarbon groups obtained by halogenating the above-mentioned divalent hydrocarbon groups of 1 to 20 carbon atoms, such as chloromethylene;

divalent silicon-containing groups, such as alkylsilylene, alkylarylsilylene and arylsilylene groups, e.g., methylsilylene, dimethylsilylene, diethylsilylene, di(n-propyl)silylene, di(i-propyl)silylene, di(cyclohexyl) silylene, methylphenylsilylene, diphenylsilylene, di(p-tolyl)silylene and di(p-chlorophenyl)silylene, and alkyldisilyl, alkylaryldisilyl and aryldisilyl groups, e.g., tetramethyl-1,2-disilyl and tetraphenyl-1,2-disilyl;

divalent germanium-containing groups obtained by substituting germanium for silicon in the above-mentioned divalent silicon-containing groups; and divalent tin-containing groups obtained by substituting tin for silicon in the above-mentioned divalent silicon-containing groups.

$R^3$ is the same halogen atom, the same hydrocarbon group of 1 to 20 carbon atoms or the same halogenated hydrocarbon group of 1 to 20 carbon atoms as described above.

Of these, preferred are divalent silicon-containing groups, divalent germanium-containing groups and divalent tin-containing groups; more preferred are divalent silicon-containing groups; and most preferred are alkylsilylene, alkylarylsilylene and arylsilylene.

Exemplified below are the transition metal compounds represented by the above formula (I).

rac-dimethylsilylene-bis{1-(2-ethyl-4-phenylindenyl) }zirconium dichloride, rac-dimethylsilylene-bis{1-(2-ethyl-4-(α-naphthyl) indenyl)}zirconium dichloride, rac-dimethylsilylene-bis{1-(2-ethyl-4-(β-naphthyl) indenyl)}zirconium dichloride, rac-dimethylsilylene-bis{1-(2-ethyl-4-(2-methyl-1-naphthyl)indenyl)}zirconium dichloride, rac-dimethylsilylene-bis{1-(2-ethyl-4-(5-acenaphthyl) indenyl)}zirconium dichloride, rac-dimethylsilylene-bis{1-(2-ethyl-4-(9-anthracenyl) indenyl)}zirconium dichloride, rac-dimethylsilylene-bis{1-(2-ethyl-4-(9-phenantoryl) indenyl)}zirconium dichloride, rac-dimethylsilylene-bis{1-(2-ethyl-4-(o-methylphenyl) indenyl)}zirconium dichloride, rac-dimethylsilylene-bis{1-(2-ethyl-4-(m-methylphenyl) indenyl)}zirconium dichloride, rac-dimethylsilylene-bis{1-(2-ethyl-4-(p-methylphenyl) indenyl)}zirconium dichloride, rac-dimethylsilylene-bis{1-(2-ethyl-4-(2,3-dimethylphenyl)indenyl)}zirconium dichloride, rac-dimethylsilylene-bis{1-(2-ethyl-4-(2,4-dimethylphenyl)indenyl)}zirconium dichloride, rac-dimethylsilylene-bis{1-(2-ethyl-4-(2,5-dimethylphenyl)indenyl)}zirconium dichloride, rac-dimethylsilylene-bis{1-(2-ethyl-4-(2,4,6-trimethylphenyl)indenyl)}zirconium dichloride, rac-dimethylsilylene-bis{1-(2-ethyl-4-(o-chlorophenyl) indenyl)}zirconium dichloride, rac-dimethylsilylene-bis{1-(2-ethyl-4-(m-chlorophenyl) indenyl)}zirconium dichloride, rac-dimethylsilylene-bis{1-(2-ethyl-4-(p-chlorophenyl) indenyl)}zirconium dichloride, rac-dimethylsilylene-bis{1-(2-ethyl-4-(2,3-dichlorophenyl)indenyl)}zirconium dichloride, rac-dimethylsilylene-bis{1-(2-ethyl-4-(2,6-dichlorophenyl)indenyl)}zirconium dichloride,
rac-dimethylsilylene-bis{1-(2-ethyl-4-(3,5-dichlorophenyl)indenyl)}zirconium dichloride,
rac-dimethylsilylene-bis{1-(2-ethyl-4-(2-bromophenyl)indenyl)}zirconium dichloride,
rac-dimethylsilylene-bis{1-(2-ethyl-4-(3-bromophenyl)indenyl)}zirconium dichloride,
rac-dimethylsilylene-bis{1-(2-ethyl-4-(4-bromophenyl)indenyl)}zirconium dichloride,
rac-dimethylsilylene-bis{1-(2-ethyl-4-(4-biphenylyl)indenyl)}zirconium dichloride,
rac-dimethylsilylene-bis{1-(2-ethyl-4-(4-trimethylsilylphenyl)indenyl)}zirconium dichloride,
rac-dimethylsilylene-bis{1-(2-n-propyl-4-phenylindenyl)}zirconium dichloride,
rac-dimethylsilylene-bis{1-(2-n-propyl-4-(α-naphthyl)indenyl)}zirconium dichloride,
rac-dimethylsilylene-bis{1-(2-n-propyl-4-(β-naphthyl)indenyl)}zirconium dichloride,
rac-dimethylsilylene-bis{1-(2-n-propyl-4-(2-methyl-1-naphthyl)indenyl)}zirconium dichloride,
rac-dimethylsilylene-bis{1-(2-n-propyl-4-(5-acenaphthyl)indenyl)}zirconium dichloride,
rac-dimethylsilylene-bis{1-(2-n-propyl-4-(9-anthracenyl)indenyl)}zirconium dichloride,
rac-dimethylsilylene-bis{1-(2-n-propyl-4-(9-phenantoryl)indenyl)}zirconium dichloride,
rac-dimethylsilylene-bis{1-(2-i-propyl-4-phenylindenyl)}zirconium dichloride,
rac-dimethylsilylene-bis{1-(2-i-propyl-4-(α-naphthyl)indenyl)}zirconium dichloride,
rac-dimethylsilylene-bis{1-(2-i-propyl-4-(β-naphthyl)indenyl)}zirconium dichloride,
rac-dimethylsilylene-bis{1-(2-i-propyl-4-(2-methyl-1-naphthyl)indenyl)}zirconium dichloride,
rac-dimethylsilylene-bis{1-(2-i-propyl-4-(5-acenaphthyl)indenyl)}zirconium dichloride,
rac-dimethylsilylene-bis{1-(2-i-propyl-4-(9-anthracenyl)indenyl)}zirconium dichloride,
rac-dimethylsilylene-bis{1-(2-i-propyl-4-(9-phenantoryl)indenyl)}zirconium dichloride,
rac-dimethylsilylene-bis{1-(2-s-butyl-4-phenylindenyl)}zirconium dichloride,
rac-dimethylsilylene-bis{1-(2-s-butyl-4-(α-naphthyl)indenyl)}zirconium dichloride,
rac-dimethylsilylene-bis{1-(2-s-butyl-4-(β-naphthyl)indenyl)}zirconium dichloride,
rac-dimethylsilylene-bis{1-(2-s-butyl-4-(8-methyl-9-naphthyl)indenyl)}zirconium dichloride,
rac-dimethylsilylene-bis{1-(2-s-butyl-4-(5-acenaphthyl)indenyl)}zirconium dichloride,
rac-dimethylsilylene-bis{1-(2-s-butyl-4-(9-anthracenyl)indenyl)}zirconium dichloride,
rac-dimethylsilylene-bis{1-(2-s-butyl-4-(9-phenantoryl)indenyl)}zirconium dichloride,
rac-dimethylsilylene-bis{1-(2-n-pentyl-4-phenylindenyl)}zirconium dichloride,
rac-dimethylsilylene-bis{1-(2-n-pentyl-4-(α-naphthyl)indenyl)}zirconium dichloride,
rac-dimethylsilylene-bis{1-(2-n-butyl-4-phenylindenyl)}zirconium dichloride,
rac-dimethylsilylene-bis{1-(2-n-butyl-4-(α-naphthyl)indenyl)}zirconium dichloride,
rac-dimethylsilylene-bis{1-(2-n-butyl-4-(β-naphthyl)indenyl)}zirconium dichloride,
rac-dimethylsilylene-bis{1-(2-n-butyl-4-(2-methyl-1-naphthyl)indenyl)}zirconium dichloride,
rac-dimethylsilylene-bis{1-(2-n-butyl-4-(5-acenaphthyl)indenyl)}zirconium dichloride,
rac-dimethylsilylene-bis{1-(2-n-butyl-4-(9-anthracenyl)indenyl)}zirconium dichloride,
rac-dimethylsilylene-bis{1-(2-n-butyl-4-(9-phenantoryl)indenyl)}zirconium dichloride,
rac-dimethylsilylene-bis{1-(2-i-butyl-4-phenylindenyl)}zirconium dichloride,
rac-dimethylsilylene-bis{1-(2-i-butyl-4-(α-naphthyl)indenyl)}zirconium dichloride,
rac-dimethylsilylene-bis{1-(2-i-butyl-4-(β-naphthyl)indenyl)}zirconium dichloride,
rac-dimethylsilylene-bis{1-(2-i-butyl-4-(2-methyl-1-naphthyl)indenyl)}zirconium dichloride,
rac-dimethylsilylene-bis{1-(2-i-butyl-4-(5-acenaphthyl)indenyl)}zirconium dichloride,
rac-dimethylsilylene-bis{1-(2-i-butyl-4-(9-anthracenyl)indenyl)}zirconium dichloride,
rac-dimethylsilylene-bis{1-(2-i-butyl-4-(9-phenantoryl)indenyl)}zirconium dichloride,
rac-dimethylsilylene-bis{1-(2-neopentyl-4-phenylindenyl)}zirconium dichloride,
rac-dimethylsilylene-bis{1-(2-neopentyl-4-(α-naphthyl)indenyl)}zirconium dichloride,
rac-dimethylsilylene-bis{1-(2-n-hexyl-4-phenylindenyl)}zirconium dichloride,
rac-dimethylsilylene-bis{1-(2-n-hexyl-4-(α-naphthyl)indenyl)}zirconium dichloride,
rac-methylphenylsilylene-bis{1-(2-ethyl-4-phenylindenyl)}zirconium dichloride,
rac-methylphenylsilylene-bis{1-(2-ethyl-4-(α-naphthyl)indenyl)}zirconium dichloride,
rac-methylphenylsilylene-bis{1-(2-ethyl-4-(9-anthracenyl)indenyl)}zirconium dichloride,
rac-methylphenylsilylene-bis{1-(2-ethyl-4-(9-phenantoryl)indenyl)}zirconium dichloride,
rac-diphenylsilylene-bis{1-(2-ethyl-4-phenylindenyl)}zirconium dichloride,
rac-diphenylsilylene-bis{1-(2-ethyl-4-(α-naphthyl)indenyl)}zirconium dichloride,
rac-diphenylsilylene-bis{1-(2-ethyl-4-(9-anthracenyl)indenyl)}zirconium dichloride,
rac-diphenylsilylene-bis{1-(2-ethyl-4-(9-phenantoryl)indenyl)}zirconium dichloride,
rac-diphenylsilylene-bis{1-(2-ethyl-4-(4-biphenyl)indenyl)}zirconium dichloride,
rac-methylene-bis{1-(2-ethyl-4-phenylindenyl)}zirconium dichloride,
rac-methylene-bis{1-(2-ethyl-4-(α-naphthyl)indenyl)}zirconium dichloride,
rac-ethylene-bis{1-(2-ethyl-4-phenylindenyl)}zirconium dichloride,
rac-ethylene-bis{1-(2-ethyl-4-(α-naphthyl)indenyl)}zirconium dichloride,
rac-ethylene-bis{1-(2-n-propyl-4-(α-naphthyl)indenyl)}zirconium dichloride, rac-dimethylgermyl-bis{1-(2-ethyl-4-phenylindenyl)}zirconium dichloride,
rac-dimethylgermyl-bis{1-(2-ethyl-4-(α-naphthyl)indenyl)}zirconium dichloride, and
rac-dimethylgermyl-bis{1-(2-n-propyl-4-phenylindenyl)}zirconium dichloride.

There may also be used the transition metal compounds obtained by substituting titanium metal, hafnium metal, vanadium metal, niobium metal, tantalum metal, chromium metal, molybdenum metal or tungsten metal for zirconium metal in the above-exemplified compounds.

The transition metal compounds represented by the above formula (I) can be prepared in accordance with the methods described in Journal of Organometallic Chem. 288 (1985), pages 63 to 67, European Patent Publication No. 0,320,762 specification and Examples thereof, for instance, by the following manner.

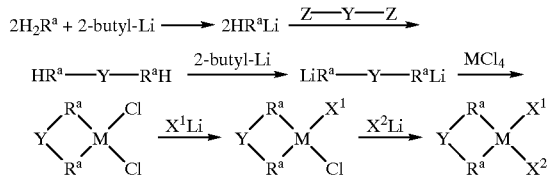

wherein, Z represents Cl, Br, I or o-tosyl group, and

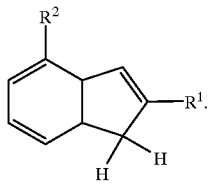

$H_2R^a$ represents

Though the transition metal compounds represented by the aformentioned formula (I) are usually used in the form of racemic modification, R-type or S-type may also be used.

These transition metal compounds may be used singly or in combination of two or more kinds. Further, they may be diluted in hydrocarbon or halogenated hydrocarbon.

The organoaluminum oxy-compound which forms the olefin polymerization catalyst (1) for polymerization of the propylene polymer (A1) and the propylene polymer (2) may be a known benzene-soluble aluminoxane or the benzene-insoluble organoaluminum oxy-compound having been disclosed in JP-A-2–78687/1990.

The above-mentioned known aluminoxane may be prepared, for example, by the following procedures:

(1) a procedure for recovering an aluminoxane as its hydrocarbon solution which comprises adding an organoaluminum compound such as trialkylaluminum to a suspension in a hydrocarbon medium of a compound containing adsorbed water, or a salt containing water of crystallization such as magnesium chloride hydrate, copper sulfate hydrate, aluminum sulfate hydrate, nickel sulfate hydrate and cerium chloride hydrate, and reacting the organoaluminum compound;

(2) a procedure for recovering an aluminoxane as its hydrocarbon solution which comprises reacting water, ice or steam directly with an organoaluminum compound such as trialkylaluminum in a solvent such as benzene, toluene, ethyl ether and tetrahydrofuran; and (3) a procedure for recovering an aluminoxane which comprises reacting an organotinoxide such as dimethyltinoxide and dibutyltinoxide with an organoaluminum compound such as trialkylaluminum in a solvent such as decane, benzene or toluene.

Moreover, the aluminoxane may contain a small amount of an organometal component. Furthermore, the solvent or unreacted organoaluminum compound may be removed from the above-mentioned recovered aluminoxane-containing solution, by distillation, and the aluminoxane may be redissolved in a solvent.

Concrete examples of the organoaluminum compound used for the preparation of the aluminoxane include trialkylaluminum such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum and tridecylaluminum;

tricycloalkylaluminums such as tricyclohexylaluminum and tricyclooctylaluminum;

dialkylaluminum halides such as dimethylaluminum chloride, diethylaluminum chloride, diethylaluminum bromide and diisobutylaluminum chloride;

dialkylaluminum hydrides such as diethylaluminum hydride and diisobutylaluminum hydride;

dialkylaluminum alkoxides such as dimethylaluminum methoxide and diethylaluminum ethoxide; and dialkylaluminum aryloxides such as diethylaluminum phenoxide.

Of these compounds, trialkylaluminum and tricycloalkylaluminum are preferable, and trimethylaluminum is particularly preferable.

Furthermore, there may also be used as the organoaluminum compound isoprenylaluminum represented by the general formula $(i\text{-}C_4H_9)_xAl_y(C_5H_{10})_z$ wherein x, y and z are each a positive number, and $z \geq 2x$.

The organoaluminum compounds mentioned above may be used either singly or in combination.

Solvents used for the solutions of the aluminoxane include aromatic hydrocarbons such as benzene, toluene, xylene, cumene and cymene; aliphatic hydrocarbons such as pentane, hexane, heptane, octane, decane, dodecane, hexadecane and octadecane; alicyclic hydrocarbons such as cyclopentane, cyclohexane, cyclooctane and methylcyclopentane; petroleum fractions such as gasoline, kerosene and gas oil; and halogenated compounds derived from the above-mentioned aromatic hydrocarbons, aliphatic hydrocarbons and alicyclic hydrocarbons, especially chlorinated and brominated hydrocarbons. In addition, there may also be used ethers such as ethyl ether and tetrahydrofuran. Of these solvents as exemplified above, aromatic hydrocarbons or aliphatic hydrocarbons are particularly preferred.

As the compound (c) which reacts with the aforesaid transition metal compound (a) to form an ion pair and which is used for forming the olefin polymerization catalyst (1) employable for the preparation of the propylene polymer (A1) and the propylene polymer (A2), there can be mentioned Lewis acid, ionic compounds and carborane compounds described in JP-A-1-501950/1989, JP-A-1-502036/1989, JP-A-3-179005/1992, JP-A-3-179006/1992, JP-A-3-207703/1992 and JP-A-3-207704/1992, and U.S. patent application Ser. No. 547718 (now U.S. Pat. No. 5,321,106).

Examples of the Lewis acid include triphenylboron, tris (4-fluorophenyl)boron, tris(p-tolyl)boron, tris(o-tolyl)boron, tris(3,5-dimethylphenyl)boron, tris(pentafluorophenyl) boron, $MgCl_2$, $Al_2O_3$ and $SiO_2$—$Al_2O_3$.

Examples of the ionic compounds include triphenylcarbeniumtetrakis(pentafluorophenyl)borate, tri-n-butylammoniumtetrakis(pentafluorophenyl)borate, N,N-dimethylaniliniumtetrakis(pentafluorophenyl)borate and ferroceniumtetra(pentafluorophenyl)borate.

Examples of the carborane compounds include dodecaborane, 1-carbaundacaborane, bis-n-butylammonium (1-carbedodeca)borate, tri-n-butylammonium(7,8-dicarbaundeca)borate and tri-n-butylammonium (tridecahydride-7-carbaundeca)borate.

The compound (c) which reacts with the transition metal compound (a) to form an ion pair can be used in combination of two or more kinds.

The olefin polymerization catalyst (1) used for preparing the propylene polymer (A1) and the propylene polymer (A2) is formed from the transition metal compound (a) and at least one compound selected from the organoaluminum oxy-compound (b) and the compound (c). However, the catalyst (1) may further contain an organoaluminum compound (j), if necessary, together with the above components.

The organoaluminum compound (j) is, for example, an organoaluminum compound represented by the following formula (II):

$$R^9{}_n AlX_{3-n} \qquad (II)$$

wherein $R^9$ is a hydrocarbon group of 1 to 12 carbon atoms, X is a halogen atom, and n is 1 to 3.

In the above formula (II), $R^9$ is a hydrocarbon group of 1 to 12 carbon atoms, for example, an alkyl group, a cycloalkyl group or an aryl group. Examples of those groups include methyl, ethyl, n-propyl, isopropyl, isobutyl, pentyl, hexyl, octyl, cyclopentyl, cyclohexyl, phenyl and tolyl.

Particular examples of such organoaluminum compounds (j) include:

trialkylaluminums, such as trimethylaluminum, triethylaluminum, triisopropylaluminum, triisobutylaluminum, trioctylaluminum, tri (2-ethylhexyl)aluminum and tridecylaluminum;

alkenylaluminums, such as isoprenylaluminum;

dialkylaluminum halides, such as dimethylaluminum chloride, diethylaluminum chloride, diisopropylaluminum chloride, diisobutylaluminum chloride and dimethylaluminum bromide;

alkylaluminum sesquihalides, such as methylaluminum sesquichloride, ethylaluminum sesquichloride, isopropylaluminum sesquichloride, butylaluminum sesquichloride and ethylaluminum sesquibromide;

alkylaluminum dihalides, such as methylaluminum dichloride, ethylaluminum dichloride, isopropylaluminum dichloride and ethylaluminum dibromide; and alkylaluminum hydrides, such as diethylaluminum hydride and diisobutylaluminum hydride.

Also employable as the organoaluminum compound (j) is a compound represented by the following formula (III):

$$R^9{}_n AlL_{3-n} \qquad (III)$$

wherein $R^9$ is the same as above, L is —$OR^{10}$ group, —$OSiR^{11}{}_3$ group, —$OAlR^{12}{}_2$ group, —$NR^{13}{}_2$ group, —$SiR_{143}$ group or —$N(R^{15})AlR^{16}{}_2$ group; n is 1 or 2; $R^{10}$, $R^{11}$, $R^{12}$ and $R^{16}$ are each methyl, ethyl, isopropyl, isobutyl, cyclohexyl, phenyl or the like; $R^{13}$ is a hydrogen atom, methyl, ethyl, isopropyl, phenyl, trimethylsilyl or the like; and $R^{14}$ and $R^{15}$ are each methyl, ethyl or the like.

Of such organoaluminum compounds, preferred are compounds represented by the formula $R^9{}_nAl(OAlR^{10}{}_2)_{3-n}$, for example, $Et_2AlOAlEt_2$, and $(iso\text{-}Bu)_2AlOAl(iso\text{-}Bu)_2$.

Of the organoaluminum compounds represented by the above formulas (II) and (III), preferred are compounds represented by the formula $R^9{}_nAl$, and particularly preferred are compounds of the formula $R^9{}_nAl$ wherein $R^9$ is an isoalkyl group.

The olefin polymerization catalyst (1) used for preparing the propylene polymer (A1) and the propylene polymer (A2) can be prepared by mixing the transition metal compound (a) [component (a)] and the organoaluminum oxy-compound (b) [component (b)] (or the compound (c) which reacts with the transition metal compound (a) to form an ion pair, [component (c)]), and if desired, the organoaluminum compound (j) [component (j)] in an inert hydrocarbon solvent or an olefin solvent.

Examples of the inert hydrocarbon solvents used for preparing the olefin polymerization catalyst (1) include:

aliphatic hydrocarbons, such as propane, butane, pentane, hexane, heptane, octane, decane, dodecane and kerosine;

alicyclic hydrocarbons, such as cyclopentane, cyclohexane and methylcyclopentane;

aromatic hydrocarbons, such as benzene, toluene and xylene;

halogenated hydrocarbons, such as ethylene chloride, chlorobenzene and dichloromethane; and mixtures of the above hydrocarbons.

In the preparation of the olefin polymerization catalyst (1), each components may be mixed in an optional order, but preferably they are mixed in the following manner:

the component (b) [or the component (c)] is mixed with the component (a);

the component (b) is mixed with the component (j), and the resulting mixture is then mixed with the component (a);

the component (a) is mixed with the component (b) [or the component (c)], and the resulting mixture is then mixed with the component (j); or the component (a) is mixed with the component (j), and the resulting mixture is then mixed with the component (b) [or the component (c)].

In the mixing of each components, an atomic ratio (Al/transition metal) of the aluminum in the component (b) to the transition metal in the component (a) is in the range of usually 10 to 10,000, preferably 20 to 5,000; and a concentration of the component (a) is in the range of about $10^{-8}$ to $10^{-1}$ mol/l-solvent, preferably $10^{-7}$ to $5 \times 10^{-2}$ mol/l-solvent.

When the component (c) is used, a molar ratio [component (a)/component (c)] of the component (a) to the component (c) is in the range of usually 0.01 to 10, preferably 0.1 to 5; and a concentration of the component (a) is in the range of about $10^{-8}$ to $10^{-1}$ mol/l-solvent, preferably $10^{-7}$ to $5 \times 10^{-2}$ mol/l-solvent.

When the component (j) is used, an atomic ratio ($Al_j/Al_b$) of the aluminum atom ($Al_j$) in the component (j) to the aluminum atom ($Al_b$) in the component (b) is in the range of usually 0.02 to 20, preferably 0.2 to 10.

The above-mentioned catalyst components may be mixed in a polymerizer. Otherwise, a mixture of the components beforehand prepared may be fed to a polymerizer.

If the components are beforehand mixed, the mixing temperature is in the range of usually −50 to 150° C., preferably −20 to 120° C.; and the contact time is in the range of 1 to 1,000 minutes, preferably 5 to 600 minutes. The mixing temperature may be varied while the components are mixed and contacted with each other.

The olefin polymerization catalyst (1) may be an olefin polymerization solid catalyst in which at least one of the component (a), the component (b) [or the component (c)] and the component (j) is supported on an inorganic or organic carrier of granular or particulate solid.

The inorganic carrier is preferably a porous oxide, for example, $SiO_2$ or $Al_2O_3$.

Examples of the granular or particulate solid organic compounds include polymers or copolymers produced mainly from α-olefins such as ethylene, propylene and 1-butene or styrene.

The olefin polymerization catalyst (1) may be a prepolymerized catalyst for olefin polymerization formed from the particulate carrier, the component (a), the component (b) [or the component (c)] and an olefin polymer produced by the prepolymerization, and if desired, the component (j).

The olefin used for the prepolymerization includes propylene, ethylene and 1-butene. Further, a mixture of these olefins and other olefin may also be employed.

In addition to the above components, the olefin polymerization catalyst (1) may contain other components which are useful for the olefin polymerization, for example, water as a catalyst component.

The propylene polymer (A1) and the propylene polymer (A2) can be prepared by polymerizing propylene in the presence of the olefin polymerization catalyst (1). In the polymerization of propylene, monomers such as ethylene and α-olefins of 4 to 20 carbon atoms (e.g., 1-butene, 1-pentene, 1-hexene, 4-methyl-1-pentene, 1-octene, 1-decene, 1-dodecene, 1-tetradecene, 1-hexadecene, 1-octadecene and 1-eicosene) may be used in amounts of not more than 0.1 mol.

The polymerization may be carried out by either a liquid phase polymerization process such as a suspension polymerization process and a solution polymerization process, or a gas phase polymerization process.

In the liquid phase polymerization process, the same inert hydrocarbon solvent as used in the preparation of the catalyst described before can be used, or propylene can be also used as a solvent.

In the suspension polymerization process, the temperature for polymerizing propylene is in the range of usually −50 to 100° C., preferably 0 to 90° C. In the solution polymerization process, the polymerization temperature is in the range of usually 0 to 250° C., preferably 20 to 200° C. In the gas phase polymerization process, the polymerization temperature is in the range of usually 0 to 120° C., preferably 20 to 100° C. The polymerization pressure is in the range of usually atmospheric pressure to 100 kg/cm$^2$, preferably atmospheric pressure to 50 kg/cm$^2$. The polymerization reaction may be carried out either batchwise, semi-continuously or continuously. Further, it is also possible to conduct the polymerization in two or more steps having different reaction conditions.

The molecular weight of the resulting propylene polymer can be regulated by allowing hydrogen to exist in the polymerization system or by varying the polymerization temperature and the polymerization pressure.

The Second Propylene Polymer Composition

The second propylene polymer composition comprises:
(A1) a propylene polymer which is characterized in that:
  the propylene polymer is prepared by the use of an olefin polymerization catalyst comprising:
    (i) (a) a transition metal compound, and
    (ii) at least one compound selected from the group consisting of
      (b) an organoaluminum oxy-compound, and
      (c) a compound which reacts with the transition metal compound (a) to form an ion pair,
  the propylene polymer has a melt flow rate (MFR), as measured at 230° C. under a load of 2.16 kg, of 0.01 to 30 g/10 min, and
  the propylene polymer has a molecular weight distribution (Mw/Mn), as measured by GPC, of 2 to 3;
(A2) a propylene polymer which is characterized in that:
  the propylene polymer is prepared by the use of an olefin polymerization catalyst comprising:
    (i) (a) a transition metal compound, and
    (ii) at least one compound selected from the group consisting of
      (b) an organoaluminum oxy-compound, and
      (c) a compound which reacts with the transition metal compound (a) to form an ion pair,
  the propylene polymer has a melt flow rate (MFR), as measured at 230° C. under a load of 2.16 kg, of 30 to 1,000 g/10 min, and
  the propylene polymer has a molecular weight distribution (Mw/Mn), as measured by GPC, of 2 to 4; and
(B) a soft polymer.

In this propylene polymer composition, the ratio ((A2)/(A1)) of the MFR of said propylene polymer (A2) to the MFR of said propylene polymer (A1) is not less than 30.

Propylene Polymer (A1)

The propylene polymer (A1) for constituting the second propylene polymer composition is identical with the propylene polymer (A1) for constituting the first propylene polymer composition.

Propylene Polymer (A2)

The propylene polymer (A2) for constituting the second propylene polymer composition is identical with the propylene polymer (A2) for constituting the first propylene polymer composition.

Soft Polymer (B)

The soft polymer (B) for constituting the second propylene polymer composition is a (co)polymer of an α-olefin of 2 to 20 carbon atoms, and desirably has MFR, as measured at 190° C. under a load of 2.16 kg, of 0.01 to 100 g/10 min, preferably 0.05 to 50 g/10 min. This soft polymer (B) has a crystallinity, as measured by X-ray diffractometry, of less than 30%, and desirably is amorphous.

Examples of the α-olefins of 2 to 20 carbon atoms include ethylene, propylene, 1-butene, 1-pentene, 1-hexene, 4-methyl-1-pentene, 1-octene, 1-decene and mixtures thereof. Of these, particularly preferred are α-olefins of 1 to 10 carbon atoms.

The soft polymer (B) is preferably a copolymer of ethylene and an α-olefin, and the α-olefin is for example an α-olefin of 3 to 20 carbon atoms, preferably an α-olefin of 3 to 6 carbon atoms, particularly preferably propylene.

The soft polymer (B) may contain other constituent units than the constituent units derived from α-olefins, such as those derived from diene compounds, with the proviso that the characteristics thereof are not marred.

Examples of the constituent units which are allowed to be contained in the soft polymer (B) include constituent units derived from:

chain non-conjugated dienes, such as 1,4-hexadiene, 1,6-octadiene, 2-methyl-1,5-hexadiene, 6-methyl-1,5-heptadiene and 7-methyl-1,6-octadiene;

cyclic non-conjugated dienes, such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene and 6-chloromethyl-5-isopropenyl-2-norbornene; and diene compounds, such as 2,3-diisopropylidene-5-norbornene, 2-ethylidene-3-isopropylidene-5-norbornene and 2-propenyl-2,2-norbornadiene.

These diene components can be used singly or in combination. A content of the diene component is usually not more than 10% by mol, preferably 0 to 5% by mol.

The soft polymer (B) is, for example, a copolymer containing constituent units derived from ethylene in an amount of 0 to 95% by mol, preferably 30 to 92% by mol, more preferably 40 to 90% by mol, constituent units derived from an α-olefin of 3 to 20 carbon atoms in an amount of 1 to 100% by mol, preferably 4 to 70% by mol, more preferably 8 to 60% by mol, and constituent units derived from the diene component in an amount of 0 to 10% by mol, preferably 0 to 5% by mol, more preferably 0 to 3% by mol.

Such soft polymer (B) as mentioned above can be prepared by conventionally known processes using a titanium catalyst, a vanadium catalyst, a zirconium catalysts, etc.

Propylene Polymer Composition

The second propylene polymer composition comprises the propylene polymer (A1), the propylene polymer (A2) and the soft polymer (B). In this composition, it is desired that the propylene polymer (A1) is contained in an amount of 10 to 90 parts by weight, preferably 30 to 70 parts by weight; the propylene polymer (A2) is contained in an amount of 10 to 90 parts by weight, preferably 30 to 70 parts by weight; and the soft polymer (B) is contained in an amount of 3 to 30 parts by weight, preferably 10 to 25 parts by weight. A ratio [(A2)/(A1)] of the MFR of the propylene polymer (A2) to the MFR of the propylene polymer (A1) is not less than 30, preferably in the range of 40 to 300, more preferably 50 to 100.

The second propylene polymer composition is desired to have MFR, as measured at 230° C. under a load of 2.16 kg, of 1 to 100 g/10 min, preferably 5 to 50 g/10 min. In this composition, Mw/Mn of all the propylene components for constituting the composition is desirably in the range of 4 to 15.

The density of the second propylene polymer composition is desired to be in the range of 0.88 to 0.92 g/cm$^3$, preferably 0.89 to 0.92 g/cm$^3$.

The heat distortion temperature (HDT) thereof is desired to be not lower than 80° C., preferably in the range of 90 to 140° C.

The flexural modulus (FM) thereof is desired to be in the range of 8,500 to 18,000 kg/cm$^2$, preferably 9,000 to 15,000 kg/cm$^2$.

The Izod impact strength (IZ) thereof at 23° C. is desired to be in the range of 10 to 50 kg·cm/cm, preferably 10 to 40 kg·cm/cm.

The tensile elongation at break (EL) thereof is desired to be in the range of 200 to 1,000%, preferably 300 to 1,000%.

The second propylene polymer composition may contain, if necessary, additives which may be added to the first propylene polymer composition, with the proviso that the object of the invention is not marred.

The second propylene polymer composition can be prepared by known processes. For example, the composition can be prepared in accordance with the processes (1) to (5) described for the first propylene polymer composition, using the propylene polymer (A1), the propylene polymer (A2), the soft polymer (B) and if desired other components which may be optionally added.

The second propylene polymer composition may be prepared by forming a composition of the propylene polymer (A1) and the propylene polymer (A2), which has been beforehand prepared in the following manner, and then blending the resulting composition with the soft polymer (B) in accordance with the aforesaid processes.

The composition of the propylene polymer (A1) and the propylene polymer (A2) can be produced by a process comprising conducting the polymerization in two or more steps having different reaction conditions, in one step of which the propylene polymer (A1) is prepared and in another step of which the propylene polymer (A2) is prepared, or a process comprising using plural polymerizers, in one polymerizer of which the propylene polymer (A1) is prepared and in another polymerizer of which the propylene polymer (A2) is prepared.

The second propylene polymer composition as mentioned above is excellent in not only heat resistance, rigidity and tensile elongation at break but also moldability and impact resistance. Further, since the amount of the catalyst residue in the polymer composition is small, the article molded from the composition is never colored and is good in sanitariness.

The Third Propylene Polymer Composition

The third propylene polymer composition comprises:

(A3) a propylene polymer which is prepared by the use of an olefin polymerization catalyst comprising (d) a solid titanium catalyst component and (e) an organometallic compound catalyst component, said components (d) and (e) being described later, and which has a melt flow rate (MFR), as measured at 230° C. under a load of 2.16 kg, of 0.01 to 30 g/10 min, and a molecular weight distribution (Mw/Mn), as measured by GPC, of 4 to 15; and (A2) a propylene polymer which is characterized in that:
the propylene polymer is prepared by the use of an olefin polymerization catalyst comprising:
(i) (a) a transition metal compound, and
(ii) at least one compound selected from the group consisting of
(b) an organoaluminum oxy-compound, and
(c) a compound which reacts with the transition metal compound (a) to form an ion pair,
the propylene polymer has a melt flow rate (MFR), as measured at 230° C. under a load of 2.16 kg, of 30 to 1,000 g/10 min, and
the propylene polymer has a molecular weight distribution (Mw/Mn), as measured by GPC, of 2 to 4.

Propylene Polymer (A3)

The propylene Polymer (A3) for constituting the third propylene polymer composition is a propylene homopolymer or a propylene copolymer obtained by the use of an olefin polymerization catalyst comprising a solid titanium catalyst component (d) and an organometallic compound catalyst component (e), both components being described later.

The propylene Polymer (A3) is desired to have MFR, as measured at 230° C. under a load of 2.16 kg, of 0.01 to 30 g/10 min, preferably 0.5 to 5 g/10 min, and Mw/Mn, as measured by GPC, of 4 to 15, preferably 4 to 8.

Further, the propylene polymer (A3) is desired to have an intrinsic viscosity [η] of 1.7 to 5.0 dl/g, preferably 2.2 to 3.5 dl/g, a weight-average molecular weight of 15×10$^4$ to 100× 10$^4$, preferably 25×10$^4$ to 50×10$^4$, a crystallinity, as measured by X-ray diffractometry, of not less than 55%, preferably not less than 60%, and a boiling heptane extraction residue proportion (I.I.) of not less than 90%, preferably not less than 93%.

The propylene polymer (A3) may contain constituent units derived from monomers other than propylene, which are exemplified for the propylene polymer (A1), in an amount of not more than 5% by mol.

Propylene Polymer (A2)

The propylene Polymer (A2) for constituting the third propylene polymer composition is identical with the propylene polymer (A2) for constituting the above-mentioned first propylene polymer composition.

Propylene Polymer Composition

The third propylene polymer composition comprises the propylene polymer (A3) and the propylene polymer (A2). In this composition, it is desired that the propylene polymer (A3) is contained in an amount of 10 to 90% by weight, preferably 30 to 70% by weight; and the propylene polymer (A2) is contained in an amount of 10 to 90% by weight, preferably 30 to 70% by weight. A ratio [(A2)/(A3)] of the MFR of the propylene polymer (A2) to the MFR of the propylene polymer (A3) is not less than 30, preferably in the range of 40 to 100.

The third propylene polymer composition is desired to have MFR, as measured at 230° C. under a load of 2.16 kg, of 1 to 100 g/10 min, preferably 5 to 50 g/10 min. In this composition, Mw/Mn of all the propylene components for constituting the composition is desirably in the range of 5 to 15.

The density of the third propylene polymer composition is desired to be in the range of 0.89 to 0.92 g/cm$^3$, preferably 0.90 to 0.92 g/cm$^3$.

The heat distortion temperature (HDT) thereof is desired to be not lower than 100° C., preferably in the range of 110 to 150° C.

The flexural modulus (FM) thereof is desired to be in the range of 14,000 to 21,000 kg/cm$^2$, preferably 16,000 to 20,000 kg/cm$^2$.

The Izod impact strength (IZ) thereof at 23° C. is desired to be in the range of 2 to 4 kg·cm/cm, preferably 2 to 3 kg·cm/cm.

The tensile elongation at break (EL) thereof is desired to be in the range of 100 to 500%, preferably 200 to 400%.

The third propylene polymer composition may contain, if necessary, additives which may be added to the first propylene polymer composition, with the proviso that the object of the invention is not marred.

The third propylene polymer composition can be prepared by known processes. For example, the composition can be prepared in accordance with the processes (1) to (4) described for the first propylene polymer composition, using the propylene polymer (A3), the propylene polymer (A2) and if desired other components which may be optionally added.

The third propylene polymer composition as mentioned above is excellent in not only heat resistance, rigidity and tensile elongation at break but also moldability.

Next, the olefin polymerization catalyst used for preparing the propylene polymer (A3) and the process for preparing the propylene polymer (A3) are described.

The propylene polymer (A3) can be prepared by polymerizing propylene in the presence of an olefin polymerization catalyst [olefin polymerization catalyst (2)] comprising:

(d) a solid titanium catalyst component, and (e) an organometallic compound catalyst component.

Figure 2:
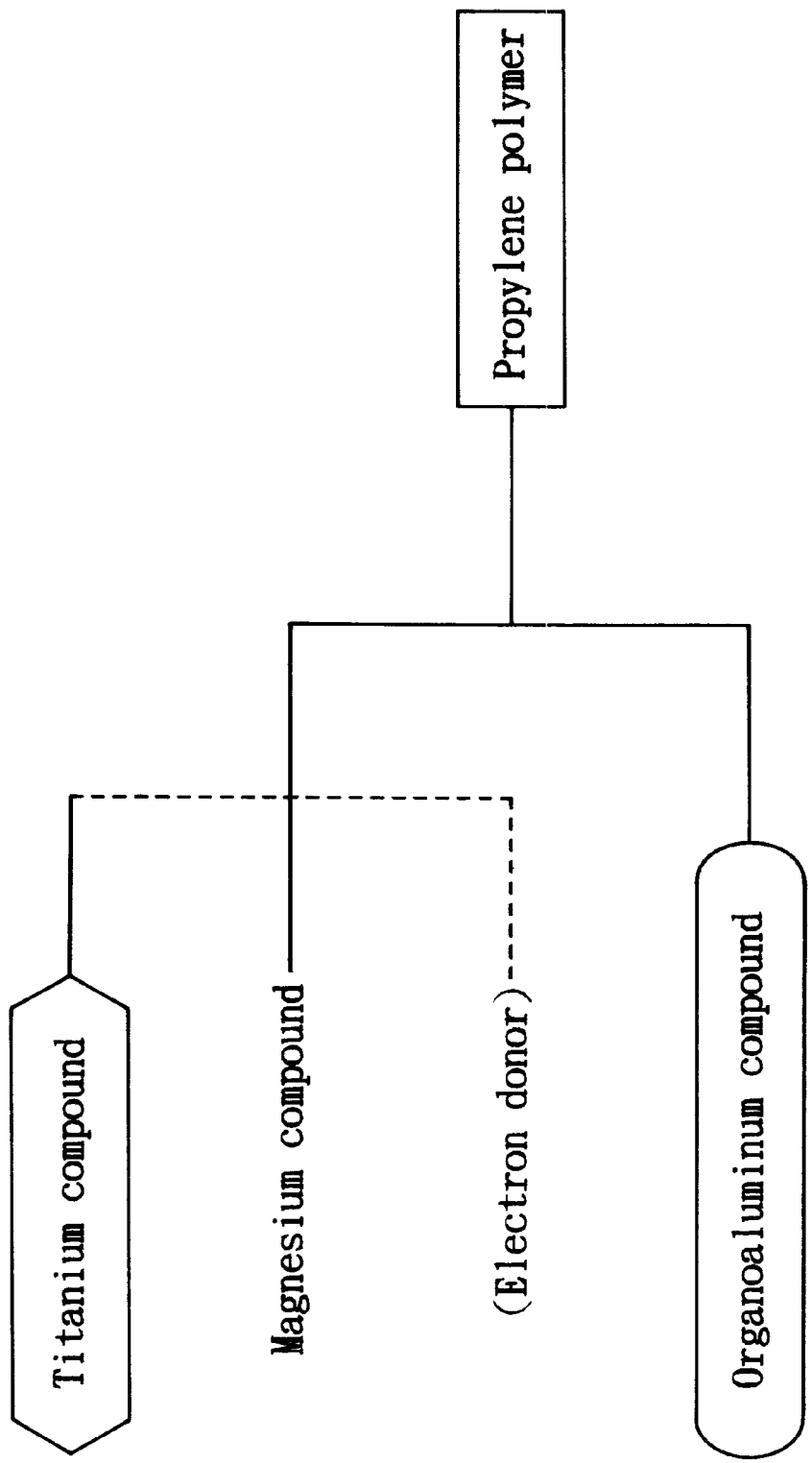
FIG. 2 is a view illustrating steps of a process for preparing an olefin polymerization catalyst which is used for the preparation of the propylene polymer (A3) and the propylene polymer (A4).

FIG. 2 illustrates steps of a process for preparing the olefin polymerization catalyst which is used for the preparation of the propylene polymer (A3).

As the solid titanium catalyst component (d), solid titanium catalyst components containing titanium, magnesium and halogen, and, if desired, an electron donor (k), can be used.

The solid titanium catalyst component (d) can be prepared by, for example, bringing a titanium compound, a magnesium compound and an optional electron donor (k) into contact with each other.

The titanium compounds used in the preparation of the solid titanium catalyst component (d) include, for example, tetravalent titanium compounds or trivalent titanium compounds.

The tetravalent titanium compounds include compounds represented by the following formula:

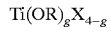

$$Ti(OR)_g X_{4-g}$$

wherein R is a hydrocarbon group, X is a halogen atom, and g is a number satisfying the condition of $0 \leq g \leq 4$.

Of these compounds, preferred are titanium tetrahalides, and particularly preferred is titanium tetrachloride. These titanium compounds may be used singly or in combination. Further, they may be diluted in hydrocarbon compounds or halogenated hydrocarbon compounds.

The trivalent titanium compoun is, for example, titanium trichloride.

The magnesium compound used for preparing the solid titanium catalyst component (d) includes a magnesium compound having reduction properties and a magnesium compound having no reduction properties.

The magnesium compounds having reduction properties include organo-magnesium compounds represented by the following general formula:

$$X_n MgR_{2-n}$$

wherein n is a number satisfying the condition of $0 \leq n < 2$, R is hydrogen, an alkyl group of 1 to 20 carbon atoms, aryl group or cycloalkyl group (when n is 0, two of R are the same or different), and a hydrocarbon group.

Concrete examples of the magnesium compound having reduction properties include dialkylmagnesium compounds, alkylmagnesium halides, alkylmagnesium alkoxides and butylmagnsium hydride.

Concrete examples of the magnesium compound having no reduction properties include magnesium halide such as magnesium chloride, magnesium bromide, magnesium iodide and magnesium fluoride; alkoxymagnesium halide; aryloxymagnesium halide; alkoxymagnesium; aryloxymagnesium; and manesium carboxylate. Further, magnesium metal or hydrogenated magnesium may also be used.

These magnesium compounds having no reduction properties may be those derived from the above-mentioned magnesium compounds having reduction properties or those derived during the catalyst component preparation stage. In order to derive the magnesium compound having no reduction properties from the magnesium compound having reduction properties, the magnesium compound having reduction properties is brought into contact with a polysiloxane compound, a halogen-containing silane compound, a halogen-containing aluminum compound, an ester, an alcohol, halogen-containing compound or a compound having an OH-group or an active carbon-oxygen bond.

The magnesium compounds may be used singly or in combination of two or more kinds, an in any of liquid state or solid state. When the magnesium compound is solid, the compound can be brought into liquid state by using the electron donors as same as those described in later, such as alcohols, carboxylic acids, aldehydes, amins or metal acid esters.

In the preparation of the solid titanium catalyst component (d), an electron donor (k) is preferably used. Examples of the electron donor (k) include:

oxygen-containing electron donors such as alcohols, phenols, ketones, aldehydes, carboxylic acids, organic acid halides, esters of organic acids or inorganic acids, ethers, diethers, acid amides, acid anhydrides and alkoxysilanes, and nitrogen-containing donors such as an ammonia, amines, nitriles, pyridines and isocyanates.

The solid titanium catalyst component (d) is prepared by bringing the aforementioned titanium compound, magnesium compound and the optional electron donor (k) into contact with each other.

Though the processes for preparing the solid titanium catalyst component (d) are no way limited, examples of such processes by using the tetravalent titanium compound are briefly described below.

(1) A process comprising bringing a solution consisting of a magnesium compound, an electron donor (k) and a hydrocarbon solvent into contact with an organometallic compound, after or simultaneously with precipitating a solid by bringing the solution into contact with a titanium compound.

(2) A process comprising bringing a complex composed of a magnesium compound and an electron donor (k) into contact with an organometallic compound, and then bringing the reaction product into contact with a titanium compound.

(3) A process comprising bringing a product obtained by the contact of an inorganic carrier and an organic magnesium compound into contact with a titanium compound. In this case, the above product may be beforehand brought into contact with a halogen-containing compound, an electron donor (k) and/or an organometallic compound.

(4) A process comprising obtaining an inorganic or organic carrier on which a magnesium compound is supported from a mixture of an inorganic or organic carrier and a solution containing a magnesium compound and an electron donor (k) (and further a hydrocarbon solvent in some cases), and then bringing the obtained carrier into contact with a titanium compound.

(5) A process comprising bringing a solution containing a magnesium compound, a titanium compound and an electron donor (k) (and further a hydrocarbon solvent in some cases) into contact with an inorganic or organic carrier to obtain a solid titanium catalyst component on which magnesium and titanium are supported.

(6) A process comprising bringing a liquid organic magnesium compound into contact with a halogen-containing titanium compound.

(7) A process comprising bringing a liquid organic magnesium compound into contact with a halogen-containing compound, and then bringing the product thus obtained into contact with a titanium compound.

(8) A process comprising bringing an alkoxy group-containing magnesium compound into contact with a halogen-containing titanium compound.

(9) A process comprising bringing a complex composed of an alkoxy group-containing magnesium compound and an electron donor (k) into contact with a titanium compound.

(10) A process comprising bringing a complex composed of an alkoxy group-containing magnesium compound and an electron donor (k) into contact with an organometallic compound, and then bringing the product thus obtained into contact with a titanium compound.

(11) A process comprising bringing a magnesium compound, an electron donor (k) and a titanium compound into contact with each other in an optional order. In this reaction, each components may be pretreated with an electron donor (k) and/or a reaction assistant such as an organometallic compound or a halogen-containing silicon compound. In this case, an electron donor is preferably used at least one time

(12) A process comprising bringing a liquid magnesium compound not having reducing ability into contact with a liquid titanium compound, if necessary in the presence of an electron donor (k), to precipitate a solid magnesium/titanium complex compound.

(13) A process comprising further bringing the reaction product obtained in the above process (12) into contact with an titanium compound.

(14) A process comprising further bringing the reaction product obtained in the above process (11) or (12) into contact with an electron donor (k) and a titanium compound.

(15) A process comprising pulverizing a magnesium compound and a titanium compound (and if necessary an electron donor (k)) to obtain a solid product, and treating the solid product with either halogen, a halogen compound or aromatic hydrocarbon. This process may include a step of pulverizing only a magnesium compound, a step of pulverizing a complex compound composed of a magnesium compound and an electron donor (k), or a step of pulverizing a magnesium compound and a titanium compound. Further, after the pulverization, the solid product may be subjected to a pretreatment with a reaction assistant and then subjected to a treatment with halogen or the like. Examples of the reaction assistants include an organometallic compound and a halogen-containing silicon compound.

(16) A process comprising pulverizing a magnesium compound, and then bringing the pulverized magnesium compound into contact with a titanium compound. In this case, an electron donor (k) or a reaction assistant may be used in the pulverization stage and/or the contacting reaction stage.

(17) A process comprising treating the compound obtained in any of the above processes (11) to (16) with halogen, a halogen compound or aromatic hydrocarbon.

(18) A process comprising bringing the reaction product obtained by the contact of a metal oxide, an organic magnesium compound and a halogen-containing compound into contact with a titanium compound and if necessary an electron donor (k).

(19) A process comprising bringing a magnesium compound such as a magnesium salt of organic acid, alkoxymagnesium or aryloxymagnesium into contact with a titanium compound and/or halogen-containing hydrocarbon and if necessary an electron donor (k).

(20) A process comprising bringing a hydrocarbon solution containing at least a magnesium compound and alkoxytitanium into contact with a titanium compound and/or an electron donor (k). In this case, a halogen-containing compound such as a halogen-containing silicon compound may be further brought into contact therewith, if necessary.

(21) A process comprising bringing a liquid magnesium compound not having reducing ability into contact with an organometallic compound so as to precipitate a solid magnesium/metal (aluminum) complex compound, and then bringing the resulting compound into contact with an electron donor (k) and a titanium compound.

The preparation of the solid titanium catalyst component (d) is conducted at a temperature of usually −70 to 200° C., preferably −50 to 150° C.

The solid titanium catalyst component (d) thus obtained contains titanium, magnesium, halogen and an optional electron donor.

In the solid titanium catalyst component (d), a ratio of halogen/titanium (atomic ratio) is about 2 to 200, preferably about 4 to 90, a ratio of magnesium/titanium (atomic ratio) is 1 to 100, preferably 2 to 50.

Further, the electron donor (k) is containined in a ratio of electron donor (k)/titanium (molar ratio) being about 0.01 to 100, preferably about 0.05 to 50.

Regarding the processes for preparation of the solid titanium catalyst component (d), details thereof are described in the following publications;

JP-B-46-34092/1971, JP-B-53-46799/1978, JP-B-60-3323/1985, JP-B-63-54289/1988, JP-A-1-261404/1989, JP-A-1-261407/1989, JP-B-47-41676/1972, JP-B-47-46269/1972, JP-B-19794/1973, JP-A-60-262803/1985, JP-A-59-147004/1984, JP-A-59-149911/1984, JP-A-1-201308/1989, JP-A-61-151211/1986, JP-A-53-58495/1978, JP-A-53-87990/1978, JP-A-59-206413/1984, JP-A-58-206613/1983, JP-A-58-125706/1983, JP-A-63-68606/1988, JP-A-63-69806/1988, JP-A-60-81210/1985, JP-A-61-40306/1986, JP-A-51-281189/1976, JP-A-50-126590/1975, JP-A-51-92885/1976, JP-B-57-45244/1982, JP-B-57-26613/1982, JP-B-61-5483/1986, JP-A-56-811/1981, JP-B-60-37804/1985, JP-B-59-50246/1984, JP-A-58-83006/1983, JP-A-48-16986/1973, JP-A-49-65999/1974, JP-A-49-86482/1974, JP-B-56-39767/1981, JP-B-56-32322/1981, JP-A-55-29591/1980, JP-A-53-146292/1978, JP-A-57-63310/1982, JP-A-57-63311/1982, JP-A-57-63312/1982, JP-A-62-273206/1987, JP-A-63-69804/1988, JP-A-61-21109/1986, JP-A-63-264607/1988, JP-A-60-23404/1985, JP-A-60-44507/1985, JP-A-60-158204/1985, JP-A-61-55104/1986, JP-A-2-28201/1990, JP-A-58-196210/1983, JP-A-64-54005/1989, JP-A-59-149905/1984, JP-A-61-145206/1986, JP-A-63-302/1988, JP-A-63-225605/1988, JP-A-64-69610, JP-A-1-168707/1989, JP-A-62-104810/1987, JP-A-62-104811/1987, JP-A-62-104812/1987 and JP-A-62-104813/1987.

In the present invention, conventional titanium trichloride type catalyst component may also be used as the solid titanium catalyst component (d).

The above mentioned titanium trichloride is exemplified as the titanium trichloride type catalyst component. The titanium trichloride is used together with the aforementioned electron donor (k) and/or the tetravalent titanium compound, or after the contact with them.

Regarding the processes for preparation of the titanium trichloride type catalyst component, details thereof are described in the following publications;

JP-A-63-17274/1988, JP-A-64-38409/1989, JP-A-56-34711/1981, JP-A-61-287904/1986, JP-A-63-75007/1988, JP-A-63-83106/1988, JP-A-59-13630/1984, JP-A-63-108008/1988, JP-A-63-27508/1988, JP-A-57-70110/1982, JP-A-58-219207/1983, JP-A-1-144405/1989 and JP-A-1-292011/1989.

Embodiment of the titanium trichloride type catalyst component includes titanium trichloride. As the titanium trichloride, there can be preferably used a titanium trichloride which is obtained by, for example, reducing the tetravalent titanium by contacting with hydrogen, metal such as magnesium metal, aluminum metal or titanium metal, or an organic metal compound such as organomagnesium compound, organoaluminum compound or organozinc compound. The titanium trichloride is used together with the aforementioned electron donor (k) and/or the tetravalent titanium compound, or after the contact with them.

Examples of the organometallic compound catalyst component (e) which forms the olefin polymerization catalyst (2) used in the polymerization of the propylene polymer (A3) include (e-1) an organoaluminum compound, (e-2) a complex alkyl compound of aluminum with Group I metal of the periodic table and (e-3) a organometallic compound of Group II metal of the periodic table.

Examples of the organoaluminum compound (e-1) are the same as those described as the organoaluminum (j).

Examples of the complex alkyl compound of aluminum with Group I metals of the periodic table (e-2) are represented by the following general formula;

$$M^1AlR^j{}_4$$

wherein $M^1$ is Li, Na or K and $R^j$ is a hydrocarbon group of 1 to 15 carbon atoms.

Examples of the organometallic compound of Group II metal of the periodic table (e-3) are represented by the following general formula;

$$R^kR^1M^2$$

wherein $R^k$ and $R^1$ are hydrocarbon group of 1 to 15 carbon atoms or halogen, and they being the same or different with a proviso that excluding the case where the each of them is halogen, and $M^2$ is Mg, Zn or Cd.

These compounds may be used in combination of 2 or more kinds.

In the preparation of the propylene polymer (A3), the aforesaid organoaluminum oxy-compound (b) can be also employed.

The propylene polymer (A3) can be prepared by polymerizing propylene in the presence of the olefin polymerization catalyst (2) formed from the solid titanium catalyst component (d) and the organometallic compound catalyst component (e).

The olefin polymerization catalyst (2) may be a prepolymerized catalyst obtained by prepolymerizing the catalyst comprising the solid titanium catalyst component (d) and the organometallic compound catalyst component (e) with an olefin.

Examples of the olefins used for the prepolymerization include α-olefins of 2 to 20 carbon atoms. Of these, propylene is preferred.

In the prepolymerization, the same electron donor as the aforementioned electron donor (k) or the following electron donor (1) may be used if necessary, in addition to the catalyst component (d) and the catalyst component (e).

The electron donor (1) is, for example, an organosilicon compound represented by the following formula:

$$R_nSi(OR')_{4-n}$$

wherein R and R' are each a hydrocarbon group, and 0<n<4.

The organosilicon compound represented by the above formula includes the following compounds.

These organosilicon compounds may be used in combination of two of more kinds.

Also employable as the electron donor (1) are:

nitrogen-containing electron donors, such as 2,6-substituted piperidines, 2,5-substituted piperidines, substituted methylenediamines and substituted imidazolidines;

phosphorus-containing electron donors, such as phosphites; and oxygen-containing electron donors, such as 2,6-substituted tetrahydropyrans and 2,5-substituted tetrahydropyrans.

In the prepolymerization, the olefin is desirably polymerized in an amount of usually 0.01 to 2,000 g, preferably 0.03 to 1,000 g, particularly preferably 0.05 to 200 g, per 1 g of the solid titanium catalyst component (d).

The prepolymerized catalyst prepared as above is usually obtained in the form of a suspension. In the subsequent polymerization step, such prepolymerized catalyst may be used in the form of the suspension. Otherwise, the prepolymerized catalyst produced may be separated from the suspension before use.

When the prepolymerized catalyst is used for the polymerization to prepare the propylene polymer (A3), the organometallic compound catalyst component (e) is preferably used in combination with the prepolymerized catalyst.

The propylene polymer (A3) can be prepared by polymerizing propylene in the presence of the olefin polymerization catalyst (2). In the polymerization of propylene, ethylene and monomers which are exemplified for the propylene polymer (A1) and the propylene polymer (A2), such as α-olefins of 4 to 20 carbon atoms, may be used in amounts of not more than 0.1 mol per 1 mol of propylene.

The propylene polymer (A3) may be prepared by either a liquid phase polymerization process such as a solution polymerization process and a suspension polymerization process, or a gas phase polymerization process.

When the polymerization is conducted in the reaction form of suspension polymerization, polyene compounds and olefins which are liquid at reaction temperatures and/or the same inert solvents as used for the aforementioned prepolymerization can be used as the reaction solvent.

The olefin polymerization catalyst (2) used for the polymerization is generally used in the following amount, though the amount varies depending upon the kind.

The solid titanium catalyst component (d) (including the prepolymerized catalyst) is used in an amount of usually about 0.001 to 100 mmol, preferably about 0.005 to 20 mmol, in terms of the titanium atom in the solid titanium catalyst component (d) or the prepolymerized catalyst, based on 1 liter of the polymerization volume.

The organometallic compound catalyst component (e) is used in such an amount that the amount of the metal atom in said catalyst component (e) is in the range of usually about 1 to 2,000 mol, preferably about 5 to 500 mol, based on 1 mol of the titanium atom in the solid titanium catalyst component (d) or the prepolymerized catalyst.

The electron donors (k) and (l) may be also employed in addition to the catalyst component (d) and the catalyst component (e). When the electron donor is used, the amount of the electron donor is in the range of usually about 0.001 to 10 mol, preferably 0.01 to 5 mol, based on 1 mol of the metal atom in the organometallic compound catalyst component (e).

The olefin polymerization catalyst (2) may contain other components than the above-mentioned components, which are useful for the olefin polymerization.

The molecular weight of the resulting polymer may be regulated if hydrogen is used in the polymerization, and thereby a polymer having a high melt flow rate can be obtained.

The polymerization is generally carried out under the following conditions. The polymerization temperature is in the range of about −40 to 300° C., preferably about −20 to 150° C., and the polymerization pressure is in the range of atmospheric pressure to 100 kg/cm$^2$, preferably about 2 to 50 kg/cm$^2$.

The polymerization can be carried out either batchwise, semi-continuously or continuously. Further, the polymerization can be conducted in two or more steps, and in this case, the reaction conditions may be the same as or different from each other.

The Fourth Propylene Polymer Composition

The fourth propylene polymer composition comprises:
(A3) a propylene polymer which is prepared by the use of an olefin polymerization catalyst comprising the solid titanium catalyst component (d) and the organometallic compound catalyst component (e), and which has MFR, as measured at 230° C. under a load of 2.16 kg, of 0.01 to 30 g/10 min, and a molecular weight distribution (Mw/Mn), as measured by GPC, of 4 to 15;
(A2) a propylene polymer which is characterized in that:
the propylene polymer is prepared by the use of an olefin polymerization catalyst comprising:
(i) (a) a transition metal compound, and
(ii) at least one compound selected from the group consisting of
(b) an organoaluminum oxy-compound, and
(c) a compound which reacts with the transition metal compound (a) to form an ion pair,
the propylene polymer has MFR, as measured at 230° C. under a load of 2.16 kg, of 30 to 1,000 g/10 min, and
the propylene polymer has a molecular weight distribution (Mw/Mn), as measured by GPC, of 2 to 4; and
(B) a soft polymer.

Propylene Polymer (A3)

The propylene Polymer (A3) for constituting the fourth propylene polymer composition is identical with the propylene polymer (A3) for constituting the above-mentioned third propylene polymer composition.

Propylene Polymer (A2)

The propylene Polymer (A2) for constituting the fourth propylene polymer composition is identical with the propylene polymer (A2) for constituting the above-mentioned first propylene polymer composition.

Soft Polymer (B)

The soft polymer (B) for constituting the fourth propylene polymer composition is identical with the soft polymer (B) for constituting the above-mentioned second propylene polymer composition.

Propylene Polymer Composition

The fourth propylene polymer composition comprises the propylene polymer (A3), the propylene polymer (A2) and the soft polymer (B). In this composition, it is desired that the propylene polymer (A3) is contained in an amount of 10 to 90 parts by weight, preferably 30 to 70 parts by weight; the propylene polymer (A2) is contained in an amount of 10 to 90 parts by weight, preferably 30 to 70 parts by weight; and the soft polymer (B) is contained in an amount of 3 to 30 parts by weight, preferably 10 to 25 parts by weight. A ratio [(A2)/(A3)] of the MFR of the propylene polymer (A2) to the MFR of the propylene polymer (A3) is not less than 30, preferably in the range of 40 to 100.

The fourth propylene polymer composition is desired to have MFR, as measured at 230° C. under a load of 2.16 kg, of 1 to 100 g/10 min, preferably 5 to 50 g/10 min. In this composition, Mw/Mn of all the propylene components for constituting the composition is desirably in the range of 5 to 15.

The density of the fourth propylene polymer composition is desired to be in the range of 0.88 to 0.92 g/cm$^3$, preferably 0.89 to 0.92 g/cm$^3$.

The heat distortion temperature (HDT) thereof is desired to be not lower than 85° C., preferably in the range of 95 to 140° C.

The flexural modulus (FM) thereof is desired to be in the range of 8,500 to 18,000 kg/cm$^2$, preferably 9,000 to 15,000 kg/cm$^2$.

The Izod impact strength (IZ) thereof at 23° C. is desired to be in the range of 10 to 50 kg·cm/cm, preferably 10 to 40 kg·cm/cm.

The tensile elongation at break (EL) thereof is desired to be in the range of 200 to 1,000%, preferably 300 to 500%.

The fourth propylene polymer composition may contain the aforesaid additives, if necessary, with the proviso that the object of the invention is not marred.

The fourth propylene polymer composition can be prepared by known processes. For example, the composition can be prepared in accordance with the processes (1) to (4) described for the first propylene polymer composition, using the propylene polymer (A3), the propylene polymer (A2), the soft polymer (B) and if desired other components which may be optionally added.

The Fifth Propylene Polymer Composition

The fifth propylene polymer composition according to the invention comprises:

(A4) a propylene polymer which is prepared by the use of a catalyst comprising (d) the solid titanium catalyst component and (e) the organometallic compound catalyst component, and which has MFR, as measured at 230° C. under a load of 2.16 kg, of 0.01 to 50 g/10 min, a molecular weight distribution (Mw/Mn), as measured by GPC, of 4 to 15 and a crystallinity, as measured by X-ray diffractometry, of not less than 50%; and (C) an ethylene/olefin random copolymer which is characterized in that:

the copolymer is prepared by the use of a catalyst comprising:

(i) (f) a transition metal compound containing a ligand having a cyclopentadienyl skeleton, (ii) at least one compound selected from the groups consisting of (b) an organoaluminum oxy-compound, and (g) a compound which reacts with the transition metal compound (f) to form an ion pair, the copolymer contains constituent units derived from ethylene in an amount of 20 to 80% by mol, and the copolymer has an intrinsic viscosity [η], as measured in decalin at 135° C., of 1.5 to 5 dl/g.

Propylene Polymer (A4)

The propylene Polymer (A4) is a propylene homopolymer or a propylene copolymer, and desirably has MFR, as measured at 230° C. under a load of 2.16 kg, of 0.01 to 50 g/10 min, preferably 1 to 30 g/10 min. The molecular weight distribution (Mw/Mn) of this propylene polymer, as measured by GPC, is desired to be in the range of 4 to 15, preferably 4 to 8. Further, this propylene polymer is desired to have a crystallinity, as measured by X-ray diffractometry, of not less than 50%, more preferably not less than 60%, and to be highly crystalline.

The propylene polymer (A4) is desired to have an intrinsic viscosity [η], as measured in decalin at 135° C., of 1.3 to 5.0 dl/g, preferably 1.4 to 3.0 dl/g, a weight-average molecular weight of $12 \times 10^4$ to $100 \times 10^4$, preferably $13 \times 10^4$ to $40 \times 10^4$, and a boiling heptane extraction residue proportion (I.I.) of not less than 90%, preferably not less than 93%.

The propylene polymer (A4) may contain constituent units derived ethylene and α-olefins of 4 to 20 carbon atoms in an amount of not more than 5% by mol.

Examples of the α-olefins of 4 to 20 carbon atoms include 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eicosene.

Ethylene/olefin Random Copolymer (C)

The ethylene/olefin random copolymer (C) contains constituent units derived from ethylene in an amount of 20 to 80% by mol, preferably 30 to 60% by mol, and contains constituent units derived from at least one monomer (olefin) selected from α-olefins of 3 to 20 carbon atoms and polyenes of 5 to 20 carbon atoms in an amount of 80 to 20% by mol, preferably 70 to 40% by mol.

Examples of the α-olefins of 3 to 20 carbon atoms include propylene, 1-butene, 1-pentene, 1-hexene, 4-methyl-1-pentene, 1-octene, 1-decene, 1-dodecene, 1-tetradecene, 1-hexadecene and 1-octadecene. Of these, propylene is preferred. These α-olefins may be used singly or in combination of two or more.

The polyene of 5 to 20 carbon atoms is, for example, a conjugated or non-conjugated polyene having two or more olefinic double bonds.

Examples of such polyenes include:

chain polyene compounds, such as 1,3-pentadiene, 1,4-pentadiene, 1,3-hexadiene, 1,4-hexadiene, 1,5-hexadiene, 4-methyl-1,4-hexadiene, 5-methyl-1,4-hexadiene, 6-methyl-1,6-octadiene, 7-methyl-1,6-octadiene, 6-ethyl-1,6-octadiene, 6-propyl-1,6-octadiene, 6-butyl-1,6-octadiene, 6-methyl-1,6-nonadiene, 7-methyl-1,6-nonadiene, 6-ethyl-1,6-nonadiene, 7-ethyl-1,6-nonadiene, 6-methyl-1,6-decadiene, 7-methyl-1, 6-decadiene, 6-methyl-1, 6-undecadiene, 1,7-octadiene, 1,9-decadiene, 2,4,6-octatriene, 1,3,7-octatriene, 1,5,9-decatriene and divinylbenzene; and cyclic polyene compounds, such as 1,3-cyclopentadiene, 1,3-cyclohexadiene, 5-ethyl-1,3-cyclohexadiene, 1,3-cycloheptadiene, dicyclopentadiene, dicyclohexadiene, 5-ethylidene-2-norbornene, 5-vinyl-2-norbornene, 5-isopropylidene-2-norbornene, methylhydroindene, 2,3-diisopropylidene-5-norbornene, 2-ethylidene-3-isopropylidene-5-norbornene, 2-ethylidene-3-isopropylidene-5-norbornene and 2-propenyl-2,5-norbornadiene.

The ethylene/olefin random copolymer (C) has an intrinsic viscosity [η], as measured in decalin at 135° C., of 1.5 to 5 dl/g, preferably 2.0 to 4.0 dl/g.

The ethylene/olefin random copolymer (C) desirably has a molecular weight distribution (Mw/Mn), as measured by GPC, of not more than 3.0, preferably 2.0 to 2.5.

Further, the ethylene/olefin random copolymer (C) is desired to have a glass transition temperature (Tg) of not higher than −40° C., preferably not higher than −50° C.

The ethylene/olefin random copolymer (C) is desired to be lowly crystalline or amorphous, and to have a crystallinity, as measured by X-ray diffractometry, of not more than 30%, preferably 0 to 10%.

Propylene Polymer Composition

The fifth propylene polymer composition comprises the propylene polymer (A4) and the ethylene/olefin random copolymer (C). In this composition, it is desired that the propylene polymer (A4) is contained in an amount of 50 to 97% by weight, preferably 70 to 90% by weight; and the ethylene/olefin random copolymer (C) is contained in an amount of 3 to 50% by weight, preferably 10 to 30% by weight.

The fifth propylene polymer composition is desired to have MFR, as measured at 230° C. under a load of 2.16 kg, of 0.01 to 100 g/10 min, preferably 1 to 50 g/10 min. In this composition, Mw/Mn of all the propylene components for constituting the composition is desirably in the range of 4 to 15.

The density of the fifth propylene polymer composition is desired to be in the range of 0.88 to 0.92 g/cm³, preferably 0.89 to 0.92 g/cm³.

The flexural modulus (FM) thereof is desired to be in the range of 8,000 to 17,000 kg/cm², preferably 9,000 to 15,000 kg/cm².

The Izod impact strength (IZ) thereof at 23° C. is desired to be in the range of 10 to 50 kg·cm/cm, preferably 10 to 40 kg·cm/cm, and at −30° C. in the range of 5 to 15 kg·cm/cm, preferably 7 to 15 kg·cm/cm.

The tensile elongation at break (EL) thereof is desired to be in the range of 200 to 500%, preferably 250 to 450%.

The heat distortion temperature (HDT) thereof is desired to be not lower than 80° C., preferably in the range of 90 to 110° C.

The fifth propylene polymer composition may contain, if necessary, additives which may be added to the first propylene polymer composition, with the proviso that the object of the invention is not marred.

The fifth propylene polymer composition can be prepared by known processes. For example, the composition can be prepared in accordance with the processes (1) to (4) described for the first propylene polymer composition, using the propylene polymer (A4) and the ethylene/olefin random copolymer (C).

Such fifth propylene polymer composition is excellent in not only heat resistance and rigidity but also mechanical strength such as flexural strength and impact resistance.

The fifth propylene polymer composition is excellent especially in the low-temperature impact resistance as compared with a propylene polymer composition comprising a propylene polymer and an ethylene/olefin random copolymer prepared by the use of a conventional titanium catalyst.

The fifth propylene polymer composition can be favorably used for structural materials such as those of automobiles and electrical appliances.

Next, the catalyst used for the preparation of the propylene polymer (A4), the process for preparing said catalyst, the catalyst used for the preparation of the ethylene/olefin random copolymer and the process for preparing said catalyst are described.

The propylene polymer (4) is obtained by polymerizing propylene in the presence of an olefin polymerization catalyst comprising the solid titanium catalyst component (d) and the organometallic compound catalyst component (e), said catalyst being the same as the olefin polymerization catalyst (2) which is used for the preparation of the propylene polymer (A3).

In the polymerization of propylene, other monomers than propylene, such as ethylene and the aforesaid α-olefins of 4 to 20 carbon atoms, may be used in the amounts of not more than 0.1 mol based on 1 mol of propylene.

The propylene polymer (A4) can be prepared by either a liquid phase polymerization process such as a solution polymerization process and a suspension polymerization process, or a gas phase polymerization process.

When the polymerization is conducted in the reaction form of the suspension polymerization, polyene compounds and olefins which are liquid at reaction temperatures and/or the same inert solvents as used for the preparation of the olefin polymerization catalyst (1) can be used as the reaction solvent.

The olefin polymerization catalyst used for the polymerization is generally used in the following amount, though the amount varies depending upon the kind.

The solid titanium catalyst component (d) (including the prepolymerized catalyst) is used in an amount of usually about 0.001 to 100 mmol, preferably about 0.005 to 20 mmol, in terms of the titanium atom in the solid titanium catalyst component (d) or the prepolymerized catalyst, based on 1 liter of the polymerization volume.

The organometallic compound catalyst component (e) is used in such an amount that the amount of the metal atom in said catalyst component (e) is in the range of usually about 1 to 2,000 mol, preferably about 5 to 500 mol, based on 1 mol of the titanium atom in the solid titanium catalyst component (d) or the prepolymerized catalyst.

The same electron donors as the aforesaid electron donors (k) and (l) may be also employed in addition to the catalyst component (d) and the catalyst component (e). When the electron donor is used, the amount of the electron donor is in the range of usually about 0.001 to 10 mol, preferably 0.01 to 5 mol, based on 1 mol of the metal atom in the organometallic compound catalyst component (e).

The olefin polymerization catalyst used for preparing the propylene polymer (A4) may contain other components than the above-mentioned components, which are useful for the olefin polymerization.

The molecular weight of the resulting polymer can be regulated if hydrogen is used in the polymerization, whereby a polymer having a high melt flow rate can be obtained.

The polymerization is generally carried out under the following conditions. The polymerization temperature is in the range of about −40 to 300° C., preferably about −20 to 150° C., and the polymerization pressure is in the range of atmospheric pressure to 100 kg/cm², preferably about 2 to 50 kg/cm².

The polymerization can be carried out either batchwise, semi-continuously or continuously. Further, the polymerization can be conducted in two or more steps, and in this case, the reaction conditions may be the same as or different from each other.

The ethylene/olefin random copolymer (C) is obtained by copolymerizing ethylene and at least one monomer (olefin) selected from an α-olefin of 3 to 20 carbon atoms and a polyene of 5 to 20 carbon atoms in the presence of an olefin polymerization catalyst [olefin polymerization catalyst (3)] comprising:

(i) (f) a transition metal compound containing a ligand having a cyclopentadienyl skeleton, and (ii) at least one compound selected from the group consisting of (b) an organoaluminum oxy-compound, and (g) a compound which reacts with the transition metal compound (f) to form an ion pair.

Figure 3:
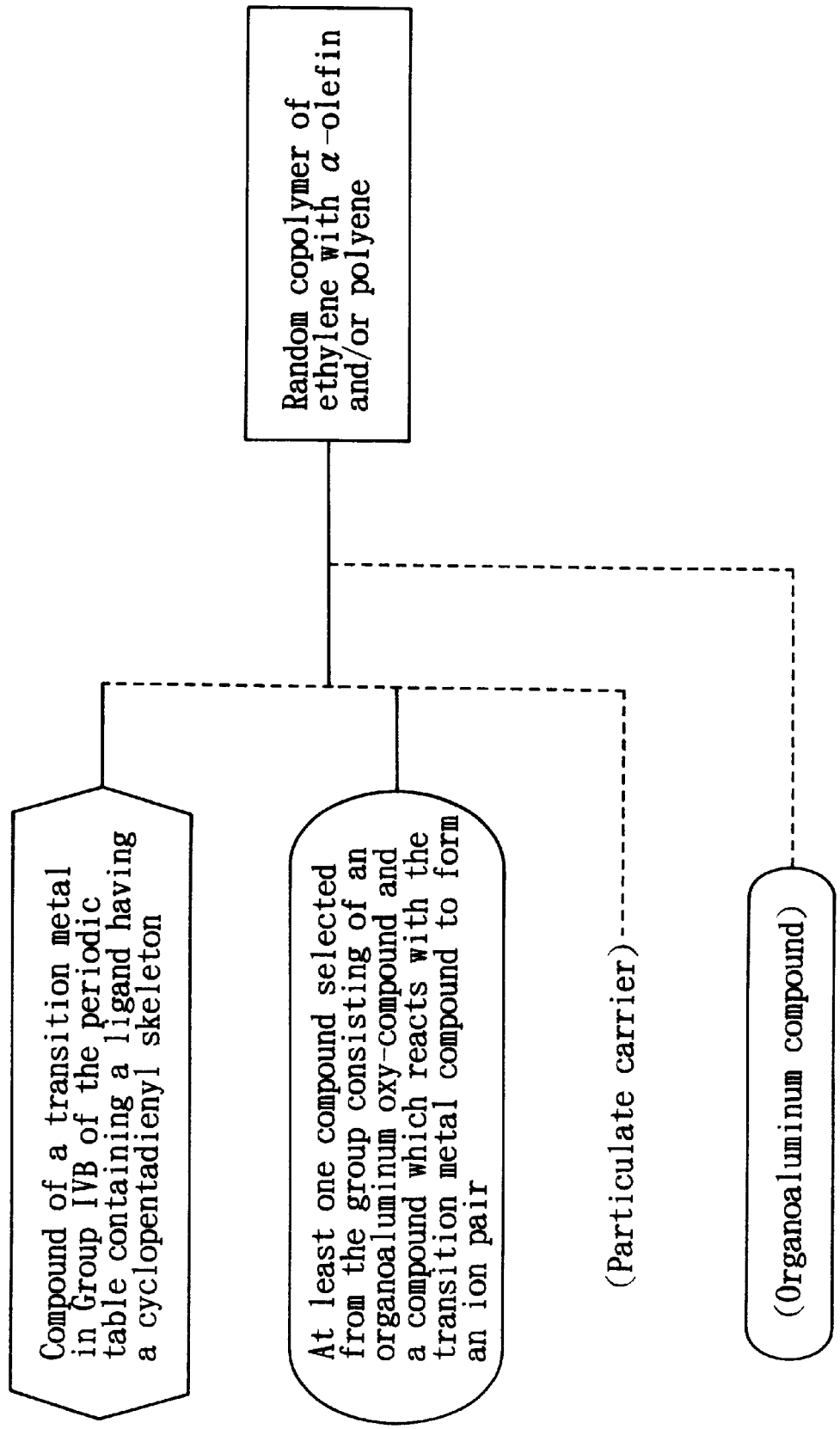
FIG. 3 is a view illustrating steps of a process for preparing an olefin polymerization catalyst which is used for the preparation of the ethylene/olefin random copolymer (C).

FIG. 3 illustrates steps of a process for preparing the olefin polymerization catalyst which is used for the preparation of the ethylene/olefin random copolymer (C).

Examples of the transition metal compound (f) having a cyclopentadienyl skeleton include the transition metal compound (h) represented by the aforementioned formula (I) and the compound represented by the following formula (Ic).

  (Ic)

wherein M is a transition metal atom selected from the group consisting of zirconium, titanium, hafnium, vanadium, niobium, tantalum and chromium, L is a ligand coordinating to the transition metal, at least one of L is a ligand having a cyclopentadienyl skeleton, and L other than the ligand having a cyclopentadienyl skeleton is a hydrocarbon group of 1–12 carbon atoms, an alkoxy group, an aryloxy group, a trialkylsilyl group, $SO_3R$ group (provided that R is a hydrocarbon group of 1–8 carbon atoms which may have such a substituent as halogen), halogen atom or hydrogen atom, and x is a valence of the transition metal atom.

The ligands having a cyclopentadienyl skeleton are, for example, cyclopentadienyl group, alkyl-substituted cyclopentadienyl groups such as methylcyclopentadienyl, dimethylcyclopentadienyl, trimethylcyclopentadienyl, tetramethylcyclopentadienyl, pentamethylcyclopentadienyl, ethylcyclopentadienyl, methylethylcyclopentadienyl, propylcyclopentadienyl, methylpropylcyclopentadienyl, butylcyclopentadienyl, methylbutylcyclopentadienyl and hexylpentadienyl, or indenyl group, 4,5,6,7-tetrahydroindenyl group and fluorenyl group. These groups as exemplified above may be substituted with a halogen atom or trialkylsilyl group.

Of the ligands coordinating with the transition metal atom, particularly preferred is an alkyl-substituted cyclopentadienyl group.

When the compound represented by the formula (Ic) contains 2 or more ligands each having a cyclopentadienyl skeleton, the two ligands out of those having a cyclopentadienyl skeleton may be linked together through an alkylene group such as ethylene or propylene, a substituted alkylene group such as isopropylidene or diphenylmethylene, a silylene group or a substituted silylene group such as dimethylsilylene, diphenylsilylene or methylphenylsilylene.

The ligands L other than those having a cyclopentadienyl skeleton may include those mentioned below.

The hydrocarbon group of 1–12 carbon atoms includes such group as alkyl, cycloalkyl, aryl or aralkyl, and more particularly, the alkyl group includes methyl, ethyl, propyl, isopropyl or butyl;

the cycloalkyl group includes cyclopentlyl or cyclohexyl;

the aryl group includes phenyl or tolyl; and the aralkyl group includes benzyl or neophyl.

Further, the alkoxy group includes methoxy, ethoxy or butoxy;

aryloxy group includes phenoxy;

the halogen includes fluorine, chlorine, bromine or iodine; and the ligand represented by $SO_3R$ includes p-toluenesulfonate, methanesulfonate or trifluoromethanesulfonate.

When the valence of the transition metal atom is, for example, 4, the transition metal compound is represented by the following formula (Id) in more detail.

$$R^2{}_k R^3{}_l R^4{}_m R^5{}_n M \qquad (Id)$$

wherein M represents the aforementioned transition metal atom, $R^2$ represents a group (ligand) having a cyclopentadienyl skeleton, $R^3$, $R^4$ and $R^5$ each represent a group having a cyclopentadienyl skeleton, alkyl group, cycloalkyl group, aryl group, aralkyl group, alkoxyl group, aryloxy group, trialkylsilyl group, $SO_3R$ group, halogen atom or hydrogen atom, k is an integer of 1 or more, and k+l+m+n=4.

In the present invention, there is used preferably a metallocene compound having the above-mentioned formula (Id) in which at least two of $R^2$, $R^3$, $R^4$ and $R^5$ are the groups (ligands) having a cyclopentadienyl skeleton, for example, $R^2$ and $R^3$ are the groups (ligands) having a cyclopentadienyl. In this case, the groups having a cyclopentadienyl skeleton mentioned above may be linked together through an alkylene group such as ethylene or propylene, a substituted alkylene group such as isopropylene or diphenylmethylene, a silylene group or a substituted silylene group such as dimethylsilylene, diphenylsilylene or methylphenylsilylene. Further, $R^4$ and $R^5$ are each a group having a cyclopentadienyl skeleton, alkyl group, cycloalkyl group, aryl group, arlakyl group, alkoxyl group, aryloxy group, trialkylsilyl group, $SO_3R$ group, halogen atom or hydrogen atom.

Exemplified below are the transition metal compounds wherein M is zirconium.

Bis(indenyl)zirconium dichloride,
Bis(indenyl)zirconium dibromide,
Bis(indenyul)zirconium bis(p-toluenesulfonate),
Bis(4,5,6,7-tetrahydroindenyl)zirconium dichloride,
Bis(fluorenyl)zirconium dichloride,
Ethylenebis(indenyl)zirconium dichloride,
Ethylenebis(indenyl)zirconium dibromide,
Ethylenebis(indenyl)dimethylzirconium,
Ethylenebis(indenyl)diphenylzirconium,
Ethylenebis(indenyl)methylzirconium monochloride,
Ethylenebis(indenyl)zirconium bis(methanesulfonate),
Ethylenebis(indenyl)zirconium bis(p-toluenesulfonate),
Ethylenebis(indenyl)zirconium bis(trifluoromethanesulfonate),
Ethylenebis(4,5,6,7-tetrahydroindenyl)zirconium dichloride,
Isopropylidene(cyclopentadienyl-fluorenyl)zirconium dichloride,
Isopropylidene(cyclopentadienyl-methylcyclopentadienyl)zirconium dichloride,
Dimethylsilylenebis(cyclopentadienyl)zirconium dichloride,
Dimethylsilylenebis(methylcyclopentadienyl)zirconium dichloride,
Dimethylsilylenebis(dimethylcyclopentadienyl)zirconium dichloride,
Dimethylsilylenebis(trimethylcyclopentadienyl) zirconium dichloride,
Dimethylsilylenebis(indenyl)zirconium dichloride,
Dimethylsilylenebis(2-methylindenyl)zirconium dichloride,
Dimethylsilylenebis(2-methyl, 4-isopropylindenyl) zirconium dichloride,
Dimethylsilylenebis(indenyl)zirconium bis(trifluoromethane-sulfonate),
Dimethylsilylenebis(4,5,6,7-tetrahydroindenyl)zirconium dichloride,
Dimethylsilylene(cyclopentadienyl-fluorenyl)zirconium dichloride,
Diphenylsilylenebis(indenyl)zirconium dichloride,
Diphenylsilylenebis(2-methyl, 4-isopropylindenyl) zirconium dichloride,
Methylphenylsilylenebis(indenyl)zirconium dichloride,
Bis(cyclopentadienyl)zirconium dichloride,
Bis(cyclopentadienyl)zirconium dibromide,
Bis(cyclopentadienyl)methylzirconium monochloride,
Bis(cyclopentadienyl)ethylzirconium monochloride,
Bis(cyclopentadienyl)cyclohexylzirconium monochloride,
Bis(cyclopentadienyl)phenylzirconium monochloride,
Bis(cyclopentadienyl)benzylzirconium monochloride,
Bis(cyclopentadienyl)zirconium monochloride monohydride,
Bis(cyclopentadienyl)methylzirconium monohydride,
Bis(cyclopentadienyl)dimethylzirconium,
Bis(cyclopentadienyl)diphenylzirconium,
Bis(cyclopentadienyl)dibenzylzirconium, Bis(cyclopentadienyl)zirconium methoxychloride,
Bis(cyclopentadienyl)zirconium ethoxychloride,
Bis(cyclopentadienyl)zirconium bis(methanesulfonate),
Bis(cyclopentadienyl)zirconium bis(p-toluenesulfonate),
Bis(cyclopentadienyl)zirconium bis(trifluoromethanesulfonate),
Bis(methylcyclopentadienyl)zirconium dichloride,
Bis(dimethylcyclopentadienyl)zirconium dichloride,
Bis(dimethylcyclopentadienyl)zirconium ethoxychloride,
Bis (dimethylcyclopentadienyl)zirconium bis(trifluoromethanesulfonate),
Bis(ethylcyclopentadienyl)zirconium dichloride,
Bis(methylethylcyclopentadienyl)zirconium dichloride,
Bis(propylcyclopentadienyl)zirconium dichloride,
Bis(methylpropylcyclopentadienyl)zirconium dichloride,
Bis(butylcyclopentadienyl)zirconium dichloride,
Bis(methylbutylcyclopentadienyl)zirconium dichloride,
Bis(methylbutylcyclopentadienyl)zirconium bis(methanesulfonate),
Bis(trimethylcyclopentadienyl)zirconium dichloride,
Bis(tetramethylcyclopentadienyl)zirconium dichloride,
Bis(pentamethylcyclopentadienyl)zirconium dichloride,
Bis(hexylcyclopentadienyl)zirconium dichloride, and
Bis(trimethylsilylcyclopetnadienyl)zirconium dichloride.

In the compounds exemplified above, the di-substituted cyclopentadienyl ring includes 1,2- and 1,3-substituted compounds, and the tri-substituted cyclopentadienyl ring includes 1,2,3- and 1,2,4-substituted compounds. Further, the alkyl group such as propyl or butyl includes isomer such as n-, i-, sec-, tert-compounds, In the present invention, the above-exemplified zirconium compounds in which the zirconium has been replaced by titanium, hafnium, vanadium, niobium, tantalum or chromium can also be used as the transition metal compounds.

Of the above-exemplified transition metal compounds, preferably used are the zirconocene compounds which have zirconium as the central metal atom and have at least two ligands containing a cyclopentadienyl skeleton.

In the present invention, the transition metal compound represented by the aforementioned formula (I) is particularly preferably used as the transition metal compound (f).

The transition metal compounds may be used singly or in combination of two or more kinds. These compounds may be used by diluting them with hydrocarbons or halogenated hydrocarbons.

The transition metal compound (f) may be supported on a particulate carrier. As the carrier, the same particulate carrier as used in the preparation of the olefin polymerization catalyst (2) can be mentioned.

The organoaluminum oxy-compound (b) is identical with the aforesaid organoaluminum oxy-compound, and this organoaluminum oxy-compound (b) can be used by supporting it on the above-mentioned carrier.

The compound (g) which reacts with the transition metal compound (f) to form an ion pair is identical with the aforesaid compound (c), and this compound (g) can be used by supporting it on the above-mentioned carrier.

The olefin polymerization catalyst (3) used for preparing the ethylene/olefin random copolymer (C) can be prepared by mixing the transition metal compound (f) [component (f)] and the organoaluminum oxy-compound (b) [component (b)] (or the compound (g) which reacts with the transition metal compound (f) to form an ion pair, [component (g)]), and if desired, the organometallic compound (e) [component (e)] in an inert hydrocarbon solvent or an olefin solvent.

As the inert hydrocarbon solvent used for the olefin polymerization catalyst (3), the same inert hydrocarbon solvent as used for preparing the olefin polymerization catalyst (1) can be mentioned.

In the preparation of the olefin polymerization catalyst (3), each components may be mixed in an optional order, but preferably they are mixed in the following manner:

the component (b) [or the component (g)] is mixed with the component (f);

the component (b) is mixed with the component (e), and the resulting mixture is then mixed with the component (f);

the component (f) is mixed with the component (b) [or the component (g)], and the resulting mixture is then mixed with the component (e); or the component (f) is mixed with the component (e), and the resulting mixture is then mixed with the component (b) [or the component (g)].

In the mixing of each components, an atomic ratio (Al/transition metal) of the aluminum in the component (b) to the transition metal in the component (f) is in the range of usually 10 to 10,000, preferably 20 to 5,000; and a concentration of the component (f) is in the range of about $10^{-8}$ to $10^{-1}$ mol/l-solvent, preferably $10^{-7}$ to $5 \times 10^{-2}$ mol/l-solvent.

When the component (g) is used, a molar ratio [component (f)/component (g)] of the component (f) to the component (g) is in the range of usually 0.01 to 10, preferably 0.1 to 5; and a concentration of the component (f) is in the range of about 10–8 to 10–1 mol/l-solvent, preferably 10–7 to 5×10–2 mol/l-solvent.

When the component (e) is used, an atomic ratio (M/Al) of the metal atom (M) in the component (e) to the aluminum atom (Al) in the component (b) is in the range of usually 0.02 to 20, preferably 0.2 to 10.

The above-mentioned components may be mixed in a polymerizer. Otherwise, a mixture of the components beforehand prepared may be fed to a polymerizer.

If the components are beforehand mixed, the mixing temperature is in the range of usually –50 to 150° C., preferably –20 to 120° C.; and the contact time is in the range of 1 to 1,000 minutes, preferably 5 to 600 minutes. The mixing temperature may be varied while the components are mixed and contacted with each other.

The olefin polymerization catalyst (3) may be an olefin polymerization solid catalyst in which at least one of the component (f), the component (b) [or the component (g)] and the component (e) is supported on an inorganic or organic carrier of granular or particulate solid.

As the particulate carrier, those used for the preparation of the aforesaid olefin polymerization catalyst (2) can be employed.

The olefin polymerization catalyst (3) may be a prepolymerized catalyst formed from the particulate carrier, the component (f), the component (b) [or the component (g)] and an olefin polymer produced by the prepolymerization, and if desired, the component (e).

The olefin used for the prepolymerization includes olefins such as propylene, ethylene and 1-butene, but a mixture of these olefins and other olefin may also be employed.

In addition to the above components, the olefin polymerization catalyst (3) may contain other components which are useful for the olefin polymerization, for example, water as a catalyst component.

The ethylene/olefin random copolymer (C) can be prepared by copolymerizing ethylene and at least one monomer (olefin) selected from α-olefins of 3 to 20 carbon atoms and polyenes of 5 to 20 carbon atoms in the presence of the olefin polymerization catalyst (3). In the copolymerization, ethylene and the olefin are used in such amounts that the resulting ethylene/olefin random copolymer (C) has the aforementioned composition.

The copolymerization to prepare the ethylene/olefin random copolymer (C) may be carried out in the presence of a hydrocarbon medium.

Examples of the hydrocarbon media include hydrocarbons which are used for preparing the organoaluminum oxy-compound (b).

Of such hydrocarbons, preferably used are hexane, methylpentane, methylcyclopentane, heptane, octane, cyclohexane, etc. Also employable as the hydrocarbon medium is an α-olefin which is liquid under the copolymerization conditions.

The polymerization of ethylene and an olefin is carried out under the conditions of a temperature of usually −20 to 200° C., preferably 0 to 180° C., particularly preferably 20 to 160° C., and a pressure of usually atmospheric pressure to 100 kg/cm$^2$, preferably atmospheric pressure to 50 kg/cm$^2$, particularly preferably atmospheric pressure to 30 kg/cm$^2$.

The molecular weight of the resulting copolymer can be regulated by varying the polymerization conditions such as a polymerization temperature or by controlling the amount of hydrogen (molecular weight regulator) used.

In the present invention, the molecular weight is regulated so that the resulting copolymer has MFR of the aforesaid value.

The copolymerization may be carried out by a solution polymerization process, a suspension polymerization process, etc. In this invention, a solution polymerization process is preferably used. Though the polymerization reaction may be carried out either batchwise, semi-continuously or continuously, it is preferably carried out continuously. Further, it is also possible to conduct the polymerization in two or more steps having different reaction conditions.

The polymer obtained immediately after the polymerization can be recovered by conventionally known separation and recovery methods.

In the case of the solution polymerization, it is preferred to solidify the polymer by directly evaporating the solvent, or to solidify the polymer by evaporating the solvent from the concentrated phase after phase separation.

The Sixth Propylene Polymer Composition

The sixth propylene polymer composition comprises:

(A5) a propylene homopolymer which is obtained by polymerizing propylene in the presence of an olefin polymerization catalyst comprising:
(i) (h) a transition metal compound represented by the aforesaid formula (I), and
(ii) at least one compound selected from the group consisting of
(b) an organoaluminum oxy-compound, and
(i) a compound which reacts with the transition metal compound (h) to form an ion pair; and (A6) a propylene polymer which contains constituent units derived from propylene in an amount of not less than 90% by mol and is different from the propylene homopolymer (A5).

Propylene Homopolymer (A5)

The propylene homopolymer (A5) for constituting the sixth propylene polymer composition is a homopolymer of propylene which is prepared by the use of an olefin polymerization catalyst comprising a transition metal compound (h) represented by the aforesaid formula (I) and at least one compound selected from the organoaluminum oxy-compound (b) and the compound (i).

The propylene homopolymer (A5) is desired to have MFR, as measured at 230° C. under a load of 2.16 kg, of 0.01 to 1,000 g/10 min, preferably 0.5 to 200 g/10 min, and Mw/Mn, as measured by GPC, of 1.5 to 3.5, preferably 2.0 to 3.0, more preferably 2.0 to 2.5.

Further, the propylene homopolymer (A5) is desired to have an intrinsic viscosity [η], as measured in decalin at 135° C., of 0.1 to 20 dl/g, preferably 0.5 to 10 dl/g, more preferably 1 to 5 dl/g, and a weight-average molecular weight of 1×10$^3$ to 500×10$^4$, preferably 1×10$^4$ to 100×10$^4$.

The crystallinity of the propylene homopolymer (A5), as measured by X-ray diffractometry, is desired to be not less than 40%, preferably not less than 50%, and the boiling heptane extraction residue proportion (I.I.) thereof is desired to be not less than 90%, preferably not less than 93%.

The triad tacticity (mm fraction) of the propylene homopolymer (A5) is desired to be not less than 99.0%, preferably not less than 99.2%, more preferably not less than 99.5%.

The proportion of the irregularly positioned units (inversely inserted units) based on the 2,1-insertion of the propylene monomer is desired to be not more than 0.5%, preferably not more than 0.18%, more preferably not more than 0.15%.

The proportion of the irregularly positioned units based on the 1,3-insertion of the propylene monomer is desired to be less than the detected lower limit by the $^{13}$C-NMR measurement (less than 0.03%)

The triad tacticity (mm fraction), the proportion of the irregularly positioned units based on the 2,1-insertion of the propylene monomer, and the proportion of the irregularly positioned units based on the 1,3-insertion of the propylene monomer, of the above-mentioned propylene homopolymer and the later-described propylene copolymer are determined in the following manner.

[Triad tacticity (mm fraction)]

The triad tacticity (mm fraction) of the propylene copolymer is defined, when a sequence of optional three propylene units with head-to-tail bonds in the polymer chain is expressed by a planar zigzag structure, as a proportion of such propylene unit sequences that the direction of methyl branches thereof are the same as each other, and determined by the $^{13}$C-NMR spectrum using the following equation:

$$\text{Triad tacticity } (\%) = \frac{PPP(mm)}{PPP(mm) + PPP(mr) + PPP(rr)} \times 100$$

wherein PPP(mm), PPP(mr) and PPP(rr) denote absorption intensities originating from the methyl group of the second unit in the 3-propylene unit sequences with head-to-tail bonds represented by the following formulas, respectively:

PPP (mm):

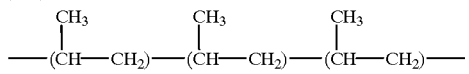

PPP (mr):

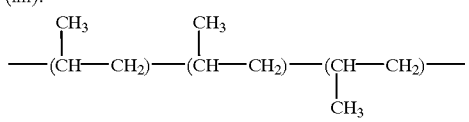

PPP (rr):

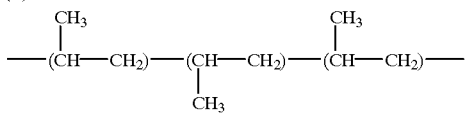

The $^{13}$C-NMR spectrum was measured in the following manner. A sample was completely dissolved in a mixed solvent containing about 0.5 ml of hexachlorobutadiene, o-dichlorobenzene or 1,2,4-trichlorobenzene and about 0.05 ml of deuterated benzene (i.e., lock solvent) in a NMR sample tube (diameter: 5 mm), and then subjected to a proton perfect decoupling method at 120° C. to measure the $^{13}$C-NMR spectrum. The measurement is conducted under the conditions of a flip angle of 45° and a pulse interval of not less than 3.4 $T_1$ ($T_1$ is a maximum value with respect to a spin-lattice relaxation time of the methyl group). As for the propylene, the spin-lattice relaxation time of the methyl group is longer than that of the methylene group and that of the methine group, and hence the magnetization recovery of all carbons in the sample under these conditions is not less than 99%. With respect to the chemical shift, the methyl group of the third unit in the 5-propylene unit sequence with head-to-tail bonds is set to 21.593 ppm, and the chemical shift of other carbon peak is determined by using this value as a reference.

The peak region is classified into the first region (21.1–21.9 ppm), the second region (20.3–21.0 ppm) and the third region (19.5–20.3 ppm).

In the first region, the methyl group of the second unit in the 3-propylene unit sequence represented by PPP(mm) resonates.

In the second region, the methyl group of the second unit in the 3-propylene unit sequence represented by PPP(mr) and the methyl group (PPE-methyl group) of a propylene unit whose adjacent units are a propylene unit and an ethylene unit resonate.

In the third region, the methyl group of the second unit in the 3-propylene unit sequence represented by PPP(rr) and the methyl group (EPE-methyl group) of a propylene unit whose adjacent units are ethylene units resonate.

The propylene copolymer has, as partial structures containing an irregularly positioned unit, the following structures (i), (ii) and (iii):

Of the peaks originating from these structures (i), (ii) and (iii), the peaks based on the carbon A and the carbon B do not appear in the first to third regions, because the carbon A and the carbon B resonate at 17.3 ppm and 17.0 ppm, respectively. Further, the carbon A and the carbon B have no concern with the 3-propylene unit sequence with head-to-tail bonds, so that it is unnecessary to take those carbons into account in the calculation of the triad tacticity.

The peak based on the carbon C, the peak based on the carbon D and the peak based on the carbon D' appear in the second region, and the peak based on the carbon E and the peak based on the carbon E' appear in the third region.

Accordingly, of the peaks which appear in the first to third regions, the peaks which are not based on the 3-propylene unit sequence with heat-to-tail bonds are those based on the PPE-methyl group (resonance in the vicinity of 20.7 ppm), the EPE-methyl group (resonance in the vicinity of 19.8 ppm), the carbon C, the carbon D, the carbon D', the carbon E and the carbon E'.

The peak area based on the PPE-methyl group can be determined from the peak area of the PPE-methine group (resonance in the vicinity of 30.6 ppm); and the peak area based on the EPE-methyl group can be determined from the peak area of the EPE methine group (resonance in the vicinity of 32.9 ppm). The peak area based on the carbon C can be determined from the peak area of the adjacent methine group (resonance in the vicinity of 31.3 ppm); the peak area based on the carbon D can be determined from ½ as much as the sum of the peak areas of the peaks based on the αβ methylene carbons of the above structure (ii) (resonance in the vicinity of the 34.3 ppm and in the vicinity of 34.5 ppm); the peak area based on the carbon D' can be determined from the peak area based on the methine group adjacent to the methyl group (resonance in the vicinity of 33.3 ppm) of the carbon E' of the above structure (iii); the peak area based on the carbon E can be determined from the peak area of the adjacent methine carbon (resonance in the vicinity of 33.7 ppm); and the peak area based on the carbon E' can be determined from the peak area of the adjacent methine carbon (resonance in the vicinity of 33.3 ppm).

Accordingly, by subtracting these peak areas from the total peak areas of the second and third regions, the peak areas originating from the 3-propylene unit sequences (PPP (mr) and PPP(rr)) consisting of head-to-tail bonds can be obtained.

Thus, the peak areas of PPP(mm), PPP(mr) and PPP(rr) can be determined, and hence the triad tacticity (mm fraction) of the propylene unit sequences consisting of the head-to-tail bonds can be calculated by the above-mentioned equation.

Structure (i)

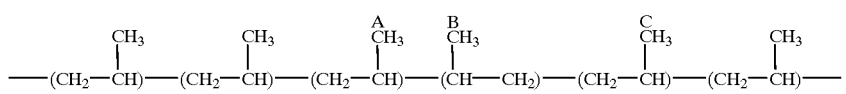

Structure (ii)

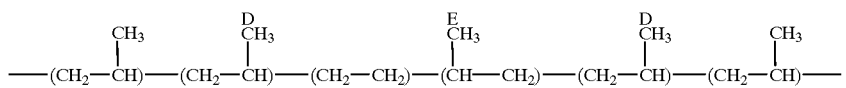

Structure (iii)

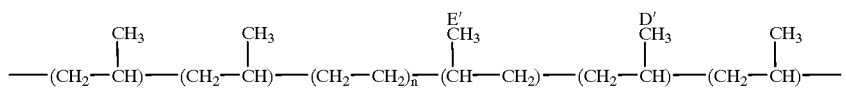

(n≧2)

The triad tacticity (mm fraction) of the propylene homopolymer is defined, when a sequence of optional three propylene units with head-to-tail bonds in the polymer chain is expressed by a planar zigzag structure, as a proportion of such propylene unit sequences that the direction of methyl groups thereof are the same as each other, and determined by the $^{13}$C-NMR spectrum using the following equation:

$$\text{Triad tacticity (\%)} = \frac{PPP(mm)}{\Sigma ICH_3}$$

wherein PPP(mm) has the same meaning as defined above, and $\Sigma ICH_3$ denotes the total peak areas based on all of the methyl groups.

With respect to the chemical shift, the methyl group of the third unit in the 5-propylene unit sequence with heat-to-tail bonds is set to 21.593 ppm, and the chemical shift of other carbon peak is determined by using this value as a standard.

In accordance with the standard, the peak based on the methyl group of the second unit in the 3-propylene unit sequence represented by PPP(mm) appears within the range of 21.1 to 21.9 ppm; the peak based on the methyl group of the second unit in the 3-propylene unit sequence represented by PPP(mr) appears within the range of 20.3 to 21.0 ppm; and the peak based on the methyl group of the second unit in the 3-propylene unit sequence represented by PPP(rr) appears within the range of 19.5 to 20.3 ppm.

The propylene homopolymer has such a partial structure containing the irregularly positioned unit based on the 2,1-insertion as represented by the aforesaid structure (i) in a small amount, in addition to the regular structure in which the propylene units are bonding with head-to-tail.

In the irregular structure represented by the structure (i), the aforementioned definition of PPP(mm) is not applied to the carbon A, the carbon B and the carbon C. However, the carbon A and the carbon B resonate in the region of 16.5 to 17.5 ppm; and the carbon C resonates in the vicinity of 20.7 ppm (the region of PPP(mr)). (However, not only the peaks of these methyl groups but also the peaks of the adjacent methylene and methine groups must be confirmed in the case of identifying the partial structure containing an irregularly positioned unit.) Therefore, the carbon A, the carbon B and the carbon C are not included in the region of PPP(mm).

Accordingly, the triad tacticity (mm fraction) of the propylene homopolymer can be determined from the above equation.

[Proportion of the Irregularly Positioned Unit Based on the 2,1-insertion of the Propylene Monomer]

In the polymerization, the 1,2-insertion of the propylene monomer often takes place (i.e., the methylene side is bonded to the catalyst), but the 2,1-insertion thereof sometimes takes place. Therefore, the propylene copolymer has such irregularly positioned units based on the 2,1-insertion as represented by the aforesaid structures (i), (ii) and (iii). The proportion of the irregularly positioned units based on the 2,1-insertion was calculated by the following formula using the $^{13}$C-NMR. Proportion of irregularly positioned unit based on 2,1-insertion $$= \frac{\{0.5I\alpha\beta(\text{structure}(i),(iii)) + 0.25I\alpha\beta(\text{structure}(ii))\} \times 100}{I\alpha\alpha + I\alpha\beta(\text{structure}(i),(iii)) + 0.5(I\alpha\gamma + I\alpha\beta(\text{structure}(ii) + I\alpha\delta)}$$

Naming of the peaks was made in accordance with a method by Carman, et al. (Rubber Chem. Technol., 44 (1971), 781). $I_{\alpha\beta}$ denotes a peak area of the $\alpha\beta$ peak.

The propylene homopolymer has such an irregularly positioned unit based on the 2,1-insertion as represented by the aforesaid structure (i). The proportion of the irregularly positioned units based on the 2,1-insertion was calculated by the following formula using the $^{13}$C-NMR.

Proportion of irregularly positioned unit based on 2,1-insertion $$= \frac{0.5\{\text{area based on methyl group resonating in the region of } 16.5 \sim 17.5 \text{ ppm}\}}{\Sigma ICH_3}$$

wherein $\Sigma ICH_3$ has the same meaning as defined above.

[Proportion of the Irregularly Positioned Unit Based on the 1,3-insertion of the Propylene Monomer]

In the propylene copolymer, the amount of the three sequences based on the 1,3-insertion of propylene was determined by the βγ peak (resonance in the vicinity of 27.4 ppm).

In the propylene homopolymer, the amount of the three sequences based on the 1,3-insertion of propylene was determined by the αδ peak (resonance in the vicinity of 37.1 ppm) and the βγ peak (resonance in the vicinity of 27.4 ppm).

Propylene Polymer (A6)

The propylene Polymer (A6) is a propylene homopolymer or a propylene copolymer containing constituent units derived from propylene in an amount of not less than 90% by mol.

The propylene polymer (A6) is desired to have MFR, as measured at 230° C. under a load of 2.16 kg, of 0.01 to 1,000 g/10 min, preferably 0.5 to 200 g/10 min. The molecular weight distribution (Mw/Mn) of this propylene polymer, as measured by GPC, is desired to be in the range of 1.5 to 15, preferably 2.0 to 8.0.

Further, the propylene polymer (A6) is desired to have a crystallinity, as measured by X-ray diffractometry, of not less than 40%, more preferably not less than 50%.

The propylene polymer (A6) is desired to have an intrinsic viscosity [η], as measured in decalin at 135° C., of 0.1 to 20 dl/g, preferably 0.5 to 10 dl/g, and a weight-average molecular weight of $1\times10^3$ to $500\times10^4$, preferably $1\times10^4$ to $100\times10^4$.

The propylene polymer (A6) may contain constituent units derived from ethylene and the same α-olefins of 4 to 20 carbon atoms as exemplified for the propylene polymer (A4) in the amounts of not more than 10%.

The propylene polymer (A6) can be prepared by the use of the olefin polymerization catalyst which is used for preparing the propylene polymer (A1), the olefin polymerization catalyst (2) which is used for preparing the propylene polymer (A3), the olefin polymerization catalyst (3) which is used for preparing the ethylene/α-olefin random copolymer (C), or an olefin polymerization catalyst (4) (described later) which is used for preparing the propylene polymer (A5). Among these olefin polymerization catalysts, preferably used are the olefin polymerization catalyst (1), the olefin polymerization catalyst (3) and the olefin polymerization catalyst (4), and of these, particularly preferably used is the olefin polymerization catalyst (4).

Propylene Polymer Composition

The sixth propylene polymer composition comprises the propylene homopolymer (A5) and the propylene polymer (A6) which is different from the propylene homopolymer (A5). In this composition, it is desired that the propylene homopolymer (A5) is contained in an amount of 5 to 95% by weight, preferably 15 to 85% by weight, more preferably 30 to 70% by weight; and the propylene polymer (A6) is contained in an amount of 5 to 95% by weight, preferably 15 to 85% by weight, more preferably 30 to 70% by weight.

In the sixth propylene polymer composition, when the intrinsic viscosity $([\eta]_{A5})$ of the propylene homopolymer (A5) and the intrinsic viscosity ($[\eta]_{A6}$) of the propylene polymer (A6) has a relation of $[\eta]_{A5} \geq [\eta]_{A6}$, it is desired that $[\eta]_{A5}$ is in the range of 1 to 10 dl/g, preferably 2 to 5 dl/g; $[\eta]_{A6}$ is in the range of 0.2 to 1.5 dl/g, preferably 0.3 to 1.0 dl/g; and ($[\eta]_{A5}/[\eta]_{A6}$) is in the range of 3 to 30, preferably 4 to 20.

When the intrinsic viscosity ($[\eta]_{A5}$) of the propylene homopolymer (A5) and the intrinsic viscosity ($[\eta]_{A6}$) of the propylene polymer (A6) has a relation of $[\eta]_{A5} < [\eta]_{A6}$, it is desired that $[\eta]_{A5}$ is in the range of 0.2 to 1.5 dl/g, preferably 0.3 to 1.0 dl/g; $[\eta]_{A6}$ is in the range of 1 to 10 dl/g, preferably 2 to 5 dl/g; and ($[\eta]_{A6}/[\eta]_{A5}$) is in the range of 3 to 30, preferably 4 to 20.

The sixth propylene polymer composition is desired to have MFR, as measured at 230° C. under a load of 2.16 kg, of 0.01 to 1,000 g/10 min, preferably 0.5 to 200 g/10 min. In this composition, Mw/Mn of all the propylene components for constituting the composition is desirably in the range of 4 to 15.

The density of the sixth propylene polymer composition is desired to be in the range of 0.89 to 0.92 g/cm$^3$, preferably 0.90 to 0.92 g/cm$^3$.

The flexural modulus (FM) thereof is desired to be in the range of 12,000 to 21,000 kg/cm$^2$, preferably 14,000 to 20,000 kg/cm$^2$.

The Izod impact strength (IZ) thereof at 23° C. is desired to be in the range of 2 to 10 kg·cm/cm, preferably 2 to 5 kg·cm/cm.

The tensile elongation at break (EL) thereof is desired to be in the range of 100 to 500%, preferably 200 to 400%.

The heat distortion temperature (HDT) thereof is desired to be not lower than 95° C., preferably in the range of 100 to 140° C.

The sixth propylene polymer composition may contain, if necessary, additives which may be added to the first propylene polymer composition, with the proviso that the object of the invention is not marred.

The sixth propylene polymer composition can be prepared by known processes. For example, the composition can be prepared in accordance with the processes (1) to (5) described for the first propylene polymer composition, using the propylene homopolymer (A5) and the propylene polymer (A6).

Such sixth propylene polymer composition is excellent in not only heat resistance, rigidity and tensile elongation at break but also moldability.

The sixth propylene polymer composition can be favorably used for various structural materials such as those of automobiles and electrical appliances, daily necessaries, various films and sheets.

Next, the catalyst used for the preparation of the propylene polymer (A5) and the process for preparing the propylene homopolymer are described.

The olefin polymerization catalyst used for preparing the propylene homopolymer (A5) is an olefin polymerization catalyst [olefin polymerization catalyst (4)] comprising:

(i) (h) a transition metal compound represented by the aforesaid formula (I), and (ii) at least one compound selected from the group consisting of (b) the organoaluminum oxy-compound, and
(i) a compound which reacts with the transition metal compound (h) to form an ion pair.

Figure 4:
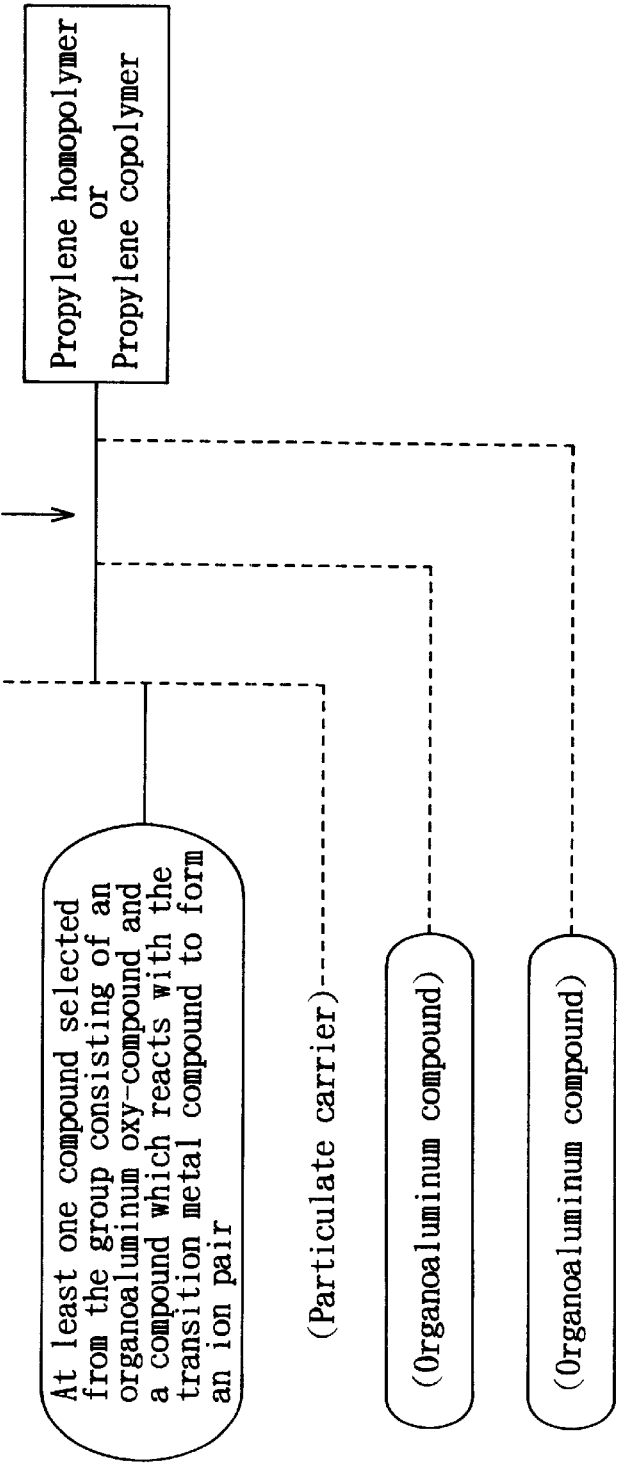
FIG. 4 is a view illustrating steps of a process for preparing an olefin polymerization catalyst which is used for the preparation of the propylene homopolymer (A5) and the propylene copolymer (A7).

FIG. 4 illustrates steps of a process for preparing the olefin polymerization catalyst which is used for the preparation of the propylene homopolymer (A5).

The compound (i) which reacts with the transition metal compound (h) to form an ion pair is identical with the compound (c) which reacts with the transition metal compound (a) to form an ion pair.

The compound (i) which reacts with the transition metal compound (h) to form an ion pair can be used in combination of two or more kinds.

The olefin polymerization catalyst used for the preparation of the propylene homopolymer (A5) may contain the aforesaid organoaluminum compound (j) in addition to the transition metal compound (h) and at least one compound selected from the group consisting of the organoaluminum oxy-compound (b) and the compound (i).

The olefin polymerization catalyst (4) can be prepared by mixing the transition metal compound (h) [component (h)] and the organoaluminum oxy-compound (b) [component (b)] (or the compound (i) which reacts with the transition metal compound (h) to form an ion pair, [component (i)]), and if desired, the organoaluminum compound (j) [component (j)] in an inert hydrocarbon solvent or an olefin solvent.

As the inert hydrocarbon solvent used for preparing the catalyst, the same inert hydrocarbon solvent as used for preparing the olefin polymerization catalyst (1) can be employed.

In the preparation of the olefin polymerization catalyst (4), each components may be mixed in an optional order, but preferably they are mixed in the following manner:

the component (b) [or the component (i)] is mixed with the component (h);

the component (b) is mixed with the component (j), and the resulting mixture is then mixed with the component (h);

the component (h) is mixed with the component (b) [or the component (i)], and the resulting mixture is then mixed with the component (j); or the component (h) is mixed with the component (j), and the resulting mixture is then mixed with the component (b) [or the component (i)].

In the mixing of each components, an atomic ratio (Al/transition metal) of the aluminum in the component (b) to the transition metal in the component (h) is in the range of usually 10 to 10,000, preferably 20 to 5,000; and a concentration of the component (h) is in the range of about 10–8 to 10–1 mol/l-solvent, preferably 10–7 to 5×10–2 mol/l-solvent.

When the component (i) is used, a molar ratio [component (h)/component (i)] of the component (h) to the component (i) is in the range of usually 0.01 to 10, preferably 0.1 to 5; and a concentration of the component (h) is in the range of about $10^{-8}$ to $10^{-1}$ mol/l-solvent, preferably $10^{-7}$ to $5\times10^{-2}$ mol/l-solvent.

When the component (j) is used, an atomic ratio ($Al_j/Al_b$) of the aluminum atom ($Al_j$) in the component (j) to the aluminum atom ($Al_b$) in the component (b) is in the range of usually 0.02 to 20, preferably 0.2 to 10.

The above-mentioned components may be mixed in a polymerizer. Otherwise, a mixture of the components beforehand prepared may be fed to a polymerizer.

If the components are beforehand mixed, the mixing temperature is in the range of usually −50 to 150° C., preferably −20 to 120° C.; and the contact time is in the range of 1 to 1,000 minutes, preferably 5 to 600 minutes. The mixing temperature may be varied while the components are mixed and contacted with each other.

The olefin polymerization catalyst (4) may be an olefin polymerization catalyst in which at least one of the component (h), the component (b) [or the component (i)] and the component (j) is supported on an inorganic or organic carrier of granular or particulate solid.

The inorganic carrier is preferably a porous oxide, for example, $SiO_2$ or $Al_2O_3$.

Examples of the granular or particulate solid organic compounds include polymers or copolymers produced mainly from α-olefins such as ethylene, propylene and 1-butene or styrene.

The olefin polymerization catalyst (4) may be an olefin polymerization catalyst formed from the particulate carrier, the component (h), the component (b) [or the component (i)] and an olefin polymer prepared by prepolymerization, and if desired, the component (j).

The olefin used for the prepolymerization includes olefins such as propylene, ethylene and 1-butene, but a mixture of these olefins and other olefin may also be employed.

In addition to the above components, the olefin polymerization catalyst (4) may contain other components which are useful for the olefin polymerization, for example, water as a catalyst component.

The propylene homopolymer (A5) can be prepared by polymerizing propylene in the presence of the olefin polymerization catalyst (4). The polymerization may be carried out by either a liquid phase polymerization process such as a suspension polymerization process and a solution polymerization process, or a gas phase polymerization process.

In the liquid phase polymerization process, the same inert hydrocarbon solvent as used in the preparation of the catalyst described before can be used, or propylene can be also used as a solvent.

In the suspension polymerization process, the temperature for polymerizing propylene is in the range of usually −50 to 100° C., preferably 0 to 90° C. In the solution polymerization process, the polymerization temperature is in the range of usually 0 to 250° C., preferably 20 to 200° C. In the gas phase polymerization process, the polymerization temperature is in the range of usually 0 to 120° C., preferably 20 to 100° C. The polymerization pressure is in the range of usually atmospheric pressure to 100 $kg/cm^2$, preferably atmospheric pressure to 50 $kg/cm^2$. The polymerization reaction may be carried out either batchwise, semi-continuously or continuously. Further, it is also possible to conduct the polymerization in two or more steps having different reaction conditions.

The Seventh Propylene Polymer Composition

The seventh propylene polymer composition of the invention comprises:

(A5) a propylene homopolymer which is obtained by polymerizing propylene in the presence of an olefin polymerization catalyst comprising:
(i) (h) a transition metal compound represented by the aforesaid formula (I), and
(ii) at least one compound selected from the group consisting of
(b) an organoaluminum oxy-compound, and
(i) a compound which reacts with the transition metal compound (h) to form an ion pair; and
(D) an olefin elastomer which is characterized in that:
(1) the elastomer is obtained by polymerizing or copolymerizing at least one monomer selected from olefins of 2 to 20 carbon atoms and polyenes of 5 to 20 carbon atoms,
(2) the elastomer contains constituent units derived from ethylene, propylene, butene or 4-methyl-1-pentene in an amount of less than 90% by mol, and
(3) the elastomer has a glass transition temperature (Tg) of not higher than 10° C.

Propylene Homopolymer (A5)

The propylene homopolymer (A5) for constituting the seventh propylene polymer composition is identical with the propylene homopolymer (A5) for constituting the sixth propylene polymer composition.

Olefin Elastomer (D)

The olefin elastomer (D) is a polymer of one monomer selected from the group consisting of olefins of 2 to 20 carbon atoms and polyenes of 5 to 20 carbon atoms, or a random or block copolymer of two or more monomers selected from olefins of 2 to 20 carbon atoms and polyenes of 5 to 20 carbon atoms. This olefin elastomer (D) contains constituent units derived from ethylene, propylene, butene or 4-methyl-1-pentene in an amount of less than 90%, preferably not more than 85%, and has a glass transition temperature (Tg) of not higher than 10° C., preferably −100 to 0° C., more preferably −100 to −10° C.

Examples of the olefins of 2 to 20 carbon atoms include ethylene, propylene, 1-butene, 1-pentene, 2-methyl-1-butene, 3-methyl-1-butene, 1-hexene, 3-methyl-1-pentene, 4-methyl-1-pentene, 3,3-dimethyl-1-butene, 1-heptene, methyl-1-hexene, dimethyl-1-pentene, trimethyl-1-butene, ethyl-1-pentene, 1-octene, methyl-1-pentene, dimethyl-1-hexene, trimethyl-1-pentene, ethyl-1-hexene, methylethyl-1-pentene, diethyl-1-butene, propyl-1-pentene, 1-decene, methyl-1-nonene, dimethyl-1-octene, trimethyl-1-heptene, ethyl-1-octene, methylethyl-1-heptene, diethyl-1-hexene, 1-dodecene, hexadodecene and styrene.

Examples of the polyenes of 5 to 20 carbon atoms include polyenes exemplified for the ethylene/olefin random polymer (C).

Such olefin elastomer (D) is desired to have a density of 0.85 to 0.92 $g/cm^3$, preferably 0.85 to 0.90 $g/cm^3$, and an intrinsic viscosity [η], as measured in decalin at 135° C., of 0.1 to 20 dl/g, preferably 0.5 to 10 dl/g, more preferably 1 to 5 dl/g.

Further, the olefin elastomer (D) is desired to have a crystallinity, as measured by X-ray diffractometry, of less than 30% or to be amorphous.

As the olefin elastomer (D), there can be mentioned, for example, a copolymer of two or more monomers selected from olefins of 2 to 20 carbon atoms, a copolymer of one monomer selected from olefins of 2 to 20 carbon atoms and one monomer selected from polyenes of 5 to 20 carbon atoms, and a copolymer of two or more monomers selected from olefins of 2 to 20 carbon atoms and one monomer selected from polyenes of 5 to 20 carbon atoms.

More specifically, there can be mentioned:
an elastomer containing constituent units derived from ethylene in an amount of 50 to 90% by mol and constituent units derived from a monomer selected from olefins of 3 to 20 carbon atoms and polyenes of 5 to 20 carbon atoms in an amount of 10 to 50% by mol;
an elastomer containing constituent units derived from ethylene in an amount of 60 to 90% by mol and constituent units derived from a monomer selected from olefins of 3 to 6 carbon atoms and polyenes of 5 and 6 carbon atoms in an amount of 10 to 40% by mol;
an elastomer containing constituent units derived from ethylene in an amount of 65 to 90% by mol and constituent units derived from a monomer selected from propylene and butene in an amount of 10 to 35% by mol;
an elastomer containing constituent units derived from propylene in an amount of 50 to 90% by mol and constituent units derived from a monomer selected from ethylene, olefins of 4 to 20 carbon atoms and polyenes of 5 to 20 carbon atoms in an amount of 10 to 50% by mol;

an elastomer containing constituent units derived from propylene in an amount of 50 to 85% by mol and constituent units derived from a monomer selected from ethylene, olefins of 4 to 6 carbon atoms and polyenes of 5 and 6 carbon atoms in an amount of 15 to 50% by mol;

an elastomer containing constituent units derived from propylene in an amount of 50 to 80% by mol and constituent units derived from a monomer selected from ethylene and butene in an amount of 20 to 50% by mol; and and others, such as a styrene/butadiene rubber (SBR) and a styrene block copolymer (SEBS) having poly (ethylene-butene) in the rubber intermediate block.

The olefin elastomer (D) can be obtained by polymerizing or copolymerizing at least one monomer selected from the group consisting of olefins of 2 to 20 carbon atoms and polyenes of 5 to 20 carbon atoms by conventionally known processes. The polymerization reaction can be carried out in a gas phase (gas phase process) or in a liquid phase (liquid phase process).

The olefin elastomer (D) can be used in combination of two or more kinds.

Propylene Polymer Composition

The seventh propylene polymer composition comprises the propylene homopolymer (A5) and the olefin elastomer (D). In this composition, it is desired that the propylene homopolymer (A5) is contained in an amount of 5 to 95% by weight, preferably 30 to 90% by weight, more preferably 50 to 80% by weight; and the olefin elastomer (D) is contained in an amount of 5 to 95% by weight, preferably 10 to 70% by weight, more preferably 20 to 50% by weight.

The seventh propylene polymer composition is desired to have MFR, as measured at 230° C. under a load of 2.16 kg, of 0.01 to 1,000 g/10 min, preferably 0.5 to 200 g/10 min. In this composition, Mw/Mn of all the propylene components for constituting the composition is desirably in the range of 1.5 to 3.5.

The density of the seventh propylene polymer composition is desired to be in the range of 0.88 to 0.92 g/cm$^3$, preferably 0.90 to 0.92 g/cm$^3$.

The flexural modulus (FM) thereof is desired to be in the range of 8,000 to 21,000 kg/cm$^2$, preferably 12,000 to 20,000 kg/cm$^2$.

The Izod impact strength (IZ) thereof at 23° C. is desired to be in the range of 10 to 60 kg·cm/cm, preferably 10 to 40 kg·cm/cm.

The tensile elongation at break (EL) thereof is desired to be in the range of 200 to 1,000%, preferably 300 to 500%.

The heat distortion temperature (HDT) thereof is desired to be not lower than 85° C., preferably in the range of 95 to 140° C.

The seventh propylene polymer composition may contain, if necessary, additives which may be added to the first propylene polymer composition, with the proviso that the object of the invention is not marred.

The seventh propylene polymer composition can be prepared by known processes. For example, the composition can be prepared in accordance with the processes (1) to (5) described for the first propylene polymer composition, using the propylene homopolymer (A5) and the olefin elastomer (D).

Such propylene polymer composition is excellent in not only heat resistance, rigidity and tensile elongation at break but also impact resistance.

The seventh propylene polymer composition can be favorably used for various structural materials such as those of automobiles and electrical appliances, daily necessaries and various sheets.

The Eighth Propylene Polymer Composition

The eighth propylene polymer composition of the invention comprises:

(A5) a propylene homopolymer which is obtained by polymerizing propylene in the presence of an olefin polymerization catalyst comprising:
  (i) (h) a transition metal compound represented by the aforesaid formula (I), and
  (ii) at least one compound selected from the group consisting of
    (b) an organoaluminum oxy-compound, and
    (i) a compound which reacts with the transition metal compound (h) to form an ion pair; and (E) an olefin polymer which contains constituent units derived from one monomer selected from the group consisting of ethylene, butene and 4-methyl-1-pentene in an amount of not less than 90% by mol.

Propylene Homopolymer (A5)

The propylene homopolymer (A5) for constituting the eighth propylene polymer composition is identical with the propylene homopolymer (A5) for constituting the sixth propylene polymer composition.

Olefin Polymer (E)

The olefin polymer (E) is either an ethylene (co)polymer containing constituent units derived from ethylene in an amount of not less than 90% by mol, preferably not less than 95% by mol, a butene (co)polymer containing constituent units derived from butene in an amount of not less than 90% by mol, preferably not less than 95% by mol, or a 4-methyl-1-pentene (co)polymer containing constituent units derived from 4-methyl-1-pentene in an amount of not less than 90% by mol, preferably not less than 95% by mol.

The ethylene copolymer may contain constituent units derived from a monomer selected from the group consisting of olefins of 3 to 20 carbon atoms and polyenes of 5 to 20 carbons atoms in an amount of less than 10% by mol.

The butene copolymer may contain constituent units derived from a monomer selected from the group consisting of other olefins of 2 to 20 carbon atoms than butene and polyenes of 5 to 20 carbons atoms in an amount of less than 10% by mol.

The 4-methyl-1-pentene copolymer may contain constituent units derived from a monomer selected from the group consisting of other olefins of 2 to 20 carbon atoms than 4-methyl-1-pentene and polyenes of 5 to 20 carbons atoms in an amount of less than 10% by mol.

Examples of the olefins of 2 to 20 carbon atoms include olefins exemplified for the olefin elastomer (D).

Examples of the polyenes of 5 to 20 carbon atoms include polyenes exemplified for the olefin elastomer (D).

Such olefin polymer (E) is desired to have a density of 0.80 to 0.98 g/cm$^3$, preferably 0.85 to 0.96 g/cm$^3$, and an intrinsic viscosity [η], as measured in decalin at 135° C., of 0.1 to 20 dl/g, preferably 0.5 to 10 dl/g, more preferably 1 to 5 dl/g.

The olefin polymer (E) is preferably an ethylene homopolymer or an ethylene copolymer, and more preferably an ethylene homopolymer.

The olefin polymer (E) can be obtained by polymerizing one monomer selected from the group consisting of ethylene, butene and 4-methyl-1-pentene or copolymerizing one monomer selected from the group consisting of ethylene, butene and 4-methyl-1-pentene with at least one monomer selected from other olefins of 2 to 20 carbon atoms than the above monomers and polyenes of 5 to 20 carbon atoms, in accordance with conventionally known processes. The polymerization reaction can be carried out in a gas phase (gas phase process) or in a liquid phase (liquid phase process).

The olefin polymer (E) can be used in combination of two or more kinds.

Propylene Polymer Composition

The eighth propylene polymer composition comprises the propylene homopolymer (A5) and the olefin polymer (E). In this composition, it is desired that the propylene homopolymer (A5) is contained in an amount of 5 to 95% by weight, preferably 30 to 90% by weight, more preferably 50 to 80% by weight; and the olefin polymer (E) is contained in an amount of 5 to 95% by weight, preferably 10 to 70% by weight, more preferably 20 to 50% by weight.

The eighth propylene polymer composition is desired to have MFR, as measured at 230° C. under a load of 2.16 kg, of 0.1 to 200 g/10 min, preferably 1 to 100 g/10 min. In this composition, Mw/Mn of all the propylene components for constituting the composition is desirably in the range of 1.5 to 3.5.

The density of the eighth propylene polymer composition is desired to be in the range of 0.80 to 0.98 g/cm$^3$, preferably 0.85 to 0.94 g/cm$^3$.

The flexural modulus (FM) thereof is desired to be in the range of 12,000 to 21,000 kg/cm$^2$, preferably 14,000 to 20,000 kg/cm$^2$.

The Izod impact strength (IZ) thereof at 23° C. is desired to be in the range of 2 to 20 kg·cm/cm, preferably 2 to 10 kg·cm/cm.

The tensile elongation at break (EL) thereof is desired to be in the range of 100 to 500%, preferably 200 to 400%.

The heat distortion temperature (HDT) thereof is desired to be not lower than 85° C., preferably in the range of 100 to 140° C.

The eighth propylene polymer composition may contain, if necessary, additives which may be added to the first propylene polymer composition, with the proviso that the object of the invention is not marred.

This propylene polymer composition can be prepared by known processes. For example, the composition can be prepared in accordance with the processes (1) to (5) described for the first propylene polymer composition, using the propylene homopolymer (A5) and the olefin polymer (E).

Such propylene polymer composition is excellent in heat resistance, rigidity and tensile elongation at break.

The Ninth Propylene Polymer Composition

The ninth propylene polymer composition of the invention comprises:

(A5) a propylene homopolymer which is obtained by polymerizing propylene in the presence of an olefin polymerization catalyst comprising:
  (i) (h) a transition metal compound represented by the aforesaid formula (I), and
  (ii) at least one compound selected from the group consisting of
    (b) an organoaluminum oxy-compound, and
    (i) a compound which reacts with the transition metal compound (h) to form an ion pair;

(A6) a propylene polymer which contains constituent units derived from propylene in an amount of not less than 90% by mol and is different from the propylene homopolymer (A5); and (D) an olefin elastomer which is characterized in that:
  (1) the elastomer is obtained by polymerizing or copolymerizing at least one monomer selected from olefins of 2 to 20 carbon atoms and polyenes of 5 to 20 carbon atoms,
  (2) the elastomer contains constituent units derived from ethylene, propylene, butene or 4-methyl-1-pentene in an amount of less than 90% by mol, and
  (3) the elastomer has a glass transition temperature (Tg) of not higher than 10° C.

Propylene Homopolymer (A5)

The propylene homopolymer (A5) for constituting the ninth propylene polymer composition is identical with the propylene homopolymer (A5) for constituting the sixth propylene polymer composition.

Propylene Polymer (A6)

The propylene Polymer (A6) for constituting the ninth propylene polymer composition is identical with the propylene polymer (A6) for constituting the sixth propylene polymer composition.

Olefin Elastomer (D)

The olefin elastomer (D) for constituting the ninth propylene polymer composition is identical with the olefin elastomer (D) for constituting the seventh propylene polymer composition.

The olefin elastomer can be used in combination of two or more kinds.

Propylene Polymer Composition

The ninth propylene polymer composition contains, as its essential components, the propylene homopolymer (A5), the propylene polymer (A6) which is different from the propylene homopolymer (A5), and the olefin elastomer (D). This composition contains the propylene homopolymer (A5) in an amount of 5 to 95% by weight, the propylene polymer (A6) in an amount of not more than 95% by weight and the olefin elastomer (D) in an amount of not more than 95% by weight.

In the ninth propylene polymer composition, it is desired that the propylene homopolymer (A5) is contained in an amount of 5 to 95% by weight, preferably 30 to 85% by weight, more preferably 30 to 60% by weight; the propylene polymer (A6) is contained in an amount of 3 to 93% by weight, preferably 5 to 60% by weight, more preferably 30 to 60% by weight; and the olefin elastomer (D) is contained in an amount of 2 to 92% by weight, preferably 10 to 65% by weight, more preferably 10 to 40% by weight.

In the ninth propylene polymer composition, when the intrinsic viscosity ($[\eta]_{A5}$) of the propylene homopolymer (A5) and the intrinsic viscosity ($[\eta]_{A6}$) of the propylene polymer (A6) has a relation of $[\eta]_{A5} \geq [\eta]_{A6}$, it is desired that $[\eta]_{A5}$ is in the range of 1 to 10 dl/g, preferably 2 to 5 dl/g; $[\eta]_{A6}$ is in the range of 0.2 to 1.5 dl/g, preferably 0.3 to 1.0 dl/g; and ($[\eta]_{A5}/[\eta]_{A6}$) is in the range of 3 to 30, preferably 4 to 20.

When the intrinsic viscosity ($[\eta]_{A5}$) of the propylene homopolymer (A5) and the intrinsic viscosity ($[\eta]_{A6}$) of the propylene polymer (A6) has a relation of $[\eta]_{A5} < [\eta]_{A6}$, it is desired that $[\eta]_{A5}$ is in the range of 0.2 to 1.5 dl/g, preferably 0.3 to 1.0 dl/g; $[\eta]_{A6}$ is in the range of 1 to 10 dl/g, preferably 2 to 5 dl/g; and ($[\eta]_{A6}/[\eta]_{A5}$) is in the range of 3 to 30, preferably 4 to 20.

The ninth propylene polymer composition is desired to have MFR, as measured at 230° C. under a load of 2.16 kg, of 0.01 to 1,000 g/10 min, preferably 0.5 to 200 g/10 min. In this composition, Mw/Mn of all the propylene components for constituting the composition is desirably in the range of 4 to 15.

The density of the ninth propylene polymer composition is desired to be in the range of 0.88 to 0.92 g/cm$^3$, preferably 0.90 to 0.92 g/cm$^3$.

The flexural modulus (FM) thereof is desired to be in the range of 8,000 to 21,000 kg/cm$^2$, preferably 12,000 to 20,000 kg/cm$^2$.

The Izod impact strength (IZ) thereof at 23° C. is desired to be in the range of 10 to 60 kg·cm/cm, preferably 15 to 60 kg·cm/cm.

The tensile elongation at break (EL) thereof is desired to be in the range of 200 to 1,000%, preferably 300 to 1,000%.

The heat distortion temperature (HDT) thereof is desired to be not lower than 85° C., preferably in the range of 95 to 140° C.

The ninth propylene polymer composition may contain, if necessary, additives which may be added to the first propylene polymer composition, with the proviso that the object of the invention is not marred.

The ninth propylene polymer composition can be prepared by known processes. For example, the composition can be prepared in accordance with the processes (1) to (5) described for the first propylene polymer composition, using the propylene homopolymer (A5), the propylene polymer (A6) and the olefin elastomer (D).

Such ninth propylene polymer composition is excellent in not only heat resistance, rigidity and tensile elongation at break but also moldability and impact resistance.

The ninth propylene polymer composition can be favorably used for various structural materials such as those of automobiles and electrical appliances, daily necessaries, various films and sheets.

The Tenth Propylene Polymer Composition

The tenth propylene polymer composition of the invention comprises:

(A5) a propylene homopolymer which is obtained by polymerizing propylene in the presence of an olefin polymerization catalyst comprising:
  (i) (h) a transition metal compound represented by the aforesaid formula (I), and
  (ii) at least one compound selected from the group consisting of
    (b) an organoaluminum oxy-compound, and
    (i) a compound which reacts with the transition metal compound (h) to form an ion pair;
(A6) a propylene polymer which contains constituent units derived from propylene in an amount of not less than 90% by mol and is different from the propylene homopolymer (A5); and
(E) an olefin polymer which contains constituent units derived from one monomer selected from the group consisting of ethylene, butene and 4-methyl-1-pentene in an amount of not less than 90% by mol.

Propylene Homopolymer (A5)

The propylene homopolymer (A5) for constituting the tenth propylene polymer composition is identical with the propylene homopolymer (A5) for constituting the sixth propylene polymer composition.

Propylene Polymer (A6)

The propylene Polymer (A6) for constituting the tenth propylene polymer composition is identical with the propylene polymer (A6) for constituting the sixth propylene polymer composition.

Olefin Polymer (E)

The olefin polymer (E) for constituting the tenth propylene polymer composition is identical with the olefin polymer (E) for constituting the eighth propylene polymer composition.

The olefin polymer (E) can be used in combination of two or more kinds.

Propylene Polymer Composition

The tenth propylene polymer composition contains, as its essential components, the propylene homopolymer (A5), the propylene polymer (A6) which is different from the propylene homopolymer (A5), and the olefin polymer (E). This composition contains the propylene homopolymer (A5) in an amount of 5 to 95% by weight, the propylene polymer (A6) in an amount of not more than 95% by weight and the olefin polymer (E) in an amount of not more than 95% by weight.

In the tenth propylene polymer composition, it is desired that the propylene homopolymer (A5) is contained in an amount of 5 to 95% by weight, preferably 30 to 85% by weight, more preferably 30 to 60% by weight; the propylene polymer (A6) is contained in an amount of 3 to 93% by weight, preferably 5 to 60% by weight, more preferably 30 to 60% by weight; and the olefin polymer (E) is contained in an amount of 2 to 92% by weight, preferably 10 to 65% by weight, more preferably 10 to 40% by weight.

In the tenth propylene polymer composition, when the intrinsic viscosity ($[\eta]_{A5}$) of the propylene homopolymer (A5) and the intrinsic viscosity ($[\eta]_{A6}$) of the propylene polymer (A6) has a relation of $[\eta]_{A5} \geq [\eta]_{A6}$, it is desired that $[\eta]_{A5}$ is in the range of 1 to 10 dl/g, preferably 2 to 5 dl/g; $[\eta]_{A6}$ is in the range of 0.2 to 1.5 dl/g, preferably 0.3 to 1.0 dl/g; and ($[\eta]_{A5}/[\eta]_{A6}$) is in the range of 3 to 30, preferably 4 to 20.

When the intrinsic viscosity ($[\eta]_{A5}$) of the propylene homopolymer (A5) and the intrinsic viscosity ($[\eta]_{A6}$) of the propylene polymer (A6) has a relation of $[\eta]_{A5} < [\eta]_{A6}$, it is desired that $[\eta]_{A5}$ is in the range of 0.2 to 1.5 dl/g, preferably 0.3 to 1.0 dl/g; $[\eta]_{A6}$ is in the range of 1 to 10 dl/g, preferably 2 to 5 dl/g; and ($[\eta]_{A6}/[\eta]_{A5}$) is in the range of 3 to 30, preferably 4 to 20.

The tenth propylene polymer composition is desired to have MFR, as measured at 230° C. under a load of 2.16 kg, of 0.01 to 1,000 g/10 min, preferably 0.5 to 200 g/10 min. In this composition, Mw/Mn of all the propylene components for constituting the composition is desirably in the range of 4 to 15.

The density of the tenth propylene polymer composition is desired to be in the range of 0.80 to 0.98 g/cm$^3$, preferably 0.85 to 0.94 g/cm$^3$.

The flexural modulus (FM) thereof is desired to be in the range of 12,000 to 21,000 kg/cm$^2$, preferably 14,000 to 20,000 kg/cm$^2$.

The Izod impact strength (IZ) thereof at 23° C. is desired to be in the range of 2 to 20 kg·cm/cm, preferably 2 to 10 kg·cm/cm.

The tensile elongation at break (EL) thereof is desired to be in the range of 100 to 500%, preferably 200 to 400%.

The heat distortion temperature (HDT) thereof is desired to be not lower than 85° C., preferably in the range of 100 to 140° C.

The tenth propylene polymer composition may contain, if necessary, additives which may be added to the first propylene polymer composition, with the proviso that the object of the invention is not marred.

The tenth propylene polymer composition can be prepared by known processes. For example, the composition can be prepared in accordance with the processes (1) to (5) described for the first propylene polymer composition, using the propylene homopolymer (A5), the propylene polymer (A6) and the olefin polymer (E).

Such tenth propylene polymer composition is excellent in not only heat resistance, rigidity and tensile elongation at break but also moldability.

The eleventh Propylene Polymer Composition

The eleventh propylene polymer composition of the invention comprises:

(A5) a propylene homopolymer which is obtained by polymerizing propylene in the presence of an olefin polymerization catalyst comprising:
  (i) (h) a transition metal compound represented by the aforesaid formula (I), and
  (ii) at least one compound selected from the group consisting of
    (b) an organoaluminum oxy-compound, and
    (i) a compound which reacts with the transition metal compound (h) to form an ion pair;
(D) an olefin elastomer which is characterized in that:
  (1) the elastomer is obtained by polymerizing or copolymerizing at least one monomer selected from olefins of 2 to 20 carbon atoms and polyenes of 5 to 20 carbon atoms,
  (2) the elastomer contains constituent units derived from ethylene, propylene, butene or 4-methyl-1-pentene in an amount of less than 90% by mol, and
  (3) the elastomer has a glass transition temperature (Tg) of not higher than 10° C.; and
(E) an olefin polymer which contains constituent units derived from one monomer selected from the group consisting of ethylene, butene and 4-methyl-1-pentene in an amount of not less than 90% by mol.

Propylene Homopolymer (A5)

The propylene homopolymer (A5) for constituting the eleventh propylene polymer composition is identical with the propylene homopolymer (A5) for constituting the sixth propylene polymer composition.

Olefin Elastomer (D)

The olefin elastomer (D) for constituting the eleventh propylene polymer composition is identical with the olefin elastomer (D) for constituting the seventh propylene polymer composition.

The olefin polymer (D) can be used in combination of two or more kinds.

Olefin Polymer (E)

The olefin polymer (E) for constituting the eleventh propylene polymer composition is identical with the olefin polymer (E) for constituting the eighth propylene polymer composition.

The olefin polymer (E) can be used in combination of two or more kinds.

Propylene Polymer Composition

The eleventh propylene polymer composition contains, as its essential components, the propylene homopolymer (A5), the olefin elastomer (D) and the olefin polymer (E). This composition contains the propylene homopolymer (A5) in an amount of 5 to 95% by weight, the olefin elastomer (D) in an amount of not more than 95% by weight and the olefin polymer (E) in an amount of not more than 95% by weight.

In the eleventh propylene polymer composition, it is desired that the propylene homopolymer (A5) is contained in an amount of 5 to 95% by weight, preferably 30 to 85% by weight, more preferably 50 to 70% by weight; the olefin elastomer (D) is contained in an amount of 3 to 93% by weight, preferably 10 to 65% by weight, more preferably 20 to 40% by weight; and the olefin polymer (E) is contained in an amount of 2 to 92% by weight, preferably 5 to 60% by weight, more preferably 10 to 30% by weight.

The eleventh propylene polymer composition is desired to have MFR, as measured at 230° C. under a load of 2.16 kg, of 0.01 to 1,000 g/10 min, preferably 0.5 to 200 g/10 min.

In this composition, Mw/Mn of all the propylene components for constituting the composition is desirably in the range of 1.5 to 3.5.

The density of the eleventh propylene polymer composition is desired to be in the range of 0.88 to 0.93 g/cm$^3$, preferably 0.90 to 0.93 g/cm$^3$.

The flexural modulus (FM) thereof is desired to be in the range of 8,000 to 21,000 kg/cm$^2$, preferably 12,000 to 20,000 kg/cm$^2$.

The Izod impact strength (IZ) thereof at 23° C. is desired to be in the range of 10 to 60 kg·cm/cm, preferably 20 to 60 kg·cm/cm.

The tensile elongation at break (EL) thereof is desired to be in the range of 200 to 1,000%, preferably 300 to 1,000%.

The heat distortion temperature (HDT) thereof is desired to be not lower than 85° C., preferably in the range of 95 to 140° C.

The eleventh propylene polymer composition may contain, if necessary, additives which may be added to the first propylene polymer composition, with the proviso that the object of the invention is not marred.

The eleventh propylene polymer composition can be prepared by known processes. For example, the composition an be prepared in accordance with the processes (1) to (5) described for the first propylene polymer composition, sing the propylene homopolymer (A5), the olefin elastomer (D) and the olefin polymer (E).

Such eleventh propylene polymer composition is excellent in not only heat resistance, rigidity and tensile elongation at break but also impact resistance.

The eleventh propylene polymer composition can be favorably used for various structural materials such as those of automobiles and electrical appliances, daily necessaries, various films and sheets.

The Twelfth Propylene Polymer Composition

The twelfth propylene polymer composition of the invention comprises:

(A5) a propylene homopolymer which is obtained by polymerizing propylene in the presence of an olefin polymerization catalyst comprising:
  (i) (h) a transition metal compound represented by the aforesaid formula (I), and
  (ii) at least one compound selected from the group consisting of
    (b) an organoaluminum oxy-compound, and
    (i) a compound which reacts with the transition metal compound (h) to form an ion pair;
(A6) a propylene polymer which contains constituent units derived from propylene in an amount of not less than 90% by mol and is different from the propylene homopolymer (A5);
(D) an olefin elastomer which is characterized in that:
  (1) the elastomer is obtained by polymerizing or copolymerizing at least one monomer selected from olefins of 2 to 20 carbon atoms and polyenes of 5 to 20 carbon atoms,
  (2) the elastomer contains constituent units derived from ethylene, propylene, butene or 4-methyl-1-pentene in an amount of less than 90% by mol, and
  (3) the elastomer has a glass transition temperature (Tg) of not higher than 10° C.; and
(E) an olefin polymer which contains constituent units derived from one monomer selected from the group consisting of ethylene, butene and 4-methyl-1-pentene in an amount of not less than 90% by mol.

Propylene Homopolymer (A5)

The propylene homopolymer (A5) for constituting the twelfth propylene polymer composition is identical with the propylene homopolymer (A5) for constituting the sixth propylene polymer composition.

Propylene Polymer (A6)

The propylene Polymer (A6) for constituting the twelfth propylene polymer composition is identical with the propylene polymer (A6) for constituting the sixth propylene polymer composition.

Olefin Elastomer (D)

The olefin elastomer (D) for constituting the twelfth propylene polymer composition is identical with the olefin elastomer (D) for constituting the seventh propylene polymer composition.

The olefin elastomer (D) can be used in combination of two or more kinds.

Olefin Polymer (E)

The olefin polymer (E) for constituting the twelfth propylene polymer composition is identical with the olefin polymer (E) for constituting the eighth propylene polymer composition.

The olefin polymer (E) can be used in combination of two or more kinds.

Propylene Polymer Composition

The twelfth propylene polymer composition contains, as its essential components, the propylene homopolymer (A5), the propylene polymer (A6) which is different from the propylene homopolymer (A5), the olefin elastomer (D) and the olefin polymer (E). This composition contains the propylene homopolymer (A5) in an amount of 5 to 95% by weight, the propylene polymer (A6) in an amount of not more than 95% by weight, the olefin elastomer (D) in an amount of not more than 95% by weight and the olefin polymer (E) in an amount of not more than 95% by weight.

In the twelfth propylene polymer composition, it is desired that the propylene homopolymer (A5) is contained in an amount of 5 to 95% by weight, preferably 30 to 85% by weight, more preferably 30 to 50% by weight; the propylene polymer (A6) is contained in an amount of 2 to 92% by weight, preferably 5 to 60% by weight, more preferably 30 to 50% by weight; the olefin elastomer (D) is contained in an amount of 2 to 92% by weight, preferably 5 to 60% by weight, more preferably 10 to 30% by weight; and the olefin polymer (E) is contained in an amount of 1 to 91% by weight, preferably 5 to 60% by weight, more preferably 10 to 30% by weight.

In the twelfth propylene polymer composition, when the intrinsic viscosity ($[\eta]_{A5}$) of the propylene homopolymer (A5) and the intrinsic viscosity ($[\eta]_{A6}$) of the propylene polymer (A6) has a relation of ($[\eta]_{A5} \geq [\eta]_{A6}$), it is desired that $[\eta]_{A5}$ is in the range of 1 to 10 dl/g, preferably 2 to 5 dl/g; $[\eta]_{A6}$ is in the range of 0.2 to 1.5 dl/g, preferably 0.3 to 1.0 dl/g; and ($[\eta]_{A5}/[\eta]_{A6}$) is in the range of 3 to 30, preferably 4 to 20.

When the intrinsic viscosity ($[\eta]_{A5}$) of the propylene homopolymer (A5) and the intrinsic viscosity ($[\eta]_{A6}$) of the propylene polymer (A6) has a relation of $[\eta]_{A5} < [\eta]_{A6}$, it is desired that $[\eta]_{A5}$ is in the range of 0.2 to 1.5 dl/g, preferably 0.3 to 1.0 dl/g; $[\eta]_{A6}$ is in the range of 1 to 10 dl/g, preferably 2 to 5 dl/g; and ($[\eta]_{A6}/[\eta]_{A5}$) is in the range of 3 to 30, preferably 4 to 20.

The twelfth propylene polymer composition is desired to have MFR, as measured at 230° C. under a load of 2.16 kg, of 0.01 to 1,000 g/10 min, preferably 0.5 to 200 g/10 min. In this composition, Mw/Mn of all the propylene components for constituting the composition is desirably in the range of 4 to 15.

The density of the twelfth propylene polymer composition is desired to be in the range of 0.88 to 0.93 g/cm$^3$, preferably 0.90 to 0.93 g/cm$^3$.

The flexural modulus (FM) thereof is desired to be in the range of 8,000 to 21,000 kg/cm$^2$, preferably 12,000 to 20,000 kg/cm$^2$.

The Izod impact strength (IZ) thereof at 23° C. is desired to be in the range of 10 to 60 kg·cm/cm, preferably 20 to 60 kg·cm/cm.

The tensile elongation at break (EL) thereof is desired to be in the range of 200 to 1,000%, preferably 300 to 1,000%.

The heat distortion temperature (HDT) thereof is desired to be not lower than 85° C., preferably in the range of 95 to 140° C.

The twelfth propylene polymer composition may contain, if necessary, additives which may be added to the first propylene polymer composition, with the proviso that the object of the invention is not marred.

The twelfth propylene polymer composition can be prepared by known processes. For example, the composition can be prepared in accordance with the processes (1) to (5) described for the first propylene polymer composition, using the propylene homopolymer (A5), the propylene polymer (A6), the olefin elastomer (D) and the olefin polymer (E).

Such propylene polymer composition is excellent in not only heat resistance, rigidity and tensile elongation at break but also moldability and impact resistance.

The twelfth propylene polymer composition can be favorably used for various structural materials such as those of automobiles and electrical appliances, daily necessaries, various films and sheets.

The Thirteenth Propylene Polymer Composition

The thirteenth propylene polymer composition comprises:
(A7) a propylene copolymer which is characterized in that:
the propylene copolymer is obtained by copolymerizing propylene and at least one α-olefin selected from ethylene and α-olefins of 4 to 20 carbon atoms in the presence of an olefin polymerization catalyst comprising:
(i) (h) a transition metal compound represented by the aforesaid formula (I), and
(ii) at least one compound selected from the group consisting of
(b) an organoaluminum oxy-compound, and
(i) a compound which reacts with the transition metal compound (h) to form an ion pair, and
the propylene copolymer contains constituent units derived from propylene in an amount of not less than 90% by mol; and
(A6) a propylene polymer which contains constituent units derived from propylene in an amount of not less than 90% by mol and is different from the propylene copolymer (A7).

Propylene Copolymer (A7)

The propylene copolymer (A7) is a random copolymer of propylene and at least one α-olefin selected from the group consisting of ethylene and α-olefins of 4 to 20 carbon atoms, which is prepared by the use of the olefin polymerization catalyst (4) used for preparation of the propylene homopolymer (A5).

In the propylene copolymer (A7), the propylene units are contained in an amount of not less than 90% by mol, preferably 90 to 98% by mol, more preferably 90 to 96%; and the comonomer units derived from an α-olefin selected from ethylene and α-olefins of 4 to 20 carbon atoms in an amount of not more than 10% by mol, preferably 2 to 10% by mol, more preferably 4 to 10% by mol.

Examples of the α-olefins of 4 to 20 carbon atoms include 1-butene, 1-pentene, 1-hexene, 4-methyl-1-pentene, 1-heptene, 1-octene, 2-ethyl-1-hexene, 1-decene, 1-dodecene, 1-tetradecene and 1-eicosene.

Preferably used as the comonomers for the copolymerization are ethylene, 1-butene, 1-pentene, 1-hexene, 1-octene and 1-decene.

The propylene copolymer (A7) is desired to have MFR, as measured at 230° C. under a load of 2.16 kg, of 0.01 to 1,000 g/10 min, preferably 0.5 to 200 g/10 min, and Mw/Mn, as measured by GPC, of 1.5 to 3.5, preferably 2.0 to 3.0, more preferably 2.0 to 2.5.

Further, the propylene copolymer (A7) is desired to have an intrinsic viscosity [η] of 0.1 to 20 dl/g, preferably 0.5 to 10 dl/g, more preferably 1 to 5 dl/g, and a weight-average molecular weight of $1 \times 10^3$ to $500 \times 10^4$, preferably $1 \times 10^4$ to $100 \times 10^4$.

The crystallinity of the propylene copolymer (A7), as measured by X-ray diffractometry, is desired to be not less than 20%, preferably not less than 30%.

The triad tacticity (mm fraction) of the propylene copolymer (A7) is desired to be not less than 98.0%, preferably not less than 98.2%, more preferably not less than 98.5%.

The proportion of the irregularly positioned units based on the 2,1-insertion of the propylene monomer is desired to be not more than 0.5%, preferably not more than 0.18%, more preferably not more than 0.15%.

The proportion of the irregularly positioned units based on the 1,3-insertion of the propylene monomer is desired to be less than the detected lower limit by the $^{13}$C-NMR measurement (less than 0.03%)

Propylene Polymer (A6)

The propylene Polymer (A6) for constituting the thirteenth propylene polymer composition is identical with the propylene polymer (A6) for constituting the sixth propylene polymer composition.

Propylene Polymer Composition

The thirteenth propylene polymer composition comprises the propylene copolymer (A7) and the propylene polymer (A6) which is different from the propylene copolymer (A7). In the composition, it is desired that the propylene copolymer (A7) is contained in an amount of 5 to 95% by weight, preferably 15 to 85% by weight, more preferably 30 to 70% by weight; and the propylene polymer (A6) is contained in an amount of 5 to 95% by weight, preferably 15 to 85% by weight, more preferably 30 to 70% by weight.

In the thirteenth propylene polymer composition, when the intrinsic viscosity $([\eta]_{A7})$ of the propylene copolymer (A7) and the intrinsic viscosity $([\eta]_{A6})$ of the propylene polymer (A6) has a relation of $[\eta]_{A7} \geq [\eta]_{A6}$, it is desired that $[\eta]_{A7}$ is in the range of 1 to 10 dl/g, preferably 2 to 5 dl/g; $[\eta]_{A6}$ is in the range of 0.2 to 1.5 dl/g, preferably 0.3 to 1.0 dl/g; and $([\eta]_{A7}/[\eta]_{A6})$ is in the range of 3 to 30, preferably 4 to 20.

When the intrinsic viscosity $([\eta]_{A7})$ of the propylene homopolymer (A7) and the intrinsic viscosity $([\eta]_{A6})$ of the propylene polymer (A6) has a relation of $[\eta]_{A7} < [\eta]_{A6}$, it is desired that $[\eta]_{A7}$ is in the range of 0.2 to 1.5 dl/g, preferably 0.3 to 1.0 dl/g; $[\eta]_{A6}$ is in the range of 1 to 10 dl/g, preferably 2 to 5 dl/g; and $([\eta]_{A6}/[\eta]_{A7})$ is in the range of 3 to 30, preferably 4 to 20.

The thirteenth propylene polymer composition is desired to have MFR, as measured at 230° C. under a load of 2.16 kg, of 0.01 to 1,000 g/10 min, preferably 0.5 to 200 g/10 min. In this composition, Mw/Mn of all the propylene components for constituting the composition is desirably in the range of 4 to 15.

The density of the thirteenth propylene polymer composition is desired to be in the range of 0.88 to 0.92 g/cm³, preferably 0.89 to 0.92 g/cm³.

The flexural modulus (FM) thereof is desired to be in the range of 2,000 to 20,000 kg/cm², preferably 1,000 to 15,000 kg/cm².

The Izod impact strength (IZ) thereof at 2° C. is desired to be in the range of 2 to 20 kg·cm/cm, preferably 5 to 20 kg·cm/cm.

The tensile elongation at break (EL) thereof is desired to be in the range of 100 to 2,000%, preferably 200 to 1,000%.

The heat distortion temperature (HDT) thereof is desired to be not lower than 80° C., preferably in the range of 90 to 140° C.

The thirteenth propylene polymer composition may contain, if necessary, additives which may be added to the first propylene polymer composition, with the proviso that the object of the invention is not marred.

The thirteenth propylene polymer composition can be prepared by known processes. For example, the composition can be prepared in accordance with the processes (1) to (5) described for the first propylene polymer composition, using the propylene copolymer (A7) and the propylene polymer (A6).

Such propylene polymer composition is excellent in not only heat resistance, rigidity and tensile elongation at break but also moldability.

The Fourteenth Propylene Polymer Composition

The fourteenth propylene polymer composition comprises:

(A7) a propylene copolymer which is characterized in that:

the propylene copolymer is obtained by copolymerizing propylene and at least one α-olefin selected from ethylene and α-olefins of 4 to 20 carbon atoms in the presence of an olefin polymerization catalyst comprising:

(i) (h) a transition metal compound represented by the aforesaid formula (I), and (ii) at least one compound selected from the group consisting of (b) an organoaluminum oxy-compound, and (i) a compound which reacts with the transition metal compound (h) to form an ion pair, and the propylene copolymer contains constituent units derived from propylene in an amount of not less than 90% by mol; and (D) an olefin elastomer which is characterized in that:

(1) the elastomer is obtained by polymerizing or copolymerizing at least one monomer selected from olefins of 2 to 20 carbon atoms and polyenes of 5 to 20 carbon atoms, (2) the elastomer contains constituent units derived from ethylene, propylene, butene or 4-methyl-1-pentene in an amount of less than 90% by mol, and (3) the elastomer has a glass transition temperature (Tg) of not higher than 10° C.

Propylene Copolymer (A7)

The propylene copolymer (A7) for constituting the fourteenth propylene polymer composition is identical with the propylene copolymer (A7) for constituting the thirteenth propylene polymer composition.

Olefin Elastomer (D)

The olefin elastomer (D) for constituting the fourteenth propylene polymer composition is identical with the olefin elastomer (D) for constituting the seventh propylene polymer composition.

The olefin elastomer (D) can be used in combination of two or more kinds.

Propylene Polymer Composition

The fourteenth propylene polymer composition comprises the propylene copolymer (A7) and the olefin elastomer (D). In this composition, it is desired that the propylene copolymer (A7) is contained in an amount of 5 to 95% by weight, preferably 30 to 90% by weight, more preferably 50 to 80% by weight; and the olefin elastomer (D) is contained in an amount of 5 to 95% by weight, preferably 10 to 70% by weight, more preferably 20 to 50% by weight.

The fourteenth propylene polymer composition is desired to have MFR, as measured at 230° C. under a load of 2.16 kg, of 0.01 to 1,000 g/10 min, preferably 0.5 to 200 g/10 min. In this composition, Mw/Mn of all the propylene components for constituting the composition is desirably in the range of 1.5 to 3.5.

The density of the fourteenth propylene polymer composition is desired to be in the range of 0.87 to 0.92 g/cm$^3$, preferably 0.88 to 0.92 g/cm$^3$.

The flexural modulus (FM) thereof is desired to be in the range of 2,000 to 20,000 kg/cm$^2$, preferably 4,000 to 15,000 kg/cm$^2$.

The Izod impact strength (IZ) thereof at 23° C. is desired to be in the range of 10 to 60 kg·cm/cm, preferably 20 to 60 kg·cm/cm.

The tensile elongation at break (EL) thereof is desired to be in the range of 200 to 2,000%, preferably 200 to 1,000%.

The heat distortion temperature (HDT) thereof is desired to be not lower than 80° C., preferably in the range of 90 to 140° C.

The fourteenth propylene polymer composition may contain, if necessary, additives which may be added to the first propylene polymer composition, with the proviso that the object of the invention is not marred.

This propylene polymer composition can be prepared by known processes. For example, the composition can be prepared in accordance with the processes (1) to (5) described for the first propylene polymer composition, using the propylene copolymer (A7) and the olefin elastomer (D).

Such propylene polymer composition is excellent in not only heat resistance, rigidity and tensile elongation at break but also impact resistance.

The fourteenth propylene polymer composition can be favorably used for various structural materials such as those of automobiles and electrical appliances, daily necessaries and various sheets.

The Fifteenth Propylene Polymer Composition

The fifteenth propylene polymer composition of the invention comprises:

(A7) a propylene copolymer which is characterized in that:
  the propylene copolymer is obtained by copolymerizing propylene and at least one α-olefin selected from ethylene and α-olefins of 4 to 20 carbon atoms in the presence of an olefin polymerization catalyst comprising:
    (i) (h) a transition metal compound represented by the aforesaid formula (I), and
    (ii) at least one compound selected from the group consisting of
      (b) an organoaluminum oxy-compound, and
      (i) a compound which reacts with the transition metal compound (h) to form an ion pair, and the propylene copolymer contains constituent units derived from propylene in an amount of not less than 90% by mol; and (E) an olefin polymer which contains constituent units derived from one monomer selected from the group consisting of ethylene, butene and 4-methyl-1-pentene in an amount of not less than 90% by mol.

Propylene Copolymer (A7)

The propylene copolymer (A7) for constituting the fifteenth propylene polymer composition is identical with the propylene copolymer (A7) for constituting the thirteenth propylene polymer composition.

Olefin Polymer (E)

The olefin polymer (E) for constituting the fifteenth propylene polymer composition is identical with the olefin polymer (E) for constituting the eighth propylene polymer composition.

The olefin polymer (E) can be used in combination of two or more kinds.

Propylene Polymer Composition

The fifteenth propylene polymer composition comprises the propylene copolymer (A7) and the olefin polymer (E). In this composition, it is desired that the propylene copolymer (A7) is contained in an amount of 5 to 95% by weight, preferably 30 to 90% by weight, more preferably 50 to 80% by weight; and the olefin polymer (E) is contained in an amount of 5 to 95% by weight, preferably 10 to 70% by weight, more preferably 20 to 50% by weight.

The fifteenth propylene polymer composition is desired to have MFR, as measured at 230° C. under a load of 2.16 kg, of 0.1 to 1,000 g/10 min, preferably 0.5 to 200 g/10 min.

In this composition, Mw/Mn of all the propylene components for constituting the composition is desirably in the range of 1.5 to 3.5.

The density of the fifteenth propylene polymer composition is desired to be in the range of 0.80 to 0.98 g/cm$^3$, preferably 0.85 to 0.94 g/cm$^3$.

The flexural modulus (FM) thereof is desired to be in the range of 2,000 to 20,000 kg/cm$^2$, preferably 4,000 to 15,000 kg/cm$^2$.

The Izod impact strength (IZ) thereof at 23° C. is desired to be in the range of 2 to 20 kg·cm/cm, preferably 5 to 20 kg·cm/cm.

The tensile elongation at break (EL) thereof is desired to be in the range of 100 to 2,000%, preferably 200 to 1,000%.

The heat distortion temperature (HDT) thereof is desired to be not lower than 80° C., preferably in the range of 90 to 140° C.

The fifteenth propylene polymer composition may contain, if necessary, additives which may be added to the first propylene polymer composition, with the proviso that the object of the invention is not marred.

This propylene polymer composition can be prepared by known processes. For example, the composition can be prepared in accordance with the processes (1) to (5) described for the first propylene polymer composition, using the propylene copolymer (A7) and the olefin polymer (E).

Such propylene polymer composition is excellent in heat resistance, rigidity and tensile elongation at break.

The Sixteenth Propylene Polymer Composition

The sixteenth propylene polymer composition of the invention comprises:

(A7) a propylene copolymer which is characterized in that:
  the propylene copolymer is obtained by copolymerizing propylene and at least one α-olefin selected from ethylene and α-olefins of 4 to 20 carbon atoms in the presence of an olefin polymerization catalyst comprising:
(i) (h) a transition metal compound represented by the aforesaid formula (I), and
(ii) at least one compound selected from the group consisting of
(b) an organoaluminum oxy-compound, and
(i) a compound which reacts with the transition metal compound (h) to form an ion pair, and
the propylene copolymer contains constituent units derived from propylene in an amount of not less than 90% by mol;

(A6) a propylene polymer which contains constituent units derived from propylene in an amount of not less than 90% by mol and is different from the propylene copolymer (A7); and (D) an olefin elastomer which is characterized in that:
(1) the elastomer is obtained by polymerizing or copolymerizing at least one monomer selected from olefins of 2 to 20 carbon atoms and polyenes of 5 to 20 carbon atoms,
(2) the elastomer contains constituent units derived from ethylene, propylene, butene or 4-methyl-1-pentene in an amount of less than 90% by mol, and
(3) the elastomer has a glass transition temperature (Tg) of not higher than 10° C.

Propylene Copolymer (A7)

The propylene copolymer (A7) for constituting the sixteenth propylene polymer composition is identical with the propylene copolymer (A7) for constituting the thirteenth propylene polymer composition.

Propylene Polymer (A6)

The propylene Polymer (A6) for constituting the sixteenth propylene polymer composition is identical with the propylene polymer (A6) for constituting the sixth propylene polymer composition.

Olefin Elastomer (D)

The olefin elastomer (D) for constituting the sixteenth propylene polymer composition is identical with the olefin elastomer (D) for constituting the seventh propylene polymer composition.

The olefin elastomer (D) can be used in combination of two or more kinds.

Propylene Polymer Composition

The sixteenth propylene polymer composition contains, as its essential components, the propylene copolymer (A7), the propylene polymer (A6) which is different from the propylene copolymer (A7), and the olefin elastomer (D). This composition contains the propylene copolymer (A7) in an amount of 5 to 95% by weight, the propylene polymer (A6) in an amount of not more than 95% by weight and the olefin elastomer (D) in an amount of not more than 95% by weight.

In the sixteenth propylene polymer composition, it is desired that the propylene copolymer (A7) is contained in an amount of 5 to 95% by weight, preferably 30 to 85% by weight, more preferably 30 to 60% by weight; the propylene polymer (A6) is contained in an amount of 3 to 93% by weight, preferably 5 to 60% by weight, more preferably 30 to 60% by weight; and the olefin elastomer (D) is contained in an amount of 2 to 92% by weight, preferably 10 to 65% by weight, more preferably 10 to 40% by weight.

In the sixteenth propylene polymer composition, when the intrinsic viscosity ($[\eta]_{A7}$) of the propylene copolymer (A7) and the intrinsic viscosity ($[\eta]_{A6}$) of the propylene polymer (A6) has a relation of $[\eta]_{A7} \geq [\eta]_{A6}$, it is desired that $[\eta]_{A7}$ is in the range of 1 to 10 dl/g, preferably 2 to 5 dl/g; $[\eta]_{A6}$ is in the range of 0.2 to 1.5 dl/g, preferably 0.3 to 1.0 dl/g; and ($[\eta]_{A7}/[\eta]_{A6}$) is in the range of 3 to 30, preferably 4 to 20.

When the intrinsic viscosity ($[\eta]_{A7}$) of the propylene copolymer (A7) and the intrinsic viscosity ($[\eta]_{A6}$) of the propylene polymer (A6) has a relation of $[\eta]_{A7} < [\eta]_{A6}$, it is desired that $[\eta]_{A7}$ is in the range of 0.2 to 1.5 dl/g, preferably 0.3 to 1.0 dl/g; $[\eta]_{A6}$ is in the range of 1 to 10 dl/g, preferably 2 to 5 dl/g; and ($[\eta]_{A6}/[\eta]_{A7}$) is in the range of 3 to 30, preferably 4 to 20.

The sixteenth propylene polymer composition is desired to have MFR, as measured at 230° C. under a load of 2.16 kg, of 0.01 to 1,000 g/10 min, preferably 0.5 to 200 g/10 min. In this composition, Mw/Mn of all the propylene components for constituting the composition is desirably in the range of 4 to 15.

The density of the sixteenth propylene polymer composition is desired to be in the range of 0.87 to 0.92 g/cm$^3$, preferably 0.88 to 0.92 g/cm$^3$.

The flexural modulus (FM) thereof is desired to be in the range of 2,000 to 20,000 kg/cm$^2$, preferably 4,000 to 15,000 kg/cm$^2$.

The Izod impact strength (IZ) thereof at 23° C. is desired to be in the range of 10 to 60 kg·cm/cm, preferably 20 to 60 kg·cm/cm.

The tensile elongation at break (EL) thereof is desired to be in the range of 200 to 2,000%, preferably 200 to 1,000%.

The heat distortion temperature (HDT) thereof is desired to be not lower than 80° C., preferably in the range of 90 to 140° C.

The sixteenth propylene polymer composition may contain, if necessary, additives which may be added to the first propylene polymer composition, with the proviso that the object of the invention is not marred.

The sixteenth propylene polymer composition can be prepared by known processes. For example, the composition can be prepared in accordance with the processes (1) to (5) described for the first propylene polymer composition, using the propylene copolymer (A7), the propylene polymer (A6) and the olefin elastomer (D).

Such sixteenth propylene polymer composition is excellent in not only heat resistance, rigidity and tensile elongation at break but also moldability and impact resistance.

The sixteenth propylene polymer composition can be favorably used for various structural materials such as those of automobiles and electrical appliances, daily necessaries, various films and sheets.

The Seventeenth Propylene Polymer Composition

The seventeenth propylene polymer composition of the invention comprises:

(A7) a propylene copolymer which is characterized in that:
the propylene copolymer is obtained by copolymerizing propylene and at least one α-olefin selected from ethylene and α-olefins of 4 to 20 carbon atoms in the presence of an olefin polymerization catalyst comprising:
(i) (h) a transition metal compound represented by the aforesaid formula (I), and
(ii) at least one compound selected from the group consisting of
(b) an organoaluminum oxy-compound, and
(i) a compound which reacts with the transition metal compound (h) to form an ion pair, and
the propylene copolymer contains constituent units derived from propylene in an amount of not less than 90% by mol;

(A6) a propylene polymer which contains constituent units derived from propylene in an amount of not less than 90% by mol and is different from the propylene copolymer (A7); and (E) an olefin polymer which contains constituent units derived from one monomer selected from the group consisting of ethylene, butene and 4-methyl-1-pentene in an amount of not less than 90% by mol.

Propylene Copolymer (A7)

The propylene copolymer (A7) for constituting the seventeenth propylene polymer composition is identical with the propylene copolymer (A7) for constituting the thirteenth propylene polymer composition.

Propylene Polymer (A6)

The propylene Polymer (A6) for constituting the seventeenth propylene polymer composition is identical with the propylene polymer (A6) for constituting the sixth propylene polymer composition.

Olefin Polymer (E)

The olefin polymer (E) for constituting the seventeenth propylene polymer composition is identical with the olefin polymer (E) for constituting the eighth propylene polymer composition.

The olefin polymer (E) can be used in combination of two or more kinds.

Propylene Polymer Composition

The seventeenth propylene polymer composition contains, as its essential components, the propylene copolymer (A7), the propylene polymer (A6) which is different from the propylene copolymer (A7), and the olefin polymer (E). This composition contains the propylene copolymer (A7) in an amount of 5 to 95% by weight, the propylene polymer (A6) in an amount of not more than 95% by weight and the olefin polymer (E) in an amount of not more than 95% by weight.

In the seventeenth propylene polymer composition, it is desired that the propylene copolymer (A7) is contained in an amount of 5 to 95% by weight, preferably 30 to 85% by weight, more preferably 30 to 60% by weight; the propylene polymer (A6) is contained in an amount of 3 to 93% by weight, preferably 5 to 60% by weight, more preferably 30 to 60% by weight; and the olefin polymer (E) is contained in an amount of 2 to 92% by weight, preferably 10 to 65% by weight, more preferably 10 to 40% by weight.

In the seventeenth propylene polymer composition, when the intrinsic viscosity ($[\eta]_{A7}$) of the propylene copolymer (A7) and the intrinsic viscosity ($[\eta]_{A6}$) of the propylene polymer (A6) has a relation of $[\eta]_{A7} \geq [\eta]_{A6}$, it is desired that $[\eta]_{A7}$ is in the range of 1 to 10 dl/g, preferably 2 to 5 dl/g; $[\eta]_{A6}$ is in the range of 0.2 to 1.5 dl/g, preferably 0.3 to 1.0 dl/g; and ($[\eta]_{A7}/[\eta]_{A6}$) is in the range of 3 to 30, preferably 4 to 20.

When the intrinsic viscosity ($[\eta]_{A7}$) of the propylene copolymer (A7) and the intrinsic viscosity ($[\eta]_{A6}$) of the propylene polymer (A6) has a relation of $[\eta]_{A7} < [\eta]_{A6}$, it is desired that $[\eta]_{A7}$ is in the range of 0.2 to 1.5 dl/g, preferably 0.3 to 1.0 dl/g; $[\eta]_{A6}$ is in the range of 1 to 10 dl/g, preferably 2 to 5 dl/g; and $[\eta]_{A6}/[\eta]_{A7}$) is in the range of 3 to 30, preferably 4 to 20.

The seventeenth propylene polymer composition is desired to have MFR, as measured at 230° C. under a load of 2.16 kg, of 0.01 to 1,000 g/10 min, preferably 0.5 to 200 g/10 min. In this composition, Mw/Mn of all the propylene components for constituting the composition is desirably in the range of 4 to 15.

The density of the seventeenth propylene polymer composition is desired to be in the range of 0.80 to 0.98 g/cm$^3$, preferably 0.85 to 0.94 g/cm$^3$.

The flexural modulus (FM) thereof is desired to be in the range of 2,000 to 20,000 kg/cm$^2$, preferably 4,000 to 15,000 kg/cm$^2$.

The Izod impact strength (IZ) thereof at 23° C. is desired to be in the range of 2 to 20 kg·cm/cm, preferably 5 to 20 kg·cm/cm.

The tensile elongation at break (EL) thereof is desired to be in the range of 100 to 2,000%, preferably 200 to 1,000%.

The heat distortion temperature (HDT) thereof is desired to be not lower than 80° C., preferably in the range of 90 to 140° C.

The seventeenth propylene polymer composition may contain, if necessary, additives which may be added to the first propylene polymer composition, with the proviso that the object of the invention is not marred.

The seventeenth propylene polymer composition can be prepared by known processes. For example, the composition can be prepared in accordance with the processes (1) to (5) described for the first propylene polymer composition, using the propylene copolymer (A7), the propylene polymer (A6) and the olefin polymer (E).

Such seventeenth propylene polymer composition is excellent in not only heat resistance, rigidity and tensile elongation at break but also moldability.

The Eighteenth Propylene Polymer Composition

The eighteenth propylene polymer composition of the invention comprises:

(A7) a propylene copolymer which is characterized in that:
   the propylene copolymer is obtained by copolymerizing propylene and at least one α-olefin selected from ethylene and α-olefins of 4 to 20 carbon atoms in the presence of an olefin polymerization catalyst comprising:
   (i) (h) a transition metal compound represented by the aforesaid formula (I), and
   (ii) at least one compound selected from the group consisting of
      (b) an organoaluminum oxy-compound, and
      (i) a compound which reacts with the transition metal compound (h) to form an ion pair, and
   the propylene copolymer contains constituent units derived from propylene in an amount of not less than 90% by mol;

(D) an olefin elastomer which is characterized in that:
   (1) the elastomer is obtained by polymerizing or copolymerizing at least one monomer selected from olefins of 2 to 20 carbon atoms and polyenes of 5 to 20 carbon atoms,
   (2) the elastomer contains constituent units derived from ethylene, propylene, butene or 4-methyl-1-pentene in an amount of less than 90% by mol, and
   (3) the elastomer has a glass transition temperature (Tg) of not higher than 10° C.; and (E) an olefin polymer which contains constituent units derived from one monomer selected from the group consisting of ethylene, butene and 4-methyl-1-pentene in an amount of not less than 90% by mol.

Propylene Copolymer (A7)

The propylene copolymer (A7) for constituting the eighteenth propylene polymer composition is identical with the propylene copolymer (A7) for constituting the thirteenth propylene polymer composition.

Olefin Elastomer (D)

The olefin elastomer (D) for constituting the eighteenth propylene polymer composition is identical with the olefin elastomer (D) for constituting the seventh propylene polymer composition.

The olefin elastomer (D) can be used in combination of two or more kinds.

Olefin Polymer (E)

The olefin polymer (E) for constituting the eighteenth propylene polymer composition is identical with the olefin polymer (E) for constituting the eighth propylene polymer composition.

The olefin polymer (E) can be used in combination of two or more kinds.

Propylene Polymer Composition

The eighteenth propylene polymer composition contains, as its essential components, the propylene copolymer (A7), the olefin elastomer (D) and the olefin polymer (E). This composition contains the propylene copolymer (A7) in an amount of 5 to 95% by weight, the olefin elastomer (D) in an amount of not more than 95% by weight and the olefin polymer (E) in an amount of not more than 95% by weight.

In the eighteenth propylene polymer composition, it is desired that the propylene copolymer (A7) is contained in an amount of 5 to 95% by weight, preferably 30 to 85% by weight, more preferably 50 to 70% by weight; the olefin elastomer (D) is contained in an amount of 3 to 93% by weight, preferably 10 to 65% by weight, more preferably 20 to 40% by weight; and the olefin polymer (E) is contained in an amount of 2 to 92% by weight, preferably 5 to 60% by weight, more preferably 10 to 30% by weight.

The eighteenth propylene polymer composition is desired to have MFR, as measured at 230° C. under a load of 2.16 kg, of 0.01 to 1,000 g/10 min, preferably 0.5 to 200 g/10 min. In this composition, Mw/Mn of all the propylene components for constituting the composition is desirably in the range of 1.5 to 3.5.

The density of the eighteenth propylene polymer composition is desired to be in the range of 0.87 to 0.92 g/cm$^3$, preferably 0.88 to 0.92 g/cm$^3$.

The flexural modulus (FM) thereof is desired to be in the range of 2,000 to 20,000 kg/cm$^2$, preferably 4,000 to 15,000 kg/cm$^2$.

The Izod impact strength (IZ) thereof at 23° C. is desired to be in the range of 10 to 60 kg·cm/cm, preferably 20 to 60 kg·cm/cm.

The tensile elongation at break (EL) thereof is desired to be in the range of 200 to 2,000%, preferably 200 to 1,000%.

The heat distortion temperature (HDT) thereof is desired to be not lower than 80° C., preferably in the range of 90 to 140° C.

The eighteenth propylene polymer composition may contain, if necessary, additives which may be added to the first propylene polymer composition, with the proviso that the object of the invention is not marred.

The eighteenth propylene polymer composition can be prepared by known processes. For example, the composition can be prepared in accordance with the processes (1) to (5) described for the first propylene polymer composition, using the propylene copolymer (A7), the olefin elastomer (D) and the olefin polymer (E).

Such eighteenth propylene polymer composition is excellent in not only heat resistance, rigidity and tensile elongation at break but also impact resistance.

The eighteenth propylene polymer composition can be favorably used for various structural materials such as those of automobiles and electrical appliances, daily necessaries, various films and sheets.

The Nineteenth Propylene Polymer Composition

The nineteenth propylene polymer composition of the invention comprises:

(A7) a propylene copolymer which is characterized in that:
the propylene copolymer is obtained by copolymerizing propylene and at least one α-olefin selected from ethylene and α-olefins of 4 to 20 carbon atoms in the presence of an olefin polymerization catalyst comprising:
(i) (h) a transition metal compound represented by the aforesaid formula (I), and
(ii) at least one compound selected from the group consisting of
(b) an organoaluminum oxy-compound, and
(i) a compound which reacts with the transition metal compound (h) to form an ion pair, and
the propylene copolymer contains constituent units derived from propylene in an amount of not less than 90% by mol;

(A6) a propylene polymer which contains constituent units derived from propylene in an amount of not less than 90% by mol and is different from the propylene copolymer (A7);

(D) an olefin elastomer which is characterized in that:
(1) the elastomer is obtained by polymerizing or copolymerizing at least one monomer selected from olefins of 2 to 20 carbon atoms and polyenes of 5 to 20 carbon atoms,
(2) the elastomer contains constituent units derived from ethylene, propylene, butene or 4-methyl-1-pentene in an amount of less than 90% by mol, and
(3) the elastomer has a glass transition temperature (Tg) of not higher than 10° C.; and (E) an olefin polymer which contains constituent units derived from one monomer selected from the group consisting of ethylene, butene and 4-methyl-1-pentene in an amount of not less than 90% by mol.

Propylene Copolymer (A7)

The propylene copolymer (A7) for constituting the nineteenth propylene polymer composition is identical with the propylene copolymer (A7) for constituting the thirteenth propylene polymer composition.

Propylene Polymer (A6)

The propylene Polymer (A6) for constituting the nineteenth propylene polymer composition is identical with the propylene polymer (A6) for constituting the sixth propylene polymer composition.

Olefin Elastomer (D)

The olefin elastomer (D) for constituting the nineteenth propylene polymer composition is identical with the olefin elastomer (D) for constituting the seventh propylene polymer composition.

The olefin elastomer (D) can be used in combination of two or more kinds.

Olefin Polymer (E)

The olefin polymer (E) for constituting the nineteenth propylene polymer composition is identical with the olefin polymer (E) for constituting the eighth propylene polymer composition.

The olefin polymer (E) can be used in combination of two or more kinds.

Propylene Polymer Composition

The nineteenth propylene polymer composition contains, as its essential components, the propylene copolymer (A7), the propylene polymer (A6) which is different from the propylene copolymer (A7), the olefin elastomer (D) and the olefin polymer (E). This composition contains the propylene copolymer (A7) in an amount of 5 to 95% by weight, the propylene polymer (A6) in an amount of not more than 95% by weight, the olefin elastomer (D) in an amount of not more than 95% by weight and the olefin polymer (E) in an amount of not more than 95% by weight.

In the nineteenth propylene polymer composition, it is desired that the propylene copolymer (A7) is contained in an amount of 5 to 95% by weight, preferably 30 to 85% by weight, more preferably 30 to 50% by weight; the propylene polymer (A6) is contained in an amount of 2 to 92% by weight, preferably 5 to 60% by weight, more preferably 30 to 50% by weight; the olefin elastomer (D) is contained in an amount of 2 to 92% by weight, preferably 5 to 60% by weight, more preferably 10 to 30% by weight; and the olefin polymer (E) is contained in an amount of 1 to 91% by weight, preferably 5 to 60% by weight, more preferably 10 to 30% by weight.

In the nineteenth propylene polymer composition, when the intrinsic viscosity ($[\eta]_{A7}$) of the propylene copolymer (A7) and the intrinsic viscosity ($[\eta]_{A6}$) of the propylene polymer (A6) has a relation of $[\eta]_{A7} \geq [\eta]_{A6}$, it is desired that $[\eta]_{A7}$ is in the range of 1 to 10 dl/g, preferably 2 to 5 dl/g; $[\eta]_{A6}$ is in the range of 0.2 to 1.5 dl/g, preferably 0.3 to 1.0 dl/g; and ($[\eta]_{A7}/[\eta]_{A6}$) is in the range of 3 to 30, preferably 4 to 20.

When the intrinsic viscosity ($[\eta]_{A7}$) of the propylene copolymer (A7) and the intrinsic viscosity ($[\eta]_{A6}$) of the propylene polymer (A6) has a relation of $[\eta]_{A7} < [\eta]_{A6}$, it is desired that $[\eta]_{A7}$ is in the range of 0.2 to 1.5 dl/g, preferably 0.3 to 1.0 dl/g; $[\eta]_{A6}$ is in the range of 1 to 10 dl/g, preferably 2 to 5 dl/g; and ($[\eta]_{A6}/[\eta]_{A7}$) is in the range of 3 to 30, preferably 4 to 20.

The nineteenth propylene polymer composition is desired to have MFR, as measured at 230° C. under a load of 2.16 kg, of 0.01 to 1,000 g/10 min, preferably 0.5 to 200 g/10 min. In this composition, Mw/Mn of all the propylene components for constituting the composition is desirably in the range of 4 to 15.

The density of the nineteenth propylene polymer composition is desired to be in the range of 0.87 to 0.92 g/cm$^3$, preferably 0.88 to 0.92 g/cm$^3$.

The flexural modulus (FM) thereof is desired to be in the range of 2,000 to 20,000 kg/cm$^2$, preferably 4,000 to 15,000 kg/cm$^2$.

The Izod impact strength (IZ) thereof at 23° C. is desired to be in the range of 10 to 60 kg·cm/cm, preferably 20 to 60 kg·cm/cm.

The tensile elongation at break (EL) thereof is desired to be in the range of 200 to 2,000%, preferably 200 to 1,000%.

The heat distortion temperature (HDT) thereof is desired to be not lower than 80° C., preferably in the range of 90 to 140° C.

The nineteenth propylene polymer composition may contain, if necessary, additives which may be added to the first propylene polymer composition, with the proviso that the object of the invention is not marred.

The nineteenth propylene polymer composition can be prepared by known processes. For example, the composition can be prepared in accordance with the processes (1) to (5) described for the first propylene polymer composition, using the propylene copolymer (A7), the propylene polymer (A6), the olefin elastomer (D) and the olefin polymer (E).

Such propylene polymer composition is excellent in not only heat resistance, rigidity and tensile elongation at break but also moldability and impact resistance.

The nineteenth propylene polymer composition can be favorably used for various structural materials such as those of automobiles and electrical appliances, daily necessaries, various films and sheets.

EFFECT OF THE INVENTION

The propylene polymer compositions of the invention are excellent in heat resistance, rigidity and tensile elongation at break.

EXAMPLE

The present invention is described in more detail with reference to the following examples, but it should be construed that the invention is in no way limited to those examples.

In the present invention, physical properties were measured by the following methods.

Intrinsic Viscosity [η]

The intrinsic viscosity [η] was measured in decalin at 135° C.

Melt Flow Rate (MFR)

The melt flow rate (MFR) was measured in accordance with ASTM D1238 under the following conditions.

Conditions: 230° C., 2.16 kg

Flexural Modulus (FM)

The flexural modulus (FM) was measured in accordance with ASTM D790 under the following conditions.

Size of specimen:

12.7 (width)×6.4 (thickness)×127 (length)

Span: 100 mm

Flexure rate: 2 mm/min

Izod Impact Strength (IZ)

The Izod impact strength (IZ) was measured in accordance with ASTM D256 under the following conditions.

Temperature: 23° C., −30° C.

Size of specimen:

12.7 (width)×6.4 (thickness)×64 (length)

The specimen was mechanically notched.

Tensile Elongation at Break (EL)

The tensile elongation at break (EL) was measured in accordance with ASTM D638 under the following conditions.

Temperature: 23° C.

Heat Distortion Temperature (HDT)

The heat distortion temperature was measured in accordance with ASTM D648 under the following conditions.

Size of specimen:

12.7 (width)×6.4 (thickness)×127 (length)

PREPARATION EXAMPLE

Preparation of a Propylene Polymer (1)

A catalyst component was prepared by mixing 0.0030 mmol (in terms of Zr atom) of rac-dimethylsilylbis(2-methylindenyl)zirconium dichloride and 1.50 mmol of methylaluminoxane.

Into a 4-liter stainless steel autoclave thoroughly purged with nitrogen was introduced 1 liter of purified toluene, followed by stirring for 20 minutes in a propylene atmosphere. Then, the temperature of the reaction system was raised. When the temperature became 30° C., 1.5 mmol of methylaluminoxane and the catalyst component prepared above were added to the system, thereby to perform polymerization for 1 hour at 40° C. under a propylene pressure of 3 kg/cm$^2$-G. After the polymerization, the solvent was removed by filtration, and the resulting product was washed with methanol and dried in vacuo at 80° C. for 10 hours.

Thus, a polymer [propylene polymer (1)] was obtained in an amount of 146 g, and the polymerization activity was 48,700 g-PP/mmol-Zr. This polymer had [η] of 2.58 dl/g, MFR of 1.9 g/10 min, Mw of 339,000 and Mw/Mn of 2.03.

Preparation of a Propylene Polymer (2)

Preparation of a Solid Catalyst Component

A 500-ml reactor thoroughly purged with nitrogen was charged with 25 g of silica (i.e., F-948 of Fuji Davison Co. having been dried at 200° C. for 6 hours in a stream of nitrogen) and 310 ml of toluene, and the temperature of the system was made 0° C. with stirring. To the system was dropwise added 90 ml of an organoaluminum oxy-compound (i.e., methylaluminoxane of Schering Co. having been diluted with toluene, 2.1 mol/l) over a period of 60 minutes in a nitrogen atmosphere. Then, the reaction was carried out at the same temperature for 30 minutes, successively at 90° C. for 4 hours. Thereafter, the reaction system was cooled by allowing it to stand. When the temperature became 60° C., the supernatant liquid was removed by decantation, and the resulting reaction liquid was washed three times with 150 ml of toluene.

Thus, a solid catalyst component (C-1) containing 6.8 mmol of Al based on 1 g of silica was obtained.

Preparation of a Prepolymerized Catalyst Component (C-2)

A 500-ml reactor thoroughly purged with nitrogen was charged with 320 ml of n-hexane. Then, to the reactor were added 40 mmol (in terms of Al atom) of the solid catalyst component (C-1) obtained above and 0.04 mmol (in terms of Zr atom) of rac-dimethylsilylbis(2-methylindenyl) zirconium dichloride, and the contents in the reactor were stirred for 10 minutes. Further, 1.2 mmol of triisobutylaluminum was added, followed by stirring for another 10 minutes. Then, a propylene gas (13.4 l/hr) was passed through the reactor for 1 hour at 20° C. to perform prepolymerization of propylene. The supernatant liquid was removed by decantation, and the resulting product was washed three times with 150 ml of decane.

Thus, a prepolymerized catalyst component (C-2) in which Zr and Al were supported in amounts of 0.0042 mmol and 4.35 mmol, respectively, based on 1 g of the solid catalyst was obtained.

Polymerization

Into a 4-liter stainless steel autoclave thoroughly purged with nitrogen was introduced 1.5 liters of n-hexane, followed by stirring for 20 minutes in a propylene atmosphere. Then, the temperature of the reaction system was raised. When the temperature became 50° C., 2.90 mmol of triisobutylaluminum, 0.0030 mmol (in terms of Zr atom) of the prepolymerized catalyst component (C-2) prepared above and 150 ml of hydrogen were added to the system, thereby to perform polymerization for 2 hours at 60° C. under a propylene pressure of 7 kg/cm$^2$-G. After the polymerization, the solvent was removed by filtration, and the resulting product was washed with methanol and dried in vacuo at 80° C. for 10 hours.

Thus, a polymer [propylene polymer (2)] was obtained in an amount of 304 g, and the polymerization activity was 101,000 g-PP/mmol-Zr. This polymer had [η] of 1.01 dl/g, MFR of 145 g/10 min and Mw/Mn of 3.78.

Preparation of a Propylene Polymer (3)

Preparation of a Prepolymerized Catalyst Component (C-3)

A 500-ml reactor thoroughly purged with nitrogen was charged with 350 ml of n-hexane. To the reactor were added 16 mmol (in terms of Al atom) of the solid catalyst component (C-1) prepared above and 0.04 mmol (in terms of Zr atom) of rac-dimethylsilylbis(2-methylindenyl)zirconium dichloride, and the contents in the reactor were stirred for 10 minutes. Further, 1.2 mmol of triisobutylaluminum was added, followed by stirring for another 10 minutes. Then, a propylene gas (13.4 l/hr) was passed through the reactor for 1 hour at 20° C. to perform prepolymerization of propylene. The supernatant liquid was removed by decantation, and the resulting product was washed three times with 150 ml of decane.

Thus, a prepolymerized catalyst component (C-3) in which Zr and Al were supported in amounts of 0.0011 mmol and 4.50 mmol, respectively, based on 1 g of the solid catalyst was obtained.

Polymerization

Into a 2-liter stainless steel autoclave thoroughly purged with nitrogen was introduced 750 ml of n-hexane, followed by stirring for 20 minutes in a propylene atmosphere. Then, the temperature of the reaction system was raised. When the temperature became 50° C., 2.7 mmol of triisobutylaluminum and 0.045 mmol (in terms of Zr atom) of the prepolymerized catalyst component (C-3) prepared above were added to the system, thereby to perform polymerization for 1.5 hours at 60° C. under a propylene pressure of 7 kg/cm$^2$-G. After the polymerization, the solvent was removed by filtration, and the resulting product was washed with methanol and dried in vacuo at 80° C. for 10 hours.

Thus, a polymer [propylene polymer (3)] was obtained in an amount of 403 g, and the polymerization activity was 89,600 g-PP/mmol-Zr. This polymer had [η] of 1.33 dl/g, MFR of 34 g/10 min and Mw/Mn of 2.93.

Preparation of a Propylene Polymer (4)

Preparation of a Solid Titanium Catalyst Component 95.2 g of anhydrous magnesium chloride, 442 ml of decane and 390.6 g of 2-ethylhexyl alcohol were mixed and then heated at 130° C. for 2 hours to give a homogeneous solution. To the solution was added 21.3 g of phthalic anhydride, and they were further stirred at 130° C. for 1 hour to dissolve the phthalic anhydride in the homogeneous solution. After the resulting solution was cooled to room temperature, 75 ml of the solution was dropwise added to 200 ml of titanium tetrachloride kept at −20° C. over a period of 1 hour. After the addition was completed, the temperature of the mixed solution was raised to 110° C. over a period of 4 hours. When the temperature of the solution reached 110° C., 5.22 g of diisobutyl phthalate (DIBP) was added to the solution, followed by stirring at the same temperature for 2 hours. After the 2-hour reaction was completed, the solid portion was collected by hot filtration, and resuspended in 275 ml of titanium tetrachloride. The resulting suspension was again heated at 110° C. for 2 hours to perform reaction.

After the reaction was completed, the solid portion was collected again by hot filtration, and sufficiently washed with decane and hexane at 110° C. until any titanium compound liberated in the washing liquid was not detected. Through the above process, the solid titanium catalyst component was obtained in the form of a decane slurry, and a part of this decane slurry was dried for the purpose of examining the catalyst composition.

As a result, the solid titanium catalyst component had a composition comprising 2.4% by weight of titanium, 60% by weight of chlorine, 20% by weight of magnesium and 13.0% by weight of DIBP.

Preparation of a Prepolymerized Catalyst Component (C-4)

A 400-ml four-necked glass reactor equipped with a stirrer was charged with 150 ml of purified hexane, 15 mmol of triethylaluminum, 3 mmol of dicyclopentyldimethoxysilane (DCPMS) and 1.5 mmol (in terms of Ti atom) of the solid titanium catalyst component prepared above in a nitrogen atmosphere. Then, to the reactor was fed propylene at 20° C. for 1 hour at a feed rate of 3.2 l/hr. After feeding of propylene was completed, the reactor was purged with nitrogen, and washing operation consisting of removal of a supernatant liquid and addition of purified hexane was carried out twice. Then, the resulting product was resuspended in purified hexane, and all the resulting suspension was transferred into a catalyst bottle to obtain a prepolymerized catalyst component (C-4).

Polymerization

Into a 17-liter autoclave was introduced 4 kg of propylene at room temperature in a propylene atmosphere. To the autoclave was added 11 liters of hydrogen, and the temperature of the reaction system was raised to 60° C. To system were further added 5 mmol of triethylaluminum, 5 mmol of DCPMS and 0.05 mmol (in terms of Ti atom) of the prepolymerized catalyst component (C-4) prepared above, and the temperature of the system was further raised to 70° C. to perform polymerization reaction at the same temperature for 40 minutes. Immediately after the reaction was completed, a small amount of ethanol was added to the system to decompose the catalyst, thereafter the unreacted propylene and hydrogen were purged. Thus, a white powdery polymer was obtained. The white powdery polymer thus obtained was dried in vacuo at 80° C. for 10 hours.

The amount of the white powdery polymer [propylene polymer (4)] obtained after drying was 1,630 g, and therefore the polymerization activity was 32,600 g-PP/mmol-Ti. This polymer had a boiling heptane extraction residue proportion (I.I.) of 99.1%, [η] of 3.0 dl/g, MFR of 1.2 g/10 min and Mw/Mn of 5.1.

Preparation of a Propylene Polymer (5)

The procedures of the polymerization and the post treatment for preparing the propylene polymer (4) were repeated except that the addition amount of hydrogen was varied to 150 liters.

The amount of the polymer [propylene polymer (5)] thus obtained was 2,030 g, and the polymerization activity corresponded to 40,600 g-PP/mmol-Ti. This polymer had [η] of 1.10 dl/g, MFR of 155 g/10 min, Mw/Mn of 4.9 and a boiling heptane extraction residue proportion (I.I.) of 97.0%.

Preparation of a Propylene Polymer (6)

The procedures of the polymerization and the post treatment for preparing the propylene polymer (4) were repeated except the addition amount of hydrogen was varied to 60 liters.

The amount of the polymer [propylene polymer (6)] thus obtained was 1,905 g, and the polymerization activity corresponded to 38,100 g-PP/mmol-Ti. This polymer had [η] of 1.55 dl/g, MFR of 25 g/10 min, Mw/Mn of 5.0 and a boiling heptane extraction residue proportion (I.I.) of 98.8%.

Preparation of a Propylene Polymer (7)

Synthesis of 3-(2-biphenylyl)-2-ethylpropionic Acid

To a 2-liter four-necked round flask (equipped with a stirrer, a Zimroth condenser, a dropping funnel and a thermometer) were fed 40.4 g (360 mmol) of potassium t-butoxide, 300 ml of toluene and 60 ml of N-methylpyrrolidone. Then, a solution obtained by dissolving 62.1 g (330 mmol) of diethyl ethylmalonate in 150 ml of toluene was dropwise added to the system while heating at 60° C. in a nitrogen atmosphere. After the addition was completed, the resulting mixture was reacted for 1 hour at the same temperature. Then, to the mixture was dropwise added at the same temperature a solution obtained by dissolving 60.8 g (300 mmol) of 2-phenylbenzyl bromide in 90 ml of toluene. After the addition was completed, the temperature of the system was elevated, and the reaction mixture was refluxed for 2 hours. The reaction mixture was poured in 600 ml of water, and adjusted to pH 1 by adding 2N-HCl. The organic phase was separated, and the aqueous phase was extracted three times with 200 ml of toluene. The whole organic phase was washed with a saturated salt solution until the organic phase became neutral, and dried with anhydrous $Na_2SO_4$. The solvent was concentrated under reduced pressure to obtain 110 g of an yellow-orange concentrated solution.

To a 2-liter four-necked round flask (equipped with a stirrer, a Zimroth condenser, a dropping funnel and a thermometer) were fed 202 g (3.06 mol) of potassium hydroxide and 480 ml of an aqueous solution of methanol (methanol/water=4/1 (v/v)). Then, a solution obtained by dissolving the above-obtained concentrate in 150 ml of an aqueous solution of methanol (methanol/water =4/1 (v/v)) was dropwise added at room temperature. After the addition, the temperature of the system was elevated, and the resulting mixture was refluxed for 4 hours. Then, the mixture was cooled to room temperature, and the precipitated solid was filtered. The product obtained by filtration was dissolved in water. The resulting solution was adjusted to pH 1 (acidic) by adding a sulfuric acid and extracted five times with 200 ml of methylene chloride. The whole organic phase was dried with anhydrous $Na_2SO_4$. The solvent was concentrated under reduced pressure to obtain 72.6 g of a white solid product.

To a 1-liter three-necked round flask (equipped with a stirrer, a Zimroth condenser and a thermometer) were fed 72.6 g of the above-obtained white solid, 168 ml of an acetic acid, 111 ml of water and 39.3 ml of a concentrated sulfuric acid, and the contents in the flask were refluxed for 6 hours in a nitrogen atmosphere. After the reaction was completed, the acetic acid was distilled off under reduced pressure, then to the resulting solution was added 150 ml of water, and the solution was extracted three times with 150 ml of methylene chloride. The whole organic phase was washed with 150 ml of a saturated salt solution, and dried with anhydrous $Na_2SO_4$. The solvent was distilled off under reduced pressure, and the residue was separated and purified by silica gel chromatography (developed with hexane/ethyl acetate (2/1→1/1, by parts by volume)), to obtain 41.1 g of a white solid (yield: 54%).

The physical properties of the product obtained are as follows.

FD-MS: 254 (M$^+$); m.p. : 91.2–94.0° C.; NMR (CDCl$_3$, 90 MHz): δ=0.71 (t, J=7.2 Hz, 3H, CH$_3$); 1.16–1.58 (m, 2H); 2.32 (bquin, J=7.0 Hz, 1H,

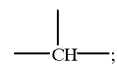

2.61–2.99 (m, 2H);

6.89–7.47 (m, 9H); IR (KBr disk) : 1,696 cm$^{-1}$ ($v_{c=0}$).

Synthesis of 3-(2-biphenylyl)-2-ethylpropionyl Chloride

To a 300-ml three-necked round flask (equipped with a stirrer tip, a Zimroth condenser, a thermometer and a NaOH trap) were fed 39.9 g (157.2 mmol) of 3-(2-biphenylyl)-2-ethylpropionic acid and 77.7 ml (1,065 mmol) of thionyl chloride, and the contents in the flask were refluxed for 2.5 hours in a nitrogen atmosphere. After the reaction was completed, the unreacted thionyl chloride was distilled off under reduced pressure to obtain 45.6 g of a coarse product of an yellow-orange liquid. This acid chloride was used for the next reaction without any further purification.

The physical properties of the product obtained are as follows.

IR (Neat): 1,786 cm$^{-1}$ ($\nu_{c=o}$)

Synthesis of 4-ethyl-2-phenyl-1-indanone

To a 500-ml three-necked round flask (equipped with a stirrer, a Zimroth condenser, a dropping funnel, a thermometer and a NaOH trap) were fed 24.1 g (181 mmol) of anhydrous aluminum chloride and 150 ml of carbon disulfide. Then, a solution obtained by dissolving 45.6 g (52.4 mmol) of 3-(2-biphenylyl)-2-ethylpropionyl chloride in 63 ml of carbon disulfide was dropwise added to the system while cooling with ice in a nitrogen atmosphere. After the addition was completed, the temperature in the flask was raised to room temperature to perform reaction for 1 hour. The reaction solution was poured in 600 ml of ice water to decompose the solution, and extracted twice with 300 ml of ether. The whole organic phase was successively washed with 300 ml of a saturated NaHCO$_3$ solution and 300 ml of a saturated salt solution, and dried with anhydrous Na$_2$SO$_4$. The solvent was distilled off under reduced pressure, and the residue was separated and purified by silica gel chromatography (developed with hexane/ethyl acetate (10/1, by parts by volume)), to obtain 32.4 g of the aimed product as an yellow solid (yield: 88%) The physical properties of the product obtained are as follows.

NMR (CDCl$_3$, 90 MHz): δ=0.98 (t, J=7.2 Hz, 3H, CH$_3$); 1.60–2.20 (m, 2H); 2.42–2.82 (m, 1H,

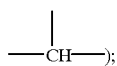

2.80 (dd, J=3.8 Hz, 16.5 Hz, 1H); 3.36 (dd, J=7.6 Hz, 16.5 Hz, 1H); 7.09–7.91 (m, 8H) IR (Neat): 1,705 cm$^{-1}$ ($\nu_{c=o}$).

Synthesis of 2-ethyl-1-hydroxy-2-phenylindane

To a 500-ml three-necked round flask (equipped with a stirrer tip, a Zimroth condenser, a dropping funnel and a thermometer) were fed 2.55 g (67.8 mmol) of sodium boron hydride and 84 ml of ethanol. Then, a solution obtained by dissolving 31.8 g (135.3 mmol) of 2-ethyl-4-phenyl-1-indanone in 60 ml of ethanol was dropwise added to the system at room temperature in a nitrogen atmosphere. After the addition was completed, the temperature of the system was raised to 50° C. to perform reaction for another 3.5 hours. After the reaction, the reaction solution was cooled, and acetone was dropwise added thereto to decompose the unreacted sodium boron hydride. Then, the reaction mixture was concentrated under reduced pressure, and extracted by the addition of 150 ml of water and 150 ml of ether. After the organic phase was separated, the aqueous phase was extracted twice with 100 ml of ether. The whole organic phase was washed with 300 ml of a saturated salt solution, and dried with anhydrous Na$_2$SO$_4$. The solvent was distilled off under reduced pressure, to obtain 32 g of the aimed product (mixture of two kinds of isomers) as a viscous light yellow liquid (yield: 99%).

The physical properties of the product obtained are as follows.

NMR (CDCl$_3$, 90 MHz): δ=8=1.02 (t, J=7.1 Hz, 3H, CH$_3$); 1.31–3.28 (m, 5H); 4.86, 5.03 (each d, J=6.4 Hz, 5.1 Hz, respectively, total 1H,

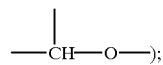

7.10–7.66 (m, 8H); IR (Neat): 3,340 cm$^{-1}$ ($\nu_{c=o}$).

Synthesis of 2-ethyl-4-phenylindene

To a 1-liter four-necked round flask (equipped with a stirrer, a dropping funnel and a thermometer) were fed 29.3 g (123.9 mmol) of 2-ethyl-1-hydroxy-4-phenylindane, 51.6 g (371.4 mmol) of triethylamine, 0.75 g (6.3 mmol) of 4-dimethylaminopyridine and 294 ml of methylene chloride. Then, a solution obtained by dissolving 19.2 ml (247.5 mmol) of methanesulfonyl chloride in 19.5 ml of methylene chloride was dropwise added slowly to the system while cooling with ice in a nitrogen atmosphere. After the addition was completed, the resulting mixture was reacted for another 3.5 hours at the same temperature. The reaction mixture was poured in 500 ml of ice water, then the organic phase was separated, and the aqueous phase was further extracted twice with 150 ml of methylene chloride. The whole organic phase was successively washed with a saturated NaHCO$_3$ solution and a saturated salt solution, and dried with anhydrous Na$_2$SO$_4$. The solvent was distilled off under reduced pressure, and the residue was separated by silica gel chromatography (developed with hexane), to obtain 19.7 g of the aimed product (mixture of two kinds of isomers) as a light yellow liquid (yield: 73%).

The physical properties of the product obtained are as follows.

NMR (CDCl$_3$, 90 MHz): δ=1.20 (t, J=7.6 Hz, 3H, CH$_3$); 2.49 (q, J=7.6 Hz, 2H); 3.41 (s, 2H); 6.61, 6.72 (each bs, total 1H); 7.09–8.01 (m, 8H).

Synthesis of dimethylsilyl-bis(2-ethyl-4-phenylindene)

To a 500-ml three-necked round flask (equipped with a stirrer tip, a Zimroth condenser, a dropping funnel and a thermometer) were fed 15 g (68.4 mmol) of 2-ethyl-4-phenylindene, 240 mg (1.89 mmol) of copper thiocyanate and 150 ml of anhydrous ether. Then, 47.1 ml (75.3 mmol) of a hexane solution of n-butyllithium having a concentration of 1.6 M was dropwise added slowly to the system while cooling with ice in a nitrogen atmosphere. After the addition was completed, the temperature of the system was raised to room temperature to perform reaction for another 1 hour. Then, to the reaction mixture was dropwise added slowly a solution obtained by 4.56 ml (37.8 mmol) of dimethyldichlorosilane in 13.5 ml of anhydrous ether. After the addition was completed, the mixture was further reacted for 12 hours at room temperature. The reaction mixture was filtered with Celite, and the filtrate was poured in 150 ml of saturated ammonium chloride water. After the organic phase was separated, the aqueous phase was extracted with 150 ml of ether. The whole organic phase was washed with a saturated salt solution, and dried with anhydrous Na$_2$SO$_4$. The solvent was distilled off under reduced pressure, and the residue was separated by silica gel chromatography (developed with hexane→hexane/methylene chloride (20/1, by parts by volume)), to obtain 13.5 g of the aimed product (mixture of two kinds of isomers) as a light yellow solid (yield: 80%).

The physical properties of the product obtained are as follows.

NMR (CDCl$_3$, 90 MHz): δ=−0.23, −0.17 (each s, total 6H, Si—CH$_3$); 1.12, 1.19 (each t, each J=7.4 Hz, total 6H, CH$_3$); 2.44 (bq, J=7.4 Hz, 4H); 3.81 (s, 2H,

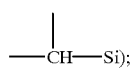

6.75 (bs, 2H, 3-H-Ind); 6.88–7.74 (m, 16H).

Synthesis of rac-dimethylsilyl-bis(2-ethyl-4-phenylindenyl) zirconium dichloride To a 200-ml three-necked round flask (equipped with a stirrer tip, a ball condenser, a dropping funnel and a thermometer) were fed 2.52 g (5.07 mmol) of dimethylsilyl-bis(2-ethyl-4-phenylindene) and 51 ml of anhydrous ether in an argon atmosphere. Then, 6.75 ml (10.68 mmol) of a hexane solution of n-butyllithium having a concentration of 1.58 M was dropwise added slowly to the system at room temperature. After the addition, the resulting mixture was further reacted for 13.5 hours. The reaction solution was cooled in a dry ice-acetone bath to −70° C., and thereto was slowly added 1.185 g (5.07 mmol) of a $ZrCl_4$ powder. After the addition was completed, the mixture was left overnight with stirring. Then, the solvent was distilled off at room temperature under reduced pressure. After addition of 90 ml of methylene chloride, the insolubles were filtered and the filtrate was concentrated at room temperature to give a solid. The solid was filtered, then washed twice with 5 ml of anhydrous ether, and dried under reduced pressure to obtain 0.68 g of the aimed product as an orange-yellow solid (yield: 20%).

The physical properties of the product obtained are as follows.

NMR ($CDCl_3$, 90 MHz): δ=1.09 (t, J=7.3 Hz, 6H, $CH_3$); 1.34 (s, 6H, Si—$CH_3$); 2.46 (quin, J=7.3 Hz, 2H); 2.73 (quin, J=7.3 Hz, 2H); 6.96 (s, 2H, 3-H-Ind); 6.99–7.88 (m, 16H).

Polymerization

To a 100-liter stainless steel polymerizer was fed 50 liters of toluene in a nitrogen atmosphere, and the system was cooled to 0° C. Then, propylene and hydrogen were fed to the system for 2 hours at feed rates of 4 $Nm^3$/hr and 400 Nl/hr, respectively, to saturate the system sufficiently. After the feed rate of propylene was reduced to 2 $Nm^3$/hr, to the system were added 15.0 mmol of triisobutylaluminum, 30.0 mmol (in terms of Al atom) of methylaluminoxane and 0.10 mmol (in terms of Zr atom) of rac-dimethylsilyl-bis(2-ethyl-4-phenylindenyl)zirconium dichloride to perform polymerization for 1 hour while keeping the system at 0° C. The polymerization was terminated by adding 0.5 liter of methanol to the system. The resulting polymer suspension was allowed to stand for 6 hours while purging the system with nitrogen. Then, about a half amount of toluene was taken out by decantation, and the remaining polymer suspension was transferred into a 200-liter reactor containing therein 0.1 liter of a hydrochloric acid and 60 liters of methanol, followed by stirring for 30 minutes. After the polymer suspension was allowed to stand and subjected to decantation, the suspension was again subjected to washing with 50 liters of methanol and decantation. Then, the polymer suspension was taken out from the bottom of the reactor, and the solvent was separated by filtration. The resulting polymer was dried at 100° C. under high vacuum for one day.

The amount of the propylene homopolymer [propylene polymer (7)] obtained was 1,950 g, and the polymerization activity corresponded to 19,500 g-PP/mmol-Zr. This polymer had [η] of 0.68 dl/g, MFR of 900 g/10-min and Mw/Mn of 2.02. In this polymer, the triad tacticity was 99.5%, the proportion of the irregularly positioned units based on the 2,1-insertion of the propylene monomer was 0.11%, and the proportion of the irregularly positioned units based on the 1,3-insertion of the propylene monomer was below the detected lower limit (less than 0.03%).

Preparation of a Propylene Polymer (8)

The procedures of the polymerization and the post treatment for preparing the propylene polymer (7) described above were repeated except that the feed rate of hydrogen was varied to 90 Nl/hr.

The amount of the propylene homopolymer [propylene polymer (8)] thus obtained corresponded to 2,720 g, and the polymerization activity corresponded to 27,200 g-PP/mmol-Zr. This polymer had [η] of 3.25 dl/g, MFR of 0.75 g/10 min and Mw/Mn of 2.20. In this polymer, the triad tacticity was 99.6%, the proportion of the irregularly positioned units based on the 2,1-insertion of the propylene monomer was 0.16%, and the proportion of the irregularly positioned units based on the 1,3-insertion of the propylene monomer was below the detected lower limit (less than 0.03%).

Preparation of a Propylene Polymer (9)

The procedures of the polymerization and the post treatment for preparing the propylene polymer (7) described above were repeated except that the feed rate of hydrogen was varied to 120 Nl/hr.

The amount of the propylene homopolymer [propylene polymer (9)] thus obtained was 3,350 g, and the polymerization activity corresponded to 33,500 g-PP/mmol-Zr. This polymer had [η] of 1.64 dl/g, MFR of 13.5 g/10 min and Mw/Mn of 2.03. In this polymer, the triad tacticity was 99.5%, the proportion of the irregularly positioned units based on the 2,1-insertion of the propylene monomer was 0.13%, and the proportion of the irregularly positioned units based on the 1,3-insertion of the propylene monomer was below the detected lower limit (less than 0.03%).

Preparation of a Propylene Polymer (10)

The procedures of the polymerization and the post treatment for preparing the propylene polymer (4) described above were repeated except that the addition amount of hydrogen was varied to 45 liters.

The amount of the propylene homopolymer [propylene polymer (10)] thus obtained was 1,930 g, and the polymerization activity corresponded to 38,600 g-PP/mmol-Ti. This polymer had [η] of 1.75 dl/g, MFR of 15 g/10 min, Mw/Mn of 5.0 and a boiling heptane extraction residue proportion (I.I.) of 98.8%.

Preparation of a Propylene Polymer (11)

The procedures of the polymerization and the post treatment for preparing the propylene polymer (7) described above were repeated except that the feed rate of hydrogen was varied to 350 Nl/hr.

The amount of the propylene homopolymer [propylene polymer (11)] thus obtained was 2,060 g, and the polymerization activity corresponded to 20,600 g-PP/mmol-Zr. This polymer had [η] of 0.72 dl/g, MFR of 670 g/10 min and Mw/Mn of 1.95. In this polymer, the triad tacticity was 99.5%, the proportion of the irregularly positioned units based on the 2,1-insertion of the propylene monomer was 0.14%, and the proportion of the irregularly positioned units based on the 1,3-insertion of the propylene monomer was below the detected lower limit (less than 0.03%).

Preparation of a Propylene Polymer (12)

To a 100-liter stainless steel polymerizer was fed 50 liters of toluene, and the system was cooled to 0° C. Then, propylene, ethylene and hydrogen were fed to the system for 2 hours at feed rates of 4 Nm³/hr, 2 Nm³/hr and 10 Nl/hr, respectively, to saturate the system sufficiently. The feed rates of propylene and ethylene were reduced to 1 Nm³/hr and 300 Nl/hr, respectively, and the system was allowed to stand for 1 hour. Then, to the system were added 8.0 mmol of triisobutylaluminum, 12.0 mmol (in terms of Al atom) of methylaluminoxane and 0.040 mmol (in terms of Zr atom) of rac-dimethylsilyl-bis(2-ethyl-4-phenylindenyl)zirconium dichloride, to perform polymerization for 1 hour while keeping the system at 0° C. The termination of the polymerization and the post treatment were carried out in the same manner as described for the propylene polymer (7).

The amount of the propylene copolymer [propylene polymer (12)] thus obtained was 1,550 g, and the polymerization activity corresponded to 38,700 g-polymer/mmol-Zr. This polymer had [η] of 0.68 dl/g, MFR of 950 g/10 min and Mw/Mn of 2.33, and contained constituent units derived from ethylene in an amount of 5.1% by mol. In this polymer, the triad tacticity was 99.2%, the proportion of the irregularly positioned units based on the 2,1-insertion of the propylene monomer was 0.08%, and the proportion of the irregularly positioned units based on the 1,3-insertion of the propylene monomer was below the detected lower limit (less than 0.03%).

Preparation of a Propylene Polymer (13)

To a 100-liter stainless steel polymerizer was fed 35 liters of toluene, and the system was cooled to 0° C. Then, propylene and ethylene were fed to the system for 2 hours at feed rates of 4 Nm³/hr and 2 Nm³/hr, respectively, while adjusting the pressure in the system at 2.5 kg/cm²-G, so as to saturate the system sufficiently. The feed rates of propylene and ethylene were reduced to 1 Nm³/hr and 300 Nl/hr, respectively, and the system was allowed to stand for 1 hour. Then, to the system were added 5.0 mmol of triisobutylaluminum, 10.0 mmol (in terms of Al atom) of methylaluminoxane and 0.010 mmol (in terms of Zr atom) of rac-dimethylsilyl-bis(2-ethyl-4-phenylindenyl)zirconium dichloride, to perform polymerization for 1 hour at 0° C. while adjusting the pressure in the polymerizer at 2.5 kg/cm²-G. After the polymerization was terminated by methanol, the pressure in the system was released, and the system was purged with nitrogen. The post treatment was carried out in the same manner as described for the propylene polymer (7).

The amount of the propylene copolymer [propylene polymer (13)] thus obtained was 1,310 g, and the polymerization activity corresponded to 13,100 g-polymer/mmol-Zr. This polymer had [η] of 3.10 dl/g, MFR of 0.72 g/10 min and Mw/Mn of 2.3, and contained constituent units derived from ethylene in an amount of 5.6% by mol. In this polymer, the triad tacticity was 99.3%, the proportion of the irregularly positioned units based on the 2,1-insertion of the propylene monomer was 0.13%, and the proportion of the irregularly positioned units based on the 1,3-insertion of the propylene monomer was below the detected lower limit (less than 0.03%).

Preparation of a Propylene Polymer (14)

The procedures of the polymerization and the post treatment for preparing the propylene polymer (12) described above were repeated except that hydrogen was not used.

The amount of the propylene copolymer [propylene polymer (14)] thus obtained was 1,750 g, and the polymerization activity corresponded to 17,500 g-polymer/mmol-Zr. This polymer had [η] of 1.67 dl/g, MFR of 9.5 g/10 min and Mw/Mn of 2.10, and contained constituent units derived from ethylene in an amount of 5.6% by mol. In this polymer, the triad tacticity was 99.2%, the proportion of the irregularly positioned units based on the 2,1-insertion of the propylene monomer was 0.11%, and the proportion of the irregularly positioned units based on the 1,3-insertion of the propylene monomer was below the detected lower limit (less than 0.03%).

Preparation of a Soft Polymer (ethylene/propylene random Copolymer)

Preparation of a Solid Titanium Catalyst Component 23.8 g of anhydrous magnesium chloride, 122 ml of decane and 116.1 g of 2-ethylhexyl alcohol were together heated at 130° C. for 2 hours to give a homogeneous solution. To the solution was added 5.72 ml of ethyl benzoate. The resulting homogeneous solution was dropwise added to 1 liter of titanium tetrachloride kept at −20° C. over a period of 20 minutes with stirring, and the resulting solution was further stirred for 1 hour at −20° C. Then, the temperature of the solution was slowly raised. When the temperature of the solution reached 80° C., 12.2 ml of ethyl benzoate was further added to the solution, and the mixture was stirred for 2 hours at 80° C.

After the reaction was completed, the solid material was collected by filtration. The solid material was resuspended in 1 liter of titanium tetrachloride, and the suspension was stirred for 2 hours at 90° C. The solid material was again collected by filtration and washed sufficiently with purified hexane until any titanium compound liberated in the washing liquid was not detected.

The solid titanium catalyst component thus obtained contained titanium, chlorine, magnesium and ethyl benzoate in amounts of 3.7% by weight, 59% by weight, 17% by weight and 15% by weight, respectively.

Polymerization

In a 15-liter stainless steel polymerizer equipped with a stirrer, copolymerization of ethylene and propylene was carried out.

To the polymerizer were continuously fed, through the top thereof, hexane as a polymerization solvent at a feed rate of 3 l/hr, a hexane slurry of the solid titanium catalyst component obtained above (0.15 mmol/l in terms of titanium atom) at a feed rate of 1 l/hr, a hexane solution of triethylaluminum (15 mmol/l) at a feed rate of 0.5 l/hr and a hexane solution of ethyl benzoate (5 mmol/l) at a feed rate of 0.5 l/hr. Further, to the polymerizer were continuously fed, through the top thereof, ethylene at a feed rate of 90 l/hr and propylene at a feed rate of 270 l/hr, and was also continuously fed hydrogen so that the hydrogen concentration in the gas phase of the polymerizer was 2.3%.

On the other hand, the polymer solution was continuously drawn out from the bottom of the polymerizer so that the amount of the polymer solution in the polymerizer was 5 liters.

The copolymerization was carried out at 80° C. by circulating warm water within a jacket equipped on the outside of the polymerizer. The pressure in the polymerizer was 6.5 kg/cm²-G.

To the polymer solution drawn out from the polymerizer was added a small amount of methanol to terminate the polymerization reaction. The polymer solution was subjected to steam stripping to separate the polymer from the solvent, and the polymer was dried at 80° C. under reduced pressure for one day.

Through the above operation, an ethylene/propylene random copolymer (EPR-1) was obtained in an amount of 235 g/hr.

The ethylene/propylene random copolymer (EPR-1) contained constituent units derived from ethylene in an amount of 42% by mol, and had [η] of 2.7 dl/g.

Preparation of an Ethylene/propylene Random Copolymer (EPR-2)

In a 15-liter autoclave equipped with a stirrer, copolymerization of ethylene and propylene was carried out.

To the polymerizer were fed, through the top thereof, 2.4 liters of dehydrated and purified hexane, 3.3 kg of propylene, 0.72 ml of a toluene solution of methylaluminoxane (1.3 mg-atom/ml in terms of aluminum atom) and 7.7 ml of a hexane solution of triisobutylaluminum (1 mmol/ml).

After the temperature of the system was raised to 37° C., ethylene was fed to the system so that the total pressure was 14 kg/cm$^2$, and 2.4 ml of a toluene solution of bis(1,3-dimethylcyclopentadienyl)zirconium dichloride (0.004 mmol/ml) was fed to the system using a pressure equalizing tube. The polymerization was performed for 1 hour with keeping the temperature at 37° C. and the total pressure at 14 kg/cm$^2$. After release of pressure, the polymer solution was taken out and dried. An yield of the resulting polymer was 320 g.

The ethylene/propylene random copolymer (EPR-2) thus obtained contained constituent units derived from ethylene in an amount of 43% by mol, and had [η] of 2.8 dl/g.

Synthesis of an Ethylene/propylene Random Copolymer (EPR-3)

In a 2-liter autoclave equipped with a stirrer, copolymerization of ethylene and propylene was carried out.

In detail, to the autoclave were fed, through the top thereof, 0.9 liter of dehydrated and purified hexane, 1 ml of a hexane solution of triisobutylaluminum (1 mmol/ml) and 0.27 ml of a toluene solution of methylaluminoxane (0.9 mmol/ml in terms of Al atom). After the temperature of the system was raised to 50° C., propylene was fed to the system so that the total pressure was 3.8 kg/cm$^2$-G, and ethylene was further fed to the system so that the total pressure was 8 kg/cm$^2$-G. Then, to the system was added 0.0008 mmol (in terms of zirconium) of rac-dimethylsilyl-bis(2-ethyl-4-phenylindenyl)zirconium dichloride to perform polymerization for 30 minutes with keeping the temperature at 50° C. and the total pressure at 8 kg/cm$^2$. After release of pressure, the polymer solution was added to a large amount of methanol. The resulting polymer was taken out and dried at 130° C. for 12 hours under reduced pressure.

An yield of the ethylene/propylene random copolymer (EPR-3) thus obtained was 49.6 g. This copolymer contained constituent units derived from ethylene in an amount of 39% by mol, and had [η] of 3.1 dl/g and MFR of 0.4 g/10 min.

Synthesis of an Ethylene/propylene Random Copolymer (EPR-4)

An ethylene/propylene random copolymer (EPR-4) was synthesized by a conventional ethylene/propylene copolymerization process using a VO(OC$_2$H$_5$)Cl$_2$—(C$_2$H$_5$)$_{1.5}$AlCl$_{1.5}$ catalyst.

The ethylene/propylene random copolymer (EPR-4) thus obtained had [η] of 2.4 dl/g and MFR of 0.6 g/10 min, and contained constituent units derived from ethylene in an amount of 81% by mol.

Synthesis of an Ethylene/propylene Random Copolymer (EPR-5)

In a 2-liter autoclave equipped with a stirrer, copolymerization of ethylene and propylene was carried out.

In detail, to the polymerizer were fed, through the top thereof, 1 liter of dehydrated and purified hexane, 11 Nl of propylene in the form of a gas, 0.85 ml of a hexane solution of triisobutylaluminum (1 mmol/ml) and 0.13 ml of a toluene solution of methylaluminoxane (1.2 mmol/ml in terms of Al atom). After the temperature of the system was raised to 80° C., ethylene was fed to the system so that the total pressure was 8 kg/cm$^2$-G. Then, to the system was added 0.0005 mmol (in terms of Zr atom) of rac-dimethylsilyl-bis(2-ethyl-4-phenylindenyl)zirconium dichloride to perform polymerization for 30 minutes with keeping the temperature at 80° C. and the total pressure at 8 kg/cm$^2$-G. After release of pressure, the polymer solution was added to a large amount of methanol. The resulting polymer was taken out and dried at 130° C. for 12 hours under reduced pressure.

An yield of the ethylene/propylene random copolymer (EPR-5) thus obtained was 58.4 g. This copolymer contained constituent units derived from ethylene in an amount of 79% by mol, and had [η] of 2.2 dl/g and MFR of 0.7 g/10 min.

Synthesis of an Ethylene/1-butene Random Copolymer (EBR-1)

In a 2-liter autoclave equipped with a stirrer, copolymerization of ethylene and 1-butene was carried out.

In detail, to the polymerizer were fed, through the top thereof, 1 liter of dehydrated and purified hexane, 55 ml of 1-butene, 0.85 ml of a hexane solution of triisobutylaluminum (1 mmol/ml) and 0.13 ml of a toluene solution of methylaluminoxane (1.2 mmol/ml in terms of Al atom). After the temperature of the system was raised to 90° C., ethylene was fed to the system so that the total pressure was 8 kg/cm$^2$-G. Then, to the system was added 0.0005 mmol (in terms of Zr atom) of rac-dimethylsilyl-bis(2-ethyl-4-phenylindenyl)zirconium dichloride to perform polymerization for 20 minutes with keeping the temperature at 90° C. and the total pressure at 8 kg/cm$^2$-G. After release of pressure, the polymer solution was added to a large amount of methanol. The resulting polymer was taken out and dried at 130° C. for 12 hours under reduced pressure.

An yield of the ethylene/1-butene random copolymer (EBR-5) thus obtained was 52.8 g. This copolymer contained constituent units derived from ethylene in an amount of 82% by mol, and had [η] of 2.3 dl/g and MFR of 0.6 g/10 min.

Synthesis of Ethylene Polymers (PE-1) and (PE-2)

Ethylene polymers (PE-1) and (PE-2) were synthesized by a conventional ethylene copolymerization process using a combined catalyst of MgCl$_2$-supported Ti catalyst-triethylaluminum.

The ethylene polymer (PE-1) had [η] of 1.20 dl/g, MFR of 29 g/10 min and Mw/Mn of 4.1.

The ethylene polymer (PE-2) had [η] of 2.11 dl/g, MFR of 1.3 g/10 min and Mw/Mn of 4.8.

Example 1

A propylene polymer composition consisting of 40% by weight of the propylene polymer (1) and 60% by weight of the propylene polymer (2) prepared by the above polymerization was molded into ASTM specimens by means of an injection molding machine under the conditions of a resin temperature of 200° C. and a mold temperature of 40° C., to measure the physical properties.

The results are set forth in Table 1.

Comparative Example 1

The propylene polymer (3) prepared by the above polymerization was molded into ASTM specimens in the same manner as described in Example 1, to measure the physical properties.

The results are set forth in Table 1.

Comparative Example 2

A propylene polymer composition consisting of 40% by weight of the propylene polymer (4) and 60% by weight of the propylene polymer (5) prepared by the above polymerization was molded into ASTM specimens in the same manner as described in Example 1, to measure the physical properties.

The results are set forth in Table 1.

TABLE 1

|  | Ex. 1 | Comp. Ex. 1 | Comp. Ex. 2 |
|---|---|---|---|
| Propylene polymer (1) | 40 | — | — |
| Propylene polymer (2) | 60 | — | — |
| Propylene polymer (3) | — | 100 | — |
| Propylene polymer (4) | — | — | 40 |
| Propylene polymer (5) | — | — | 60 |
| MFR (g/10 min) | 20 | 31 | 18 |
| FM (kg/cm$^2$) | 15,000 | 11,100 | 19,500 |
| IZ (23° C.) (kg · cm/cm) | 2 | 2 | 2 |
| EL (%) | 420 | 340 | 30 |
| HDT (load: 4.6 kg) (° C.) | 110 | 94 | 117 |

Example 2

A propylene polymer composition consisting of 40 parts by weight of the propylene polymer (1), 60 parts by weight of the propylene polymer (2) and 20 parts by weight of the soft polymer (EPR-1) prepared by the above polymerization was molded into ASTM specimens in the same manner as described in Example 1, to measure the physical properties.

The results are set forth in Table 2.

Comparative Example 3

A propylene polymer composition consisting of 100 parts by weight of the propylene polymer (3) and 20 parts by weight of the soft polymer (EPR-1) prepared by the above polymerization was molded into ASTM specimens in the same manner as described in Example 1, to measure the physical properties.

The results are set forth in Table 2.

Comparative Example 4

A propylene polymer composition consisting of 40 parts by weight of the propylene polymer (4), 60 parts by weight of the propylene polymer (5) and 20 parts by weight of the soft polymer (EPR-1) prepared by the above polymerization was molded into ASTM specimens in the same manner as described in Example 1, to measure the physical properties.

The results are set forth in Table 2.

TABLE 2

|  | Ex. 2 | Comp. Ex. 3 | Comp. Ex. 4 |
|---|---|---|---|
| Propylene polymer (1) | 40 | — | — |
| Propylene polymer (2) | 60 | — | — |
| Propylene polymer (3) | — | 100 | — |
| Propylene polymer (4) | — | — | 40 |
| Propylene polymer (5) | — | — | 60 |
| Soft polymer | 20 | 20 | 20 |
| MFR (g/10 min) | 15 | 25 | 12 |
| FM (kg/cm$^2$) | 11,000 | 9,100 | 13,000 |
| IZ (23° C.) (kg · cm/cm) | 35 | 37 | 12 |
| EL (%) | 720 | 740 | 180 |
| HDT (load: 4.6 kg) (° C.) | 95 | 88 | 110 |

Example 3

A propylene polymer composition consisting of 50% by weight of the propylene polymer (4) and 50% by weight of the propylene polymer (5) prepared by the above polymerization was molded into ASTM specimens in the same manner as described in Example 1, to measure the physical properties.

The results are set forth in Table 3.

Comparative Example 5

A propylene polymer composition consisting of 50% by weight of the propylene polymer (4) and 50% by weight of the propylene polymer (5) prepared by the above polymerization was molded into ASTM specimens in the same manner as described in Example 1, to measure the physical properties.

The results are set forth in Table 3.

TABLE 3

|  | Ex. 3 | Comp. Ex. 5 |
|---|---|---|
| Propylene polymer (4) | 50 | 50 |
| Propylene polymer (2) | 50 | — |
| Propylene polymer (5) | — | 50 |
| MFR (g/10 min) | 15 | 15 |
| FM (kg/cm$^2$) | 18,000 | 19,000 |
| IZ (23° C.) (kg · cm/cm) | 2 | 2 |
| EL (%) | 180 | 28 |
| HDT (load: 4.6 kg) (° C.) | 115 | 115 |

Example 4

A propylene polymer composition consisting of 50 parts by weight of the propylene polymer (4), 50 parts by weight of the propylene polymer (2) and 20 parts by weight of the soft polymer (EPR-1) prepared by the above polymerization was molded into ASTM specimens in the same manner as described in Example 1, to measure the physical properties.

The results are set forth in Table 4.

Comparative Example 6

A propylene polymer composition consisting of 50 parts by weight of the propylene polymer (4), 50 parts by weight of the propylene polymer (5) and 20 parts by weight of the soft polymer (EPR-1) prepared by the above polymerization was molded into ASTM specimens in the same manner as described in Example 1, and to measure the physical properties.

The results are set forth in Table 4.

TABLE 4

|  | Ex. 4 | Comp. Ex. 6 |
|---|---|---|
| Propylene polymer (4) | 50 | 50 |
| Propylene polymer (2) | 50 | — |
| Propylene polymer (5) | — | 50 |
| Soft polymer | 20 | 20 |
| MFR (g/10 min) | 12 | 15 |
| FM (kg/cm$^2$) | 12,500 | 13,000 |
| IZ (23° C.) (kg · cm/cm) | 30 | 12 |
| EL (%) | 400 | 180 |
| HDT (load: 4.6 kg) (° C.) | 95 | 105 |

Example 5

A propylene polymer composition consisting of 100 parts by weight of the propylene polymer (6) and 20 parts by weight of the ethylene/propylene random copolymer (EPR-2) prepared by the above polymerization was molded into ASTM specimens in the same manner as described in Example 1, to measure the physical properties.

The results are set forth in Table 5.

Comparative Example 7

A propylene polymer composition consisting of 100 parts by weight of the propylene polymer (6) and 20 parts by weight of the ethylene/propylene random copolymer (EPR-1) prepared by the above polymerization was molded into ASTM specimens in the same manner as described in Example 1, to measure the physical properties.

The results are set forth in Table 5.

TABLE 5

|  | Ex. 5 | Comp. Ex. 7 |
|---|---|---|
| Propylene polymer (6) | 100 | 100 |
| EPR-2 | 20 | — |
| EPR-1 | — | 20 |
| MFR (g/10 min) | 17 | 17 |
| FM (kg/cm$^2$) | 13,100 | 13,300 |
| IZ (23° C.) (kg · cm/cm) | 18 | 12 |
| IZ (−30° C.) (kg · cm/cm) | 8 | 3 |
| EL (%) | 350 | 250 |
| HDT (load: 4.6 kg) (° C.) | 95 | 95 |

Example 6

A propylene polymer composition consisting of 50 parts by weight of the propylene polymer (7) and 50 parts by weight of the propylene polymer (8) prepared by the above polymerization was molded into ASTM specimens in the same manner as described in Example 1, to measure the physical properties.

The results are set forth in Table 6.

Comparative Example 8

The propylene polymer (9) prepared by the above polymerization was molded into ASTM specimens in the same manner as described in Example 1 to measure the physical properties.

The results are set forth in Table 6.

TABLE 6

|  | Ex. 6 | Comp. Ex. 8 |
|---|---|---|
| Propylene polymer (7) | 50 | — |
| Propylene polymer (8) | 50 | — |
| Propylene polymer (9) | — | 100 |
| MFR (g/10 min) | 12.3 | 13.5 |
| FM (kg/cm$^2$) | 18,200 | 17,000 |
| IZ (23° C.) (kg · cm/cm) | 2.1 | 3.4 |
| EL (%) | 380 | 340 |
| HDT (load: 4.6 kg) (° C.) | 128 | 125 |

Example 7

A propylene polymer composition consisting of 50 parts by weight of the propylene polymer (12) and 50 parts by weight of the propylene polymer (13) prepared by the above polymerization was molded into ASTM specimens in the same manner as described in Example 1, to measure the physical properties. Further, a film was produced from the above composition under the following conditions, to measure the haze.

The film (width: 30 cm, thickness: 50 μm) was produced by means of a single-screw extruder having a diameter of 30 mm equipped with a T-die under the conditions of a cooling roll temperature of 25° C. and a take-up rate of 3 m/min.

The results are set forth in Table 7.

Comparative Example 9

The propylene polymer (14) prepared by the above polymerization was molded into ASTM specimens, to measure the physical properties.

The results are set forth in Table 7.

TABLE 7

|  | Ex. 7 | Comp. Ex. 9 |
|---|---|---|
| Propylene polymer (12) | 50 | — |
| Propylene polymer (13) | 50 | — |
| Propylene polymer (14) | — | 100 |
| MFR (g/10 min) | 13.0 | 9.5 |
| FM (kg/cm$^2$) | 8,200 | 7,700 |
| IZ (23° C.) (kg · cm/cm) | 4.0 | 4.6 |
| EL (%) | 440 | 480 |
| Film haze (%) | 0.7 | 2.0 |

Example 8

A propylene polymer composition consisting of 50 parts by weight of the propylene polymer (4) and 50 parts by weight of the propylene polymer (11) prepared by the above polymerization was molded into ASTM specimens in the same manner as described in Example 1, to measure the physical properties.

The results are set forth in Table 8.

Comparative Example 10

A propylene polymer composition consisting of 50 parts by weight of the propylene polymer (4) and 50 parts by weight of the propylene polymer (5) prepared by the above polymerization was molded into ASTM specimens in the same manner as described in Example 1, to measure the physical properties.

The results are set forth in Table 8.

TABLE 8

|  | Ex. 8 | Comp. Ex. 10 |
|---|---|---|
| Propylene polymer (4) | 50 | 50 |
| Propylene polymer (11) | 50 | — |
| Propylene polymer (5) | — | 50 |
| MFR (g/10 min) | 16 | 15 |
| FM (kg/cm$^2$) | 19,000 | 19,000 |
| IZ (23° C.) (kg · cm/cm) | 2 | 2 |
| EL (%) | 280 | 28 |
| HDT (load: 4.6 kg) (° C.) | 118 | 115 |

Example 9

A propylene polymer composition consisting of 50 parts by weight of the propylene polymer (7), 50 parts by weight of the propylene polymer (8) and 20 parts by weight of the ethylene/propylene random copolymer (EPR-1) prepared by the above polymerization was molded into ASTM specimens in the same manner as described in Example 1, to measure the physical properties.

The results are set forth in Table 9.

Example 10

A propylene polymer composition consisting of 50 parts by weight of the propylene polymer (7), 50 parts by weight of the propylene polymer (8), 10 parts by weight of the ethylene/propylene random copolymer (EPR-3) and 10 parts by weight of the ethylene/propylene random copolymer (EPR-5) prepared by the above polymerization was molded into ASTM specimens in the same manner as described in Example 1, to measure the physical properties.

The results are set forth in Table 9.

TABLE 9

|  | Ex. 9 | Ex. 10 |
|---|---|---|
| Propylene polymer (7) | 50 | 50 |
| Propylene polymer (8) | 50 | 50 |
| EPR-1 | 20 | — |
| EPR-3 | — | 10 |
| EPR-5 | — | 10 |
| MFR (g/10 min) | 9.1 | 9.1 |
| FM (kg/cm$^2$) | 12,800 | 13,600 |
| IZ (23° C.) (kg · cm/cm) | 38 | 34 |
| EL (%) | 720 | 560 |
| HDT (load: 4.6 kg) (° C.) | 98 | 104 |

Example 11

A propylene polymer composition consisting of 50 parts by weight of the propylene polymer (12), 50 parts by weight of the propylene polymer (13) and 20 parts by weight of the ethylene/propylene random copolymer (EPR-1) prepared by the above polymerization was molded into ASTM specimens in the same manner as described in Example 1, to measure the physical properties. Further, a film was produced from the above composition in the same manner as described in Example 7, to measure the haze.

The results are set forth in Table 10.

Comparative Example 11

A propylene polymer composition consisting of 100 parts by weight of the propylene polymer (14) and 20 parts by weight of the ethylene/propylene random copolymer (EPR-1) prepared by the above polymerization was molded into ASTM specimens in the same manner as described in Example 1, to measure the physical properties. Further, a film was produced from the above composition in the same manner as described in Example 7, to measure the haze.

The results are set forth in Table 10.

TABLE 10

|  | Ex. 11 | Comp. Ex. 11 |
|---|---|---|
| Propylene polymer (12) | 50 | — |
| Propylene polymer (13) | 50 | — |
| Propylene polymer (14) | — | 100 |
| EPR-1 | 20 | 20 |
| MFR (g/10 min) | 13.0 | 7.2 |
| FM (kg/cm$^2$) | 6,200 | 5,600 |
| IZ (23° C.) (kg · cm/cm) | 38 | 46 |
| EL (%) | 520 | 540 |
| Film haze (%) | 0.7 | 2.0 |

Example 12

A propylene polymer composition consisting of 50 parts by weight of the propylene polymer (4), 50 parts by weight of the propylene polymer (11) and 20 parts by weight of the ethylene/propylene random copolymer (EPR-1) prepared by the above polymerization was molded into ASTM specimens in the same manner as described in Example 1, to measure the physical properties.

The results are set forth in Table 11.

TABLE 11

|  | Ex. 12 | Comp. Ex. 6 |
|---|---|---|
| Propylene polymer (4) | 50 | 50 |
| Propylene polymer (11) | 50 | — |
| Propylene polymer (5) | — | 50 |
| EPR-1 | 20 | 20 |
| MFR (g/10 min) | 12 | 15 |
| FM (kg/cm$^2$) | 13,000 | 13,000 |
| IZ (23° C.) (kg · cm/cm) | 28 | 12 |
| EL (%) | 430 | 180 |
| HDT (load: 4.6 kg) (° C.) | 97 | 105 |

Example 13

A propylene polymer composition consisting of 50 parts by weight of the propylene polymer (7), 50 parts by weight of the propylene polymer (8), 10 parts by weight of the ethylene/propylene random copolymer (EPR-1) and 10 parts by weight of the ethylene polymer (PE-1) prepared by the above polymerization was molded into ASTM specimens in the same manner as described in Example 1, to measure the physical properties.

The results are set forth in Table 12.

Example 14

A propylene polymer composition consisting of 50 parts by weight of the propylene polymer (7), 50 parts by weight of the propylene polymer (8), 10 parts by weight of the ethylene/propylene random copolymer (EPR-3) and 10 parts by weight of the ethylene polymer (PE-2) prepared by the above polymerization was molded into ASTM specimens in the same manner as described in Example 1, to measure the physical properties.

The results are set forth in Table 12.

TABLE 12

|  | Ex. 13 | Ex. 14 |
|---|---|---|
| Propylene polymer (7) | 50 | 50 |
| Propylene polymer (8) | 50 | 50 |
| EPR-1 | 15 | — |
| EPR-3 | — | 15 |
| PE-1 | 10 | — |
| PE-2 | — | 10 |
| MFR (g/10 min) | 9.7 | 9.5 |
| FM (kg/cm$^2$) | 13,900 | 13,800 |
| IZ (23° C.) (kg · cm/cm) | 35 | 37 |
| EL (%) | 440 | 480 |
| HDT (load: 4.6 kg) (° C.) | 105 | 10 |

Example 15

A propylene polymer composition consisting of 100 parts by weight of the propylene polymer (9) and 25 parts by weight of the ethylene/propylene random copolymer (EPR-1) prepared by the above polymerization was molded into ASTM specimens in the same manner as described in Example 1, to measure the physical properties.

The results are set forth in Table 13.

Example 16

A propylene polymer composition consisting of 100 parts by weight of the propylene polymer (9), 20 parts by weight of the ethylene/propylene random copolymer (EPR-1), both prepared by the above polymerization, and 15 parts by weight of a filler (talc) was molded into ASTM specimens in the same manner as described in Example 1, to measure the physical properties.

The results are set forth in Table 13.

Example 17

A propylene polymer composition consisting of 100 parts by weight of the propylene polymer (9), 10 parts by weight of the ethylene/propylene random copolymer (EPR-3), 10 parts by weight of the ethylene/1-butene random copolymer (EBR-1), all prepared by the above polymerization, and 15 parts by weight of a filler (talc) was molded into ASTM specimens in the same manner as described in Example 1, to measure the physical properties.

The results are set forth in Table 13.

TABLE 13

|  | Ex. 15 | Ex. 16 | Ex. 17 |
|---|---|---|---|
| Propylene polymer (9) | 100 | 100 | 100 |
| EPR-1 | 25 | 20 | 10 |
| EBR-1 | — | — | 10 |
| Filler (talc) | — | 15 | 15 |
| MFR (g/10 min) | 9.0 | 9.8 | 10.3 |
| FM (kg/cm$^2$) | 11,800 | 15,800 | 18,800 |
| IZ (23° C.) (kg · cm/cm) | 55 | 44 | 40 |
| EL (%) | 750 | 310 | 310 |
| HDT (load: 4.6 kg) (° C.) | 96 | 125 | 125 |

Example 18

A propylene polymer composition consisting of 100 parts by weight of the propylene polymer (9), 10 parts by weight of the ethylene/propylene random copolymer (EPR-3) and 10 parts by weight of the ethylene/propylene random copolymer (EPR-4) prepared by the above polymerization was molded into ASTM specimens in the same manner as described in Example 1, to measure the physical properties.

The results are set forth in Table 14.

Example 19

A propylene polymer composition consisting of 100 parts by weight of the propylene polymer (9), 10 parts by weight of the ethylene/propylene random copolymer (EPR-3) and 10 parts by weight of the ethylene/propylene random copolymer (EPR-5) prepared by the above polymerization was molded into ASTM specimens in the same manner as described in Example 1, to measure the physical properties.

The results are set forth in Table 14.

Comparative Example 12

A propylene polymer composition consisting of 100 parts by weight of the propylene polymer (10) and 20 parts by weight of the ethylene/propylene random copolymer (EPR-1) prepared by the above polymerization was molded into ASTM specimens in the same manner as described in Example 1, to measure the physical properties.

The results are set forth in Table 14.

TABLE 14

|  | Ex. 18 | Ex. 19 | Comp. Ex. 12 |
|---|---|---|---|
| Propylene polymer (9) | 100 | 100 | — |
| Propylene polymer (10) | — | — | 100 |
| EPR-1 | — | — | 20 |
| EPR-3 | 10 | 10 | — |
| EPR-4 | 10 | — | — |
| EPR-5 | — | 10 | — |
| MFR (g/10 min) | 10.2 | 10.1 | 10.4 |
| FM (kg/cm$^2$) | 13,000 | 12,700 | 12,000 |
| IZ (23° C.) (kg · cm/cm) | 38 | 35 | 20 |
| EL (%) | 540 | 560 | 250 |
| HDT (load: 4.6 kg) (° C.) | 102 | 100 | 95 |

Example 20

A propylene polymer composition consisting of 100 parts by weight of the propylene polymer (14) and 20 parts by weight of the ethylene/propylene random copolymer (EPR-1) prepared by the above polymerization was molded into ASTM specimens in the same manner as described in Example 1, to measure the physical properties.

The results are set forth in Table 15.

Comparative Example 13

The propylene polymer (14) prepared by the above polymerization was molded into ASTM specimens in the same manner as described in Example 1, to measure the physical properties.

The results are set forth in Table 15.

TABLE 15

|  | Ex. 20 | Comp. Ex. 13 |
|---|---|---|
| Propylene polymer (14) | 100 | 100 |
| EPR-1 | 20 | — |
| MFR (g/10 min) | 7.2 | 9.5 |
| FM (kg/cm$^2$) | 5,600 | 7,700 |
| IZ (23° C.) (kg · cm/cm) | 46 | 4.6 |
| EL (%) | 540 | 480 |

Example 21

A propylene polymer composition consisting of 100 parts by weight of the propylene polymer (9), 15 parts by weight of the ethylene/propylene random copolymer (EPR-1) and 10 parts by weight of the ethylene polymer (PE-1) prepared by the above polymerization was molded into ASTM specimens in the same manner as described in Example 1, to measure the physical properties.

The results are set forth in Table 16.

Example 22

A propylene polymer composition consisting of 100 parts by weight of the propylene polymer (9), 15 parts by weight of the ethylene/propylene random copolymer (EPR-3) and 10 parts by weight of the ethylene polymer (PE-2) prepared by the above polymerization was molded into ASTM specimens in the same manner as described in Example 1, to measure the physical properties.

The results are set forth in Table 16.

TABLE 16

|  | Ex. 21 | Ex. 22 |
|---|---|---|
| Propylene polymer (9) | 100 | 100 |
| EPR-1 | 15 | — |
| EPR-3 | — | 15 |
| PE-1 | 10 | — |
| PE-2 | — | 10 |
| MFR (g/10 min) | 10.5 | 10.1 |
| FM (kg/cm$^2$) | 13,500 | 13,200 |
| IZ (23° C.) (kg · cm/cm) | 38 | 40 |
| EL (%) | 480 | 500 |
| HDT (load: 4.6 kg) (° C.) | 101 | 99 |

Example 23

A propylene polymer composition consisting of 100 parts by weight of the propylene polymer (6) and 20 parts by weight of the ethylene/propylene random copolymer (EPR-3) prepared by the above polymerization was molded into ASTM specimens in the same manner as described in Example 1, to measure the physical properties.

The results are set forth in Table 17.

TABLE 17

|  | Ex. 23 |
|---|---|
| Propylene polymer (6) | 100 |
| EPR-3 | 20 |
| MFR (g/10 min) | 17 |
| FM (kg/cm$^2$) | 13,600 |
| IZ (23° C.) (kg · cm/cm) | 18 |
| EL (%) | 340 |
| HDT (load: 4.6 kg) (° C.) | 95 |

What is claimed is:

1. A propylene polymer composition which is the product obtained by the steps comprising:

polymerizing propylene or copolymerizing propylene and at least one olefin selected from the group consisting of ethylene and α-olefins of 4 to 20 carbon atoms in the presence of an olefin polymerization catalyst comprising (i) (h) a transition metal compound represented by the following formula:

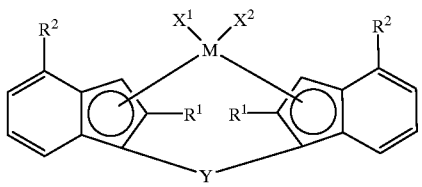

wherein

M is zirconium;

R$^1$ is an alkyl group of 2 to 6 carbon atoms;

R$^2$ is an aryl group selected from the group consisting of phenyl, naphthyl, anthracenyl and phenanthryl which may be substituted with a halogen atom or a hydrocarbon group of 1 to 20 carbon atoms;

X$^1$ and X$^2$ are each a hydrogen atom, a halogen atom, a hydrocarbon group of 1 to 20 carbon atoms, a halogenated hydrocarbon group of 1 to 20 carbon atoms, an oxygen-containing group or a sulfur-containing group; and Y is a divalent silicon-containing group selected from the group consisting of dialkylsilylene, alkylarylsilylene and diarylsilylene; and (ii) at least one organoaluminum oxy-compound, to prepare a propylene homo- or co-polymer (A);

polymerizing propylene or copolymerizing propylene and not more than 10% by mol of at least one α-olefin selected from the group consisting of ethylene and α-olefins of 4 to 20 carbon atoms in the presence of an olefin polymerization catalyst comprising a metallocene compound or an olefin polymerization catalyst comprising (d) a solid titanium catalyst component and (e) an organometallic compound catalyst component to prepare a propylene homo- or co-polymer (A') which contains constituent units derived from propylene in an amount of not less than 90% by mol and is different from the propylene homo- or co-polymer (A), wherein, the ratio of the intrinsic viscosity ($\eta_A$) of the propylene homo or co-polymer (A) and the intrinsic viscosity ($\eta_{A'}$) of the propylene homo- or co-polymer (A'), ($\eta_A/\eta_{A'}$) or ($\eta_{A'}/\eta_A$) is in the range of 3 to 30; and mixing 5 to 95% by weight of the propylene homo- or co-polymer (A) and 5 to 95% by weight of the propylene homo- or co-polymer (A').

2. A propylene polymer composition prepared by a multistage polymerization method comprising the steps of:

polymerizing propylene or copolymerizing propylene and at least one olefin selected from the group consisting of ethylene and α-olefins of 4 to 20 carbon atoms in the presence of an olefin polymerization catalyst comprising (i) (h) a transition metal compound represented by the following formula:

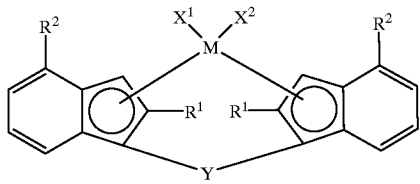

wherein

M is zirconium;

$R^1$ is an alkyl group of 2 to 6 carbon atoms;

$R^2$ is an aryl group selected from the group consisting of phenyl, naphthyl, anthracenyl and phenanthryl which may be substituted with a halogen atom or a hydrocarbon group of 1 to 20 carbon atoms;

$X^1$ and $X^2$ are each a hydrogen atom, a halogen atom, a hydrocarbon group of 1 to 20 carbon atoms, a halogenated hydrocarbon group of 1 to 20 carbon atoms, an oxygen-containing group or a sulfur-containing group; and Y is a divalent silicon-containing group selected from the group consisting of dialkylsilylene, alkylarylsilylene and diarylsilylene; and (ii) at least one organoaluminum oxy-compound, to prepare a propylene homo- or co-polymer (A);

polymerizing propylene or copolymerizing propylene and not more than 10% by mol of at least one α-olefin selected from the group consisting of ethylene and α-olefins of 4 to 20 carbon atoms in the presence of an olefin polymerization catalyst comprising a metallocene compound or an olefin polymerization catalyst comprising (d) a solid titanium catalyst component and (e) an organometallic compound catalyst component to prepare a propylene homo- or co-polymer (A') which contains constituent units derived from propylene in an amount of not less than 90% by mol and is different from the propylene homo- or co-polymer (A), wherein, the ratio of the intrinsic viscosity $(\eta_A)$ of the propylene homo or co-polymer (A) and the intrinsic viscosity $(\eta_{A'})$ of the propylene homo- or co-polymer (A'), $(\eta_A/\eta_{A'})$ or $(\eta_{A'}/\eta_A)$ is in the range of 3 to 30;

wherein the steps of preparing the propylene homo- or co-polymers (A) and (A') are conducted in an arbitrary order; and the amount of the propylene homo- or co-polymer (A) is 5 to 95% by weight, and the amount of the propylene homo- or co-polymer (A') is 5 to 95% by weight.

3. The propylene polymer composition of claim 1 wherein the homo- or co-polymer (A) is a propylene homopolymer (A5) characterized by:

melt flow rate (MFR), as measured according to ASTM D1238 at 230° C. under a load of 2.16 kg, in the range of 0.5 to 200 g/10 min, molecular weight distribution, Mw/Mn, in the range of 2.0 to 3.0, intrinsic viscosity $(\eta_{A5})$, measured in decalin at 135° C., in the range of 0.5 to 10 dl/g, weight average molecular weight in the range of $1\times10^4$ to $1\times10^6$, crystallinity measured by X-ray diffractometry of not less than 50%, boiling heptane extraction residue proportion (I.I.) of not less than 93%, triad tacticity (mm fraction) as measured by the $^{13}$C-NMR method of not less than 99.2%, proportion of irregularly positioned units (inversely inserted units), based on the 2,1-insertion, of the propylene monomer of not more than 0.18%, and proportion of irregularly positioned units, based on the 1,3-insertion of not more than 0.18%; and propylene homo- or co-polymer (A') is a propylene polymer (A6) characterized by:

MFR, measured according to ASTM D1238 at 230° C. under a load of 2.16 kg in the range of 0.5 to 200 g/10 min, Mw/Mn in the range of 2.0 to 8.0, crystallinity, measured by X-ray diffractometry, of not less than 50%, intrinsic viscosity $(\eta_{A6})$ measured in decalin at 135° C. in the range of 0.5 to 10 dl/g, and weight average molecular weight in the range of $1\times10^4$ to $1\times10^6$.

4. The propylene polymer composition of claim 3 which comprises from 30 to 70 percent by weight of propylene homopolymer (A5) and 30 to 70 percent by weight of propylene polymer (A6).

5. The propylene polymer composition of claim 4 wherein the intrinsic viscosity of propylene homopolymer (A5) $(\eta_{A5})$ is in the range of 2 to 5 dl/g and intrinsic viscosity of propylene polymer (A6) $(\eta_{A6})$ is in the range of 0.3 to 1.0 dl/g.

6. The propylene polymer composition of claim 4 wherein the intrinsic viscosity $(\eta_{A5})$ is in the range of 0.3 to 1.0 dl/g and intrinsic viscosity $(\eta_{A6})$ is in the range of 2 to 5 dl/g.

7. The propylene polymer composition of claim 1 wherein the resulting mixture of propylene polymer (A) and propylene polymer (A') is characterized by:

melt flow rate, MFR, measured according to ASTM D1238 at 230° C. under a load of 2.16 kg in the range of 0.5 to 200 g/10 min, Mw/Mn of the mixture of propylene polymer components in the range of 4 to 15, and density in the range of 0.89 to 0.92 g/cm$^3$.

8. The propylene polymer composition of claim 7 wherein the mixture of propylene polymer (A) and propylene polymer (A') is further characterized by:

flexural modulus (FM) measured in accordance with ASTM D790 under the following conditions: specimen size of 12.7×6.4×127; span of 100 mm and flexure rate of 2 mm/min in the range of 12,000 to 21,000 kg/cm$^2$, Izod impact strength (IZ) measured in accordance with ASTM D256 at 23° C. in the range of 2 to 10 kg·cm/cm, tensile elongation at break (EL) measured at 23° C. in accordance with ASTM D638 in the range of 100 to 500%, and heat distortion temperature (HDT) measured in accordance with ASTM D648 with a specimen measuring 12.7×6.4×127 not lower than 95° C.

9. The propylene polymer composition of claim 1 wherein the propylene homo- or co-polymer (A) is a propylene copolymer (A7) which contains from 90 to 98% by mol of propylene units, and units of α-olefin of from 2 to 10% by mol; said propylene copolymer being characterized by:

melt flow rate, MFR, measured according to ASTM D1238 at 23° C. and a load of 2.16 kg, in the range of 0.5 to 200 g/10 min, molecular weight distribution, Mw/Mn, in the range of 2.0 to 3.0, intrinsic viscosity ($\eta_{A7}$), measured in decalin at 135° C., in the range of 0.5 to 10 dl/g, weight average molecular weight in the range of $1\times10^4$ to $1\times10^6$, crystallinity measured by X-ray diffractometry of not less than 20%, triad tacticity (mm fraction) as determined by the $^{13}$C-NMR method of not less than 98.2%, and proportion of irregularity positioned units, based on the 2,1-insertion, of not more than 0.18%, and, proportion of irregularly positioned units, based on the 1,3-insertion, of not more than 0.03%; and, wherein the propylene homo- or co-polymer (A') is a propylene polymer (A6) characterized by:

MFR measured according to ASTM D1238 at 230° C. under a load of 2.16 kg in the range of 0.5 to 200 g/10 min, Mw/Mn in the range of 2.0 to 8.0, crystallinity measured by X-ray diffractometry of not less than 50%, intrinsic viscosity ($\eta_{A6}$), measured in decalin at 135° C., in the range of 0.5 to 10 dl/g, and weight average molecular weight in the range of $1\times10^4$ to $1\times10^6$.

10. The propylene polymer composition of claim 9 which comprises mixing from 15 to 85 percent by weight of propylene copolymer (A7) and from 15 to 85 percent by weight of propylene polymer (A6).

11. The propylene polymer composition of claim 9 wherein the intrinsic viscosity ($\eta_{A7}$) of copolymer (A7) is in the range of 2 to 5 dl/g and intrinsic viscosity of propylene polymer (A6) ($\eta_{A6}$) is in the range of 0.3 to 1.0 dl/g.

12. The propylene polymer composition of claim 9 wherein the intrinsic viscosity ($\eta_{A7}$) is in the range of 0.3 to 1.0 dl/g and intrinsic viscosity ($\eta_{A6}$) is in the range of 2 to 5 dl/g.

13. The propylene polymer composition of claim 9 wherein the mixture of propylene copolymer (A7) and propylene polymer (A6) is characterized by:

a melt flow rate, MFR, measured according to ASTM D1238 at 230° C. under a load of 2.16 kg in the range of 0.5 to 200 g/10 min, Mw/Mn of the mixture of propylene polymer components in the range of 4 to 15, and density in the range of 0.89 to 0.92 g/cm$^3$.

14. The propylene polymer composition of claim 13 wherein the mixture of copolymer (A7) and polymer (A6) is further characterized by:

flexural modulus (FM) measured in accordance with ASTM D790 under the following conditions: specimen size of 12.7×6.4×127; span of 100 mm and flexure rate of 2 mm/min in the range of 2,000 to 20,000 kg/cm$^2$, Izod impact strength (IZ) measured in accordance with ASTM D256 at 23° C. in the range of 5 to 20 kg·cm/cm, tensile elongation at break (EL) measured at 23° C. in accordance with ASTM D638 in the range of 200 to 1000%, and heat distortion temperature (HDT) measured in accordance with ASTM D648 with a specimen measuring 12.7×6.4×127 in the range of 90° C. to 140° C.

15. The propylene polymer composition of claim 1 wherein the ratio of intrinsic viscosity ($\eta_A$) of the propylene homo or co-polymer (A) and the intrinsic viscosity ($\eta_{A'}$) of the propylene homo- or co-polymer (A'), ($\eta_A/\eta_{A'}$) or ($\eta_{A'}/\eta_A$) is in the range of 4 to 20.

16. The propylene polymer composition of claim 2 wherein the ratio of intrinsic viscosity ($\eta_A$) of the propylene homo or co-polymer (A) and the intrinsic viscosity ($\eta_{A'}$) of the propylene homo- or co-polymer (A'), ($\eta_A/\eta_{A'}$) or ($\eta_{A'}/\eta_A$) is in the range of 4 to 20.

17. A propylene polymer composition comprising a mixture of:

(A) 5 to 95% by weight of propylene homopolymer or copolymer of propylene and at least one olefin selected from the group consisting of ethylene and α-olefins of 4 to 20 carbon atoms; and (A') 5 to 95% by weight of propylene homopolymer or copolymer of not less than 90 mol % propylene and not more than 10% by mol of at least one α-olefin selected from the group consisting of ethylene and α-olefins of 4 to 20 carbon atoms and which is different from the propylene homo- or co-polymer (A), wherein the ratio of the intrinsic viscosity ($\eta_A$) of the propylene homo or co-polymer (A) and the intrinsic viscosity ($\eta_{A'}$) of the propylene homo- or co-polymer (A'), ($\eta_A/\eta_{A'}$) or ($\eta_{A'}/\eta_A$) is in the range of 3 to 30; and wherein the homo- or co-polymer (A) is characterized by:

melt flow rate (MFR), as measured according to ASTM D1238 at 230° C. under a load of 2.16 kg, in the range of 0.5 to 200 g/10 min, molecular weight distribution, Mw/Mn, in the range of 2.0 to 3.0, intrinsic viscosity ($\eta_A$), measured in decalin at 135° C., in the range of 0.5 to 10 dl/g, weight average molecular weight in the range of $1\times10^4$ to $1\times10^6$, crystallinity measured by X-ray diffractometry of not less than 50%, boiling heptane extraction residue proportion (I.I.) of not less than 93%, triad tacticity (mm fraction) as measured by the $^{13}$C-NMR method of not less than 99.2%, proportion of irregularly positioned units (inversely inserted units), based on the 2,1-insertion, of the propylene monomer of not more than 0.18%, and proportion of irregularly positioned units, based on the 1,3-insertion of not more than 0.18%;

wherein propylene homo- or co-polymer (A') is a propylene polymer (A6) characterized by:

MFR, measured according to ASTM D1238 at 230° C. under a load of 2.16 kg in the range of 0.5 to 200 g/10 min, Mw/Mn in the range of 2.0 to 8.0, crystallinity, measured by X-ray diffractometry, of not less than 50%, intrinsic viscosity ($\eta_{A'}$) measured in decalin at 135° C. in the range of 0.5 to 10 dl/g, and weight average molecular weight in the range of $1\times10^4$ to $1\times10^6$; and wherein the mixture of propylene polymer (A) and propylene polymer (A') is characterized by:

melt flow rate, MFR, measured according to ASTM D1238 at 230° C. under a load of 2.16 kg in the range of 0.5 to 200 g/10 min, Mw/Mn of the mixture of propylene polymer components in the range of 4 to 15, flexural modulus (FM) measured in accordance with ASTM D790 under the following conditions: specimen size of 12.7×6.4×127; span of 100 mm and flexure rate of 2 mm/min in the range of 12,000 to 21,000 kg/cm$^2$, Izod impact strength (IZ) measured in accordance with ASTM D256 at 23° C. in the range of 2 to 10 kg·cm/cm, tensile elongation at break (EL) measured at 23° C. in accordance with ASTM D638 in the range of 100 to 500%, and heat distortion temperature (HDT) measured in accordance with ASTM D648 with a specimen measuring 12.7×6.4×127 not lower than 95° C.

18. The propylene polymer composition of claim 17 which comprises from 30 to 70 percent by weight of propylene polymer (A) having an intrinsic viscosity ($\eta_A$) in the range of 2 to 5 dl/g and 30 to 70 percent by weight of propylene polymer (A') having an intrinsic viscosity ($\eta_{A'}$) in the range of 0.3 to 1.0 dl/g.

19. The propylene polymer composition of claim 17 which comprises from 30 to 70 percent by weight of propylene polymer (A) having an intrinsic viscosity ($\eta_A$) in the range of 0.3 to 1 dl/g and 30 to 70 percent by weight of propylene polymer (A') having an intrinsic viscosity ($\eta_{A'}$) in the range of 2 to 5 dl/g.

20. A propylene polymer composition comprising a mixture of:

(A) 5 to 95% by weight of copolymer of from 90 to 98 mole percent propylene and from 2 to 10 mole percent of at least one olefin selected from the group consisting of ethylene and α-olefins of 4 to 20 carbon atoms; and (A') 5 to 95% by weight of propylene homopolymer or copolymer of not less than 90 mol % propylene and not more than 10% by mol of at least one α-olefin selected from the group consisting of ethylene and α-olefins of 4 to 20 carbon atoms and which is different from the propylene homo- or co-polymer (A), wherein the ratio of the intrinsic viscosity ($\eta_A$) of the propylene copolymer (A) and the intrinsic viscosity ($\eta_{A'}$) of the propylene homo- or co-polymer (A'), ($\eta_A/\eta_{A'}$) or ($\eta_{A'}/\eta_A$) is in the range of 3 to 30; and wherein the copolymer (A) is characterized by:

melt flow rate (MFR), as measured according to ASTM D1238 at 230° C. under a load of 2.16 kg, in the range of 0.5 to 200 g/10 min, molecular weight distribution, Mw/Mn, in the range of 2.0 to 3.0, intrinsic viscosity ($\eta_A$), measured in decalin at 135° C., in the range of 0.5 to 10 dl/g, weight average molecular weight in the range of 1×10$^4$ to 1×10$^6$, crystallinity measured by X-ray diffractometry of not less than 20%, triad tacticity (mm fraction) as measured by the $^{13}$C-NMR method of not less than 98.2%, proportion of irregularly positioned units (inversely inserted units), based on the 2,1-insertion, of not more than 0.18%, and proportion of irregularly positioned units, based on the 1,3-insertion, of not more than 0.03%;

wherein propylene homo- or co-polymer (A') is characterized by:

MFR, measured according to ASTM D1238 at 230° C. under a load of 2.16 kg in the range of 0.5 to 200 g/10 min, Mw/Mn in the range of 2.0 to 8.0, crystallinity, measured by X-ray diffractometry, of not less than 50%, intrinsic viscosity ($\eta_{A'}$) measured in decalin at 135° C. in the range of 0.5 to 10 dl/g, and weight average molecular weight in the range of 1×10$^4$ to 1×10$^6$; and wherein the mixture of propylene polymer (A) and propylene polymer (A') is characterized by:

melt flow rate, MFR, measured according to ASTM D1238 at 230° C. under a load of 2.16 kg in the range of 0.5 to 200 g/10 min, Mw/Mn of the mixture of propylene polymer components in the range of 4 to 15, density in the range of 0.89 to 0.92 g/cm$^3$;

flexural modulus (FM) measured in accordance with ASTM D790 under the following conditions: specimen size of 12.7×6.4×127; span of 100 mm and flexure rate of 2 mm/min in the range of 2,000 to 20,000 kg/cm$^2$, Izod impact strength (IZ) measured in accordance with ASTM D256 at 23° C. in the range of 5 to 20 kg·cm/cm, tensile elongation at break (EL) measured at 23° C. in accordance with ASTM D638 in the range of 200 to 1000%, and heat distortion temperature (HDT) measured in accordance with ASTM D648 with a specimen measuring 12.7×6.4×127 in the range of 90° C. to 140° C.

21. The propylene polymer composition of claim 20 which comprises from 30 to 70 percent by weight of propylene copolymer (A) having an intrinsic viscosity ($\eta_A$) in the range of 2 to 5 dl/g and 30 to 70 percent by weight of propylene polymer (A') having an intrinsic viscosity ($\eta_{A'}$) in the range of 0.3 to 1.0 dl/g.

22. The propylene polymer composition of claim 20 which comprises from 30 to 70 percent by weight of propylene copolymer (A) having an intrinsic viscosity ($\eta_A$) in the range of 0.3 to 1 dl/g and 30 to 70 percent by weight of propylene polymer (A') having an intrinsic viscosity ($\eta_{A'}$) in the range of 2 to 5 dl/g.

* * * * *